(12) United States Patent
Garner et al.

(10) Patent No.: US 12,514,148 B2
(45) Date of Patent: Jan. 6, 2026

(54) PLANTING UNIT FOR A SEEDING MACHINE HAVING A SEED METER AND SEED DELIVERY SYSTEM

(71) Applicant: DEERE & COMPANY, Moline, IL (US)

(72) Inventors: Elijah B. Garner, Bettendorf, IA (US); Lee E. Zumdome, Bettendorf, IA (US); Nathan A. Mariman, Geneseo, IL (US); Michael E. Friestad, Rock Island, IL (US)

(73) Assignee: DEERE & COMPANY, Moline, IL (US)

( * ) Notice: Subject to any disclaimer, the term of this patent is extended or adjusted under 35 U.S.C. 154(b) by 508 days.

(21) Appl. No.: 18/067,546

(22) Filed: Dec. 16, 2022

(65) Prior Publication Data

US 2023/0122381 A1 Apr. 20, 2023

Related U.S. Application Data

(63) Continuation of application No. 16/930,954, filed on Jul. 16, 2020, now abandoned, which is a
(Continued)

(51) Int. Cl.
*A01C 7/16* (2006.01)
*A01C 7/04* (2006.01)
(Continued)

(52) U.S. Cl.
CPC ............ *A01C 7/0445* (2023.05); *A01C 7/046* (2013.01); *A01C 7/16* (2013.01); *A01C 7/20* (2013.01); *B65G 23/44* (2013.01)

(58) Field of Classification Search
CPC .................................. A01C 7/16; B65G 23/44
See application file for complete search history.

(56) References Cited

U.S. PATENT DOCUMENTS

| | | |
|---|---|---|
| 9,439 A | 12/1852 | Colver |
| 13,986 A | 12/1855 | Hurd |
| (Continued) | | |

FOREIGN PATENT DOCUMENTS

| | | | |
|---|---|---|---|
| AU | 6198680 A | 3/1981 | |
| BE | 335843 A | 9/1926 | |
| (Continued) | | | |

OTHER PUBLICATIONS

Ahmadi, Mojtaba. Developing a New Powered Seed Delivery System with Constant Seed Release Speed Using Two Confronting Belts. Diss. North Dakota State University, 2018, in 76 pages.
(Continued)

*Primary Examiner* — Alicia Torres
(74) *Attorney, Agent, or Firm* — Michael Best & Friedrich LLP

(57) ABSTRACT

A planting unit for a seeding machine having a frame member and a seed meter mounted thereto. The seed meter has a housing and a metering member rotatably mounted therein. The metering member has a sidewall with an inner surface and an outer surface with a rim portion of the sidewall adjacent an outer edge of the sidewall. The inner surface of the side wall and the housing form a trough at a bottom portion of the metering member to hold a seed pool. A mechanical seed delivery system takes seed from the metering member and moves seed to a discharge location adjacent a seed furrow formed in soil beneath the seeding machine.

29 Claims, 15 Drawing Sheets

Related U.S. Application Data continuation of application No. 16/279,654, filed on Feb. 19, 2019, now abandoned, which is a continuation of application No. 15/454,870, filed on Mar. 9, 2017, now Pat. No. 10,206,326, which is a continuation of application No. 14/505,829, filed on Oct. 3, 2014, now Pat. No. 9,661,799, which is a continuation of application No. 13/072,051, filed on Mar. 25, 2011, now Pat. No. 8,850,998.

(51) Int. Cl.
*A01C 7/20* (2006.01)
*B65G 23/44* (2006.01)

(56) References Cited

U.S. PATENT DOCUMENTS

| | | |
|---|---|---|
| 55,373 A | 6/1866 | Sherwood |
| 140,493 A | 7/1873 | Fulghum et al. |
| 196,291 A | 10/1877 | Ewart |
| 262,439 A | 8/1882 | Lindsay et al. |
| 327,011 A | 9/1885 | Norton, Sr. |
| 342,490 A | 5/1886 | Zimmerman et al. |
| 353,959 A | 12/1886 | Newhall |
| 467,683 A | 1/1892 | Essex |
| 503,274 A | 8/1893 | Williams |
| 540,157 A | 5/1895 | Eisenhart |
| 540,458 A | 6/1895 | Robbins |
| 546,535 A | 9/1895 | Horscroft |
| 658,348 A | 9/1900 | Crowley |
| 688,912 A | 12/1901 | Watts |
| 697,874 A | 4/1902 | Oldham |
| 736,981 A | 8/1903 | Kohser |
| 773,205 A | 10/1904 | Green |
| 781,310 A | 1/1905 | Steitz |
| 782,459 A | 2/1905 | Morris |
| 792,958 A | 6/1905 | Bagger |
| 858,201 A | 6/1907 | McCoy |
| 886,253 A | 4/1908 | Roseland |
| 925,826 A | 6/1909 | McWhorter |
| 955,193 A | 4/1910 | Paulitsch |
| 1,035,191 A | 8/1912 | Hist |
| 1,046,199 A | 12/1912 | Knopp |
| 1,220,684 A | 3/1917 | Ray |
| 1,264,454 A | 4/1918 | Terrell et al. |
| 1,274,556 A | 8/1918 | Jons, Jr. |
| 1,331,235 A | 2/1920 | Bristow |
| 1,331,341 A | 2/1920 | Harnsberger |
| 1,376,933 A | 5/1921 | Gould, Jr. |
| 1,397,689 A | 11/1921 | Krotz |
| 1,422,534 A | 7/1922 | Brown |
| 1,453,923 A | 5/1923 | De Young, Jr. |
| 1,480,963 A | 1/1924 | Sproull |
| 1,501,335 A | 7/1924 | Artenstein |
| 1,506,294 A | 8/1924 | Faber |
| 1,566,187 A | 12/1925 | Fifer |
| 1,637,834 A | 8/1927 | Melfort |
| 1,750,855 A | 3/1930 | Neighbour |
| 1,751,486 A | 3/1930 | Lutz |
| 1,751,590 A | 3/1930 | Lutz |
| 1,912,248 A | 5/1933 | Bateman et al. |
| 1,976,315 A | 10/1934 | White |
| 1,997,791 A | 4/1935 | Hoberg et al. |
| 2,053,390 A | 9/1936 | Bateman et al. |
| 2,054,552 A | 9/1936 | Wakeham |
| 2,141,044 A | 12/1938 | Rassmann |
| 2,144,044 A | 1/1939 | Birdseye |
| 2,145,771 A | 1/1939 | McCartney |
| 2,183,606 A | 12/1939 | Day |
| 2,201,556 A | 5/1940 | Croce |
| 2,250,719 A | 7/1941 | McKahin |
| 2,302,499 A | 11/1942 | Lacson |
| 2,307,415 A | 1/1943 | Malhiot |
| 2,340,163 A | 1/1944 | White |
| 2,410,996 A | 11/1946 | Patterson |
| 2,440,846 A | 5/1948 | Cannon |
| 2,462,276 A | 2/1949 | Mueller |
| 2,510,658 A | 6/1950 | Rassmann |
| 2,525,167 A | 10/1950 | Delivuk |
| 2,566,406 A * | 9/1951 | Dougherty ............... A01C 7/04 222/352 |
| 2,589,762 A | 3/1952 | Barnett et al. |
| 2,605,023 A | 7/1952 | Ward |
| 2,636,459 A | 4/1953 | Graves |
| 2,646,157 A | 7/1953 | Belt |
| 2,673,536 A | 3/1954 | Skinner |
| 2,682,947 A | 7/1954 | Belt |
| 2,684,781 A | 7/1954 | Allen et al. |
| 2,732,975 A | 1/1956 | Balzer |
| 2,760,622 A | 8/1956 | Magee |
| 2,854,933 A | 10/1958 | Kuester et al. |
| 2,871,805 A | 2/1959 | Behnen |
| 2,882,977 A | 4/1959 | Alexander et al. |
| 2,926,819 A | 3/1960 | Burch |
| 2,934,118 A | 4/1960 | Staffa |
| 2,935,957 A | 5/1960 | Denton |
| 2,950,845 A | 8/1960 | Immesoete |
| 2,960,258 A | 11/1960 | Dodwell |
| 2,975,936 A | 3/1961 | Rousek |
| 2,980,043 A | 4/1961 | Beck |
| 3,066,622 A | 12/1962 | Schurmann |
| 3,077,290 A | 2/1963 | Rehder |
| 3,100,462 A | 8/1963 | Steele et al. |
| 3,122,283 A | 2/1964 | Walters |
| 3,133,515 A | 5/1964 | Beebe |
| 3,142,275 A | 7/1964 | Buhr |
| 3,148,644 A | 9/1964 | Keeton |
| 3,154,032 A | 10/1964 | Kappelmann |
| 3,156,201 A | 11/1964 | Tweedale |
| 3,176,636 A | 4/1965 | Wilcox et al. |
| 3,185,118 A | 5/1965 | Green |
| 3,208,413 A | 9/1965 | Dinges |
| 3,253,739 A | 5/1966 | Martin |
| 3,272,159 A | 9/1966 | Sanderson |
| 3,308,774 A | 3/1967 | Keeton |
| 3,325,060 A | 6/1967 | Rehder |
| 3,329,310 A | 7/1967 | Ramsay |
| 3,343,507 A | 9/1967 | Smith |
| 3,347,426 A | 10/1967 | Morrison, Jr. et al. |
| 3,348,504 A | 10/1967 | Fischer |
| 3,413,941 A | 12/1968 | Roberson |
| 3,434,437 A | 3/1969 | Mark et al. |
| 3,436,979 A * | 4/1969 | Molitor ............... B65G 23/44 474/138 |
| 3,468,441 A | 9/1969 | Longman |
| 3,498,241 A | 3/1970 | Fischer |
| 3,526,344 A | 9/1970 | Koning |
| 3,552,601 A | 1/1971 | Hansen et al. |
| 3,561,380 A | 2/1971 | Adams, Jr. |
| 3,569,615 A | 3/1971 | Oberbeck et al. |
| 3,570,424 A | 3/1971 | Wigham |
| 3,627,050 A | 12/1971 | Hansen et al. |
| 3,636,897 A | 1/1972 | Brink |
| 3,637,108 A | 1/1972 | Loesch et al. |
| 3,648,631 A | 3/1972 | Fiedler et al. |
| 3,680,737 A | 8/1972 | Zagotta et al. |
| 3,687,272 A | 8/1972 | Eisenegger |
| 3,690,511 A | 9/1972 | Wigham |
| 3,693,833 A | 9/1972 | Weitz |
| 3,698,332 A | 10/1972 | McCallum |
| RE27,578 E | 2/1973 | Keeton |
| 3,731,842 A | 5/1973 | Schlegel |
| 3,741,437 A | 6/1973 | Ward |
| 3,757,995 A | 9/1973 | Armstrong |
| 3,770,164 A | 11/1973 | Hembree |
| 3,773,224 A | 11/1973 | Winslow |
| 3,788,518 A | 1/1974 | Beebe |
| 3,796,346 A | 3/1974 | Ribouleau |
| 3,841,522 A | 10/1974 | Hatcher |
| 3,843,018 A | 10/1974 | Rohrbach |
| 3,860,146 A | 1/1975 | Bauman et al. |
| 3,880,100 A | 4/1975 | Gillies et al. |
| 3,888,387 A | 6/1975 | Deckler |
| 3,889,883 A | 6/1975 | Anderson |

(56) References Cited

U.S. PATENT DOCUMENTS

| | | |
|---|---|---|
| 3,903,815 A | 9/1975 | Winkler |
| 3,913,503 A | 10/1975 | Becker |
| 3,921,852 A | 11/1975 | Johnson |
| 3,923,206 A | 12/1975 | Gillies et al. |
| 3,971,446 A | 7/1976 | Nienberg |
| 3,976,214 A | 8/1976 | Etwell |
| 3,982,661 A | 9/1976 | Feltrop |
| 3,990,606 A | 11/1976 | Gugenhan |
| 3,999,690 A | 12/1976 | Deckler |
| 4,002,266 A | 1/1977 | Beebe |
| 4,008,826 A | 2/1977 | Carree |
| 4,009,668 A | 3/1977 | Brass et al. |
| 4,010,778 A | 3/1977 | Aggen |
| 4,023,509 A | 5/1977 | Hanson |
| 4,026,437 A | 5/1977 | Biddle |
| 4,029,235 A | 6/1977 | Grataloup |
| 4,037,755 A | 7/1977 | Reuter |
| 4,047,638 A | 9/1977 | Harrer et al. |
| 4,074,830 A | 2/1978 | Adams et al. |
| 4,137,854 A | 2/1979 | Lattin |
| 4,156,395 A | 5/1979 | Edwards et al. |
| 4,162,744 A | 7/1979 | Barker et al. |
| 4,193,523 A | 3/1980 | Koning |
| 4,221,305 A | 9/1980 | Freeman et al. |
| 4,239,126 A | 12/1980 | Dobson et al. |
| 4,282,985 A | 8/1981 | Yamamoto |
| 4,285,444 A | 8/1981 | Tye |
| 4,306,509 A | 12/1981 | Hassan et al. |
| 4,314,514 A | 2/1982 | Binder |
| 4,324,347 A | 4/1982 | Thomas |
| 4,333,561 A | 6/1982 | Schlegel |
| 4,356,934 A | 11/1982 | Knake |
| 4,392,595 A | 7/1983 | Staniforth |
| 4,399,757 A | 8/1983 | Maury |
| 4,411,205 A | 10/1983 | Rogers |
| 4,449,642 A | 5/1984 | Dooley |
| 4,450,979 A | 5/1984 | Deckler |
| 4,469,244 A | 9/1984 | Maury |
| 4,519,494 A | 5/1985 | McEvoy et al. |
| 4,533,066 A | 8/1985 | Holmes et al. |
| 4,555,624 A | 11/1985 | Steffen |
| 4,561,939 A | 12/1985 | Justus |
| 4,593,632 A | 6/1986 | Mikawa et al. |
| 4,600,122 A * | 7/1986 | Lundie .................. A01C 7/046 221/266 |
| 4,613,056 A | 9/1986 | Olson |
| 4,628,841 A | 12/1986 | Powilleit |
| 4,635,215 A | 1/1987 | Friend |
| 4,646,941 A | 3/1987 | Grosse-Scharmann et al. |
| 4,650,093 A | 3/1987 | Meyer-Bosse |
| 4,653,410 A | 3/1987 | Typpi |
| 4,664,043 A | 5/1987 | Feller |
| 4,664,290 A | 5/1987 | Martin et al. |
| 4,793,511 A | 12/1988 | Ankum et al. |
| 4,896,615 A | 1/1990 | Hood, Jr. et al. |
| 4,896,616 A | 1/1990 | Wintersteiger et al. |
| 4,898,108 A | 2/1990 | McDermott |
| 4,899,672 A | 2/1990 | Paul |
| 4,915,258 A | 4/1990 | Olson |
| 4,928,607 A | 5/1990 | Luigi |
| 4,949,869 A | 8/1990 | Ribouleau |
| 5,025,736 A | 6/1991 | Anderson |
| 5,027,725 A | 7/1991 | Keeton |
| 5,058,766 A | 10/1991 | Deckler |
| 5,167,317 A | 12/1992 | Van Der Schoot et al. |
| 5,170,730 A | 12/1992 | Swallow |
| 5,170,909 A | 12/1992 | Lundie et al. |
| 5,377,867 A | 1/1995 | Schick et al. |
| 5,383,371 A | 1/1995 | Laitinen |
| 5,392,707 A | 2/1995 | Romans |
| 5,402,741 A | 4/1995 | Truax et al. |
| 5,431,117 A | 7/1995 | Steffens et al. |
| 5,501,366 A | 3/1996 | Fiorido |
| 5,533,458 A | 7/1996 | Bergland et al. |
| 5,601,209 A | 2/1997 | Barsi et al. |
| 5,650,609 A | 7/1997 | Mertins et al. |
| 5,720,233 A | 2/1998 | Lodico et al. |
| 5,784,871 A | 7/1998 | Glancey et al. |
| 5,784,985 A | 7/1998 | Lodico et al. |
| 5,802,994 A | 9/1998 | Kinkead et al. |
| 5,810,974 A | 9/1998 | Laapotti |
| 5,842,428 A | 12/1998 | Stufflebeam et al. |
| 5,855,303 A | 1/1999 | Gregor |
| 5,915,313 A | 6/1999 | Bender et al. |
| 5,918,726 A | 7/1999 | Temmink |
| 5,936,234 A | 8/1999 | Thomas et al. |
| 5,938,071 A | 8/1999 | Sauder |
| 5,975,283 A | 11/1999 | Riffe |
| 5,983,812 A | 11/1999 | Shokaku et al. |
| 5,992,338 A | 11/1999 | Romans |
| 6,000,528 A | 12/1999 | van Maanen |
| 6,024,033 A | 2/2000 | Kinkead et al. |
| 6,047,652 A | 4/2000 | Prairie et al. |
| 6,070,539 A | 6/2000 | Flamme et al. |
| 6,142,086 A | 11/2000 | Richard |
| 6,173,664 B1 | 1/2001 | Heimbuch |
| 6,202,944 B1 | 3/2001 | McCrory |
| 6,237,514 B1 | 5/2001 | Romans |
| 6,244,201 B1 | 6/2001 | Mauch et al. |
| 6,269,758 B1 | 8/2001 | Sauder |
| 6,293,438 B1 | 9/2001 | Woodruff |
| 6,305,303 B1 | 10/2001 | Wright et al. |
| 6,332,413 B1 | 12/2001 | Stufflebeanm et al. |
| 6,352,042 B1 | 3/2002 | Martin et al. |
| 6,477,967 B2 | 11/2002 | Rosenboom |
| 6,499,414 B2 | 12/2002 | Dunham |
| 6,516,733 B1 | 2/2003 | Sauder et al. |
| 6,564,730 B2 | 5/2003 | Crabb et al. |
| 6,567,764 B2 | 5/2003 | Kaji et al. |
| 6,581,532 B1 | 6/2003 | Hagen et al. |
| 6,581,535 B2 | 6/2003 | Barry et al. |
| 6,615,754 B2 | 9/2003 | Unruh et al. |
| 6,626,120 B2 | 9/2003 | Bogner et al. |
| 6,640,732 B2 | 11/2003 | Prairie et al. |
| 6,651,570 B1 | 11/2003 | Thiemke |
| 6,681,706 B2 * | 1/2004 | Sauder .................. A01C 7/20 111/900 |
| 6,718,892 B1 | 4/2004 | Rosenboom |
| 6,729,249 B2 | 5/2004 | Sauder et al. |
| 6,748,885 B2 | 6/2004 | Sauder et al. |
| 6,752,095 B1 | 6/2004 | Rylander et al. |
| 6,845,724 B2 | 1/2005 | Mayerle et al. |
| 6,913,541 B2 | 7/2005 | Chen |
| 6,932,236 B2 | 8/2005 | Ven Huizen |
| 6,960,703 B2 | 11/2005 | Nagle et al. |
| 6,994,038 B2 | 2/2006 | Mariman et al. |
| 7,086,269 B2 | 8/2006 | Sauder et al. |
| 7,093,548 B2 | 8/2006 | Eben et al. |
| 7,111,567 B2 | 9/2006 | Carr et al. |
| 7,152,540 B1 | 12/2006 | Sauder et al. |
| 7,152,542 B2 | 12/2006 | Eben et al. |
| 7,162,963 B2 | 1/2007 | Sauder et al. |
| 7,185,596 B2 | 3/2007 | Theimke et al. |
| 7,273,016 B2 | 9/2007 | Landphair et al. |
| 7,334,532 B2 | 2/2008 | Sauder et al. |
| 7,343,868 B2 | 3/2008 | Stephens et al. |
| 7,377,221 B1 | 5/2008 | Brockmeier |
| 7,404,366 B2 | 7/2008 | Mariman |
| 7,448,334 B2 | 11/2008 | Mariman et al. |
| 7,451,713 B2 | 11/2008 | Mariman et al. |
| 7,472,660 B2 | 1/2009 | Mariman et al. |
| 7,478,603 B2 | 1/2009 | Riewerts et al. |
| 7,490,565 B2 | 2/2009 | Holly |
| 7,513,200 B2 | 4/2009 | Friestad |
| 7,617,785 B2 | 11/2009 | Wendte |
| 7,631,606 B2 | 12/2009 | Sauder et al. |
| 7,661,377 B2 | 2/2010 | Keaton et al. |
| 7,669,539 B2 | 3/2010 | Wendte |
| 7,699,009 B2 | 4/2010 | Sauder et al. |
| 7,717,048 B2 | 5/2010 | Peterson et al. |
| 7,726,251 B1 | 6/2010 | Peterson et al. |
| 7,735,438 B2 | 6/2010 | Riewerts |
| 7,775,167 B2 | 8/2010 | Stehling et al. |
| 7,854,205 B2 | 12/2010 | Beaujot |

(56) References Cited

U.S. PATENT DOCUMENTS

| | | |
|---|---|---|
| 7,854,206 B2 | 12/2010 | Horsch |
| 7,918,168 B2 | 4/2011 | Garner et al. |
| 7,918,968 B1 | 4/2011 | Baker et al. |
| 7,938,073 B2 | 5/2011 | Dunham et al. |
| 7,975,631 B2 | 7/2011 | Heiss, Jr. |
| 7,994,377 B2 | 8/2011 | Coupard et al. |
| 8,001,913 B2 | 8/2011 | Snipes et al. |
| 8,074,586 B2 | 12/2011 | Garner et al. |
| 8,078,367 B2 | 12/2011 | Sauder et al. |
| 8,186,288 B2 | 5/2012 | Chinkiwsky |
| 8,221,047 B2 | 7/2012 | Petersen et al. |
| 8,276,529 B2 | 10/2012 | Garner et al. |
| 8,336,471 B2 | 12/2012 | Gilstring |
| 8,375,874 B2 | 2/2013 | Peterson et al. |
| 8,413,371 B2 | 4/2013 | Davidson et al. |
| 8,468,960 B2 | 6/2013 | Garner et al. |
| 8,522,699 B2 | 9/2013 | Garner et al. |
| 8,543,238 B2 | 9/2013 | Straeter |
| 8,618,465 B2 | 12/2013 | Tevs et al. |
| 8,671,856 B2 | 3/2014 | Garner et al. |
| 8,746,159 B2 | 6/2014 | Garner et al. |
| 8,752,490 B2 | 6/2014 | Beaujot |
| 8,789,482 B2 | 7/2014 | Garner et al. |
| 8,800,457 B2 | 8/2014 | Garner et al. |
| 8,813,663 B2 | 8/2014 | Garner et al. |
| 8,843,281 B2 | 9/2014 | Wilhelmi et al. |
| 8,850,995 B2 | 10/2014 | Garner et al. |
| 8,850,997 B2 | 10/2014 | Silbernagel et al. |
| 8,850,998 B2 | 10/2014 | Garner et al. |
| 8,869,719 B2 | 10/2014 | Garner et al. |
| 8,985,037 B2 | 3/2015 | Radtke et al. |
| 9,144,190 B2 | 9/2015 | Henry et al. |
| 9,216,860 B2 * | 12/2015 | Friestad ............... A01C 7/20 |
| 9,237,687 B2 | 1/2016 | Sauder et al. |
| 9,258,939 B2 | 2/2016 | Borgmann et al. |
| 9,258,940 B2 | 2/2016 | McCloskey |
| 9,265,191 B2 | 2/2016 | Sauder et al. |
| 9,301,441 B2 | 4/2016 | Friestad et al. |
| 9,313,941 B2 | 4/2016 | Garner et al. |
| 9,313,943 B2 | 4/2016 | Zumdome et al. |
| 9,332,689 B2 | 5/2016 | Baurer et al. |
| 9,345,188 B2 | 5/2016 | Garner et al. |
| 9,345,189 B2 | 5/2016 | Harmelink et al. |
| 9,433,141 B2 | 9/2016 | Friestad et al. |
| 9,445,539 B2 | 9/2016 | Rans |
| 9,468,142 B2 | 10/2016 | Bastin et al. |
| 9,480,199 B2 | 11/2016 | Garner et al. |
| 9,510,502 B2 | 12/2016 | Garner et al. |
| 9,578,802 B2 | 2/2017 | Radtke et al. |
| 9,596,802 B2 | 3/2017 | Funck |
| 9,622,402 B2 | 4/2017 | Kinzenbaw et al. |
| 9,633,491 B2 | 4/2017 | Wonderlich |
| 9,635,802 B2 | 5/2017 | Rains et al. |
| 9,635,804 B2 | 5/2017 | Carr et al. |
| 9,661,799 B2 | 5/2017 | Garner et al. |
| 9,686,905 B2 | 6/2017 | Garner et al. |
| 9,686,906 B2 | 6/2017 | Garner et al. |
| 9,693,498 B2 | 7/2017 | Zumdome et al. |
| 9,699,955 B2 | 7/2017 | Garner et al. |
| 9,713,298 B2 | 7/2017 | Garner |
| 9,730,377 B2 | 8/2017 | Kowalchuk |
| 9,733,634 B2 | 8/2017 | Prickel |
| 9,750,178 B2 | 9/2017 | Kinzenbaw et al. |
| 9,756,779 B2 | 9/2017 | Wilhelmi et al. |
| 9,769,978 B2 | 9/2017 | Radtke |
| 9,775,279 B2 | 10/2017 | Garner et al. |
| 9,795,078 B2 | 10/2017 | Garner et al. |
| 9,801,328 B2 | 10/2017 | Garner et al. |
| 9,807,922 B2 | 11/2017 | Garner et al. |
| 9,807,924 B2 | 11/2017 | Garner et al. |
| 9,814,176 B2 | 11/2017 | Kowalchuk |
| 9,820,429 B2 | 11/2017 | Garner et al. |
| 9,839,178 B2 | 12/2017 | Garner et al. |
| 9,861,025 B2 | 1/2018 | Schaefer et al. |
| 9,861,031 B2 | 1/2018 | Garner et al. |
| 9,872,424 B2 | 1/2018 | Baurer et al. |
| 9,883,625 B2 | 2/2018 | Koch et al. |
| 9,888,622 B2 | 2/2018 | Henry |
| 9,897,922 B2 | 2/2018 | Enomoto et al. |
| 9,936,625 B2 | 4/2018 | Wendte et al. |
| 9,936,630 B2 | 4/2018 | Johnson et al. |
| 9,936,631 B1 | 4/2018 | Hubner et al. |
| 9,949,426 B2 | 4/2018 | Radtke et al. |
| 9,974,230 B2 | 5/2018 | Sauder et al. |
| 9,999,175 B2 | 6/2018 | Baurer et al. |
| 10,004,173 B2 | 6/2018 | Garner et al. |
| 10,051,782 B2 | 8/2018 | Wilhelmi et al. |
| 10,058,023 B2 | 8/2018 | Conrad et al. |
| 10,143,127 B2 | 12/2018 | Wilhelmi et al. |
| 10,165,724 B2 | 1/2019 | Nilson et al. |
| 10,206,325 B2 | 2/2019 | Schoeny et al. |
| 10,206,326 B2 | 2/2019 | Garner et al. |
| 10,257,973 B2 | 4/2019 | Hubner et al. |
| 10,296,017 B2 | 5/2019 | Schoeny et al. |
| 10,398,077 B2 | 9/2019 | Radtke |
| 10,433,476 B2 | 10/2019 | Jagow et al. |
| 10,448,561 B2 | 10/2019 | Schoeny et al. |
| 10,455,757 B2 | 10/2019 | Sauder et al. |
| 10,470,358 B2 | 11/2019 | Sauder et al. |
| 10,485,159 B2 | 11/2019 | Wilhelmi et al. |
| 10,524,410 B2 | 1/2020 | Schoeny et al. |
| 10,537,055 B2 | 1/2020 | Gresch et al. |
| 10,582,655 B2 | 3/2020 | Kowalchuk |
| 10,602,656 B2 | 3/2020 | Bartleson et al. |
| 10,729,063 B2 | 8/2020 | Garner et al. |
| 10,743,460 B2 | 8/2020 | Gilbert et al. |
| 10,765,057 B2 | 9/2020 | Radtke et al. |
| 10,772,256 B2 | 9/2020 | Stuber |
| 10,806,070 B2 | 10/2020 | Garner et al. |
| 10,820,489 B2 | 11/2020 | Garner et al. |
| 10,823,748 B2 | 11/2020 | Allgaier |
| 10,842,072 B2 | 11/2020 | Wilhelmi et al. |
| 11,013,166 B2 | 5/2021 | Boetsch |
| RE48,572 E | 6/2021 | Garner et al. |
| 11,051,445 B2 | 7/2021 | Hubner et al. |
| 11,058,047 B2 | 7/2021 | Hubner et al. |
| 11,064,649 B2 | 7/2021 | Hubner et al. |
| 11,083,127 B2 | 8/2021 | Werner et al. |
| 11,129,325 B2 | 9/2021 | Marler et al. |
| 11,277,961 B2 | 3/2022 | Campbell et al. |
| 11,297,762 B2 | 4/2022 | Garner et al. |
| 11,324,162 B2 | 5/2022 | Koch et al. |
| 11,337,362 B2 | 5/2022 | Koch et al. |
| 2002/0043201 A1 | 4/2002 | Dunham |
| 2002/0050238 A1 | 5/2002 | Crabb et al. |
| 2003/0159631 A1 | 8/2003 | Sauder et al. |
| 2003/0167986 A1 | 9/2003 | Sauder et al. |
| 2003/0167987 A1 | 9/2003 | Nagle et al. |
| 2003/0183647 A1 | 10/2003 | Ven Huizen |
| 2005/0204971 A1 | 9/2005 | VenHuizen |
| 2005/0235890 A1 | 10/2005 | Mariman et al. |
| 2006/0266269 A1 | 11/2006 | Eben et al. |
| 2006/0278726 A1 | 12/2006 | Holly |
| 2006/0283363 A1 | 12/2006 | Wollman et al. |
| 2007/0039528 A1 | 2/2007 | Sauder et al. |
| 2007/0039529 A1 | 2/2007 | Sauder et al. |
| 2007/0107645 A1 | 5/2007 | Mariman et al. |
| 2007/0125284 A1 | 6/2007 | Mariman et al. |
| 2008/0053352 A1 | 3/2008 | Friestad |
| 2008/0236462 A1 | 10/2008 | Sauder et al. |
| 2009/0000533 A1 | 1/2009 | Wendte |
| 2010/0010667 A1 | 1/2010 | Sauder |
| 2010/0107944 A1 | 5/2010 | Snipes et al. |
| 2010/0192818 A1 | 8/2010 | Garner et al. |
| 2010/0192819 A1 | 8/2010 | Garner et al. |
| 2010/0192821 A1 | 8/2010 | Garner et al. |
| 2010/0224110 A1 | 9/2010 | Mariman |
| 2010/0300341 A1 | 12/2010 | Peterson et al. |
| 2011/0185956 A1 | 8/2011 | Garner et al. |
| 2012/0067260 A1 | 3/2012 | Garner et al. |
| 2012/0067261 A1 | 3/2012 | Garner et al. |
| 2012/0240837 A1 | 9/2012 | Garner et al. |
| 2013/0192504 A1 | 8/2013 | Sauder et al. |
| 2013/0298810 A1 | 11/2013 | Garner et al. |

(56) References Cited

U.S. PATENT DOCUMENTS

| | | | |
|---|---|---|---|
| 2014/0196642 A1 | 7/2014 | Garner et al. |
| 2015/0013581 A1 | 1/2015 | Garner et al. |
| 2015/0216111 A1 | 8/2015 | Garner et al. |
| 2015/0230397 A1 | 8/2015 | Garner et al. |
| 2015/0238003 A1 | 8/2015 | Swane |
| 2015/0305231 A1 | 10/2015 | Garner et al. |
| 2016/0128273 A1 | 5/2016 | Garner et al. |
| 2016/0135363 A1 | 5/2016 | Sauder et al. |
| 2016/0174458 A1 | 6/2016 | Thacker |
| 2016/0234996 A1 | 8/2016 | Sauder et al. |
| 2017/0049040 A1 | 2/2017 | Kinzenbaw |
| 2017/0127604 A1 | 5/2017 | Wilhelmi et al. |
| 2017/0332546 A1 | 11/2017 | Garner et al. |
| 2017/0359949 A1 | 12/2017 | Garner et al. |
| 2018/0007824 A1 | 1/2018 | Radtke |
| 2018/0049367 A1 | 2/2018 | Garner et al. |
| 2018/0153094 A1 | 6/2018 | Radtke et al. |
| 2018/0184578 A1 | 7/2018 | Stuber |
| 2018/0192577 A1 | 7/2018 | Smith et al. |
| 2019/0098827 A1 | 4/2019 | Gilbert et al. |
| 2019/0098828 A1 | 4/2019 | Wilhelmi et al. |
| 2019/0219606 A1 | 7/2019 | Radtke et al. |
| 2019/0223372 A1 | 7/2019 | Koch et al. |
| 2019/0230846 A1 | 8/2019 | Koch et al. |
| 2019/0239425 A1 | 8/2019 | Garner et al. |
| 2019/0239426 A1 | 8/2019 | Garner et al. |
| 2019/0246551 A1 | 8/2019 | Campbell et al. |
| 2019/0254224 A1 | 8/2019 | Garner et al. |
| 2019/0289774 A1 | 9/2019 | Prystupa et al. |
| 2019/0289778 A1 | 9/2019 | Koch et al. |
| 2019/0307057 A1 | 10/2019 | Sauder et al. |
| 2019/0343037 A1 | 11/2019 | Werner et al. |
| 2019/0364724 A1 | 12/2019 | Radtke et al. |
| 2020/0000011 A1 | 1/2020 | Hubner et al. |
| 2020/0000012 A1 | 1/2020 | Hubner et al. |
| 2020/0000016 A1 | 1/2020 | Hubner et al. |
| 2020/0000017 A1 | 1/2020 | Marler, III et al. |
| 2020/0000018 A1 | 1/2020 | Boetsch |
| 2020/0344941 A1 | 11/2020 | Garner et al. |
| 2021/0059104 A1 | 3/2021 | Garner et al. |
| 2021/0059105 A1 | 3/2021 | Garner et al. |
| 2021/0059106 A1 | 3/2021 | Garner et al. |
| 2021/0068337 A1 | 3/2021 | Garner et al. |
| 2021/0076558 A1 | 3/2021 | Garner et al. |
| 2021/0136997 A1 | 5/2021 | Garner et al. |
| 2023/0068227 A1* | 3/2023 | Zumdome | A01C 7/20 |

FOREIGN PATENT DOCUMENTS

| | | | | |
|---|---|---|---|---|
| BR | PI 8501300 A | 11/1985 | | |
| BR | PI 9404976-9 A | 8/1995 | | |
| BR | PI 9701145-2 A | 12/1998 | | |
| BR | PI 0104497-4 A | 5/2002 | | |
| BR | PI 0305993-6 A | 5/2005 | | |
| BR | PI 0605292-4 A | 9/2007 | | |
| BR | PI 0604798-0 A | 11/2007 | | |
| BR | PI 0703545-4 A | 4/2008 | | |
| BR | 202016000413 U2 * | 10/2017 | | A01C 7/16 |
| CA | 2154022 A1 | 7/1996 | | |
| CA | 2485250 C | 2/2014 | | |
| CA | 2806410 C | 8/2017 | | |
| CA | 3032575 A1 | 8/2019 | | |
| CA | 2831078 C | 9/2019 | | |
| CN | 1063011 A | 7/1992 | | |
| CN | 2180028 Y | 10/1994 | | |
| CN | 1069157 C | 8/2001 | | |
| CN | 1081885 C | 4/2002 | | |
| CN | 2613980 Y | 5/2004 | | |
| CN | 104956815 A * | 10/2015 | | A01C 19/02 |
| DE | 78644 C | 1/1895 | | |
| DE | 140749 C | 4/1903 | | |
| DE | 143205 C | 8/1903 | | |
| DE | 176669 C | 10/1906 | | |
| DE | 179254 C | 11/1906 | | |
| DE | 206192 C | 1/1909 | | |
| DE | 273291 C | 4/1914 | | |
| DE | 331981 C | 1/1921 | | |
| DE | 389840 C | 2/1924 | | |
| DE | 403144 C | 9/1924 | | |
| DE | 429529 C | 6/1926 | | |
| DE | 538037 C | 11/1931 | | |
| DE | 814343 C | 9/1951 | | |
| DE | 824873 C | 12/1951 | | |
| DE | 826525 C | 1/1952 | | |
| DE | 902561 C | 1/1954 | | |
| DE | 921598 C | 12/1954 | | |
| DE | 945923 C | 7/1956 | | |
| DE | 1090458 B | 10/1960 | | |
| DE | 1205329 B | 11/1965 | | |
| DE | 1211014 B | 2/1966 | | |
| DE | 1457832 A1 | 7/1969 | | |
| DE | 1962150 A1 | 9/1971 | | |
| DE | 2011462 A1 | 9/1971 | | |
| DE | 2030761 A1 | 12/1971 | | |
| DE | 2443671 A1 | 3/1976 | | |
| DE | 2517758 A1 | 11/1976 | | |
| DE | 2548359 B1 | 12/1976 | | |
| DE | 2604752 A1 | 8/1977 | | |
| DE | 2705479 B1 | 8/1978 | | |
| DE | 2735105 A1 | 2/1979 | | |
| DE | 2826658 A1 | 1/1980 | | |
| DE | 2900985 B1 | 4/1980 | | |
| DE | 2945923 A1 | 5/1981 | | |
| DE | 8400142 U1 | 5/1984 | | |
| DE | 3405031 C1 | 4/1985 | | |
| DE | 3441704 A1 | 5/1986 | | |
| DE | 3826397 A1 | 1/1989 | | |
| DE | 9401110 U1 | 5/1994 | | |
| DE | 19541553 A1 | 5/1997 | | |
| DE | 19710063 A1 | 9/1998 | | |
| DE | 102005051527 A1 | 5/2007 | | |
| DE | 102006012539 A1 | 9/2007 | | |
| DE | 102007031576 A1 | 1/2009 | | |
| EP | 0014622 A1 | 8/1980 | | |
| EP | 0047577 A2 | 3/1982 | | |
| EP | 0152048 A2 | 8/1985 | | |
| EP | 0100723 B1 | 9/1985 | | |
| EP | 0158985 B1 | 10/1985 | | |
| EP | 0049330 B1 | 1/1986 | | |
| EP | 0181358 B1 | 6/1988 | | |
| EP | 0182220 B1 | 4/1990 | | |
| EP | 0457679 B1 | 1/1995 | | |
| EP | 0606541 B1 | 1/1997 | | |
| EP | 0953280 B1 | 11/1999 | | |
| EP | 0981270 A1 | 3/2000 | | |
| EP | 0801523 B1 | 12/2000 | | |
| EP | 1219155 A1 | 7/2002 | | |
| EP | 1236387 A1 | 9/2002 | | |
| EP | 1560157 A2 | 8/2005 | | |
| EP | 2047736 A1 | 4/2009 | | |
| EP | 2213152 A1 | 8/2010 | | |
| EP | 2215903 B1 | 9/2011 | | |
| EP | 2213152 B1 | 12/2011 | | |
| EP | 2213153 B1 | 1/2012 | | |
| EP | 2747541 B1 | 4/2016 | | |
| EP | 2688385 B1 | 7/2016 | | |
| EP | 3056073 A1 | 8/2016 | | |
| EP | 2688387 B1 | 10/2016 | | |
| EP | 2974582 B1 | 9/2017 | | |
| EP | 2449871 B1 | 12/2018 | | |
| EP | 3409092 B1 | 12/2018 | | |
| EP | 3586583 A1 | 1/2020 | | |
| FR | 453651 A | 6/1913 | | |
| FR | 858062 A | 11/1940 | | |
| FR | 988160 A | 8/1951 | | |
| FR | 1026090 A | 4/1953 | | |
| FR | 1273128 A | 10/1961 | | |
| FR | 1291511 A | 4/1962 | | |
| FR | 1369492 A | 8/1964 | | |
| FR | 1408127 A | 6/1965 | | |
| FR | 1410390 A | 9/1965 | | |
| FR | 1503687 A | 12/1967 | | |
| FR | 2135702 A5 | 12/1972 | | |
| FR | 2174341 A6 | 10/1973 | | |

(56) References Cited

FOREIGN PATENT DOCUMENTS

| | | | |
|---|---|---|---|
| FR | 2210084 A6 | 7/1974 | |
| FR | 2210887 A5 | 7/1974 | |
| FR | 2220123 A5 | 9/1974 | |
| FR | 2323308 A1 | 4/1977 | |
| FR | 2365285 A1 | 4/1978 | |
| FR | 2376608 A1 | 8/1978 | |
| FR | 2414288 A1 | 8/1979 | |
| FR | 2424288 A1 | 11/1979 | |
| FR | 2480065 A1 * | 10/1981 | A01C 7/04 |
| FR | 2464017 B3 | 6/1982 | |
| FR | 2543789 A1 | 10/1984 | |
| FR | 2574243 A1 | 6/1986 | |
| FR | 2591061 A1 | 6/1987 | |
| FR | 2635432 A1 | 2/1990 | |
| FR | 2638054 A1 | 4/1990 | |
| FR | 2643212 A1 | 8/1990 | |
| FR | 2729271 A1 | 7/1996 | |
| FR | 2873535 A1 | 2/2006 | |
| GB | 189805308 A | 1/1899 | |
| GB | 190418381 A | 10/1904 | |
| GB | 191117977 A | 8/1912 | |
| GB | 191220961 A | 5/1913 | |
| GB | 191228290 A | 12/1913 | |
| GB | 191305165 A | 2/1914 | |
| GB | 191416282 A | 6/1915 | |
| GB | 103504 A | 1/1917 | |
| GB | 237073 A | 7/1925 | |
| GB | 296466 A | 9/1928 | |
| GB | 482789 A | 4/1938 | |
| GB | 599501 A | 3/1948 | |
| GB | 601779 A | 5/1948 | |
| GB | 609569 A | 10/1948 | |
| GB | 649436 A * | 1/1951 | A01C 7/16 |
| GB | 653614 A | 5/1951 | |
| GB | 655835 A | 8/1951 | |
| GB | 677842 A | 8/1952 | |
| GB | 679344 A | 9/1952 | |
| GB | 789435 A | 1/1958 | |
| GB | 802899 A | 10/1958 | |
| GB | 900275 A | 7/1962 | |
| GB | 926217 A | 5/1963 | |
| GB | 937519 A | 9/1963 | |
| GB | 964156 A | 7/1964 | |
| GB | 989145 A | 4/1965 | |
| GB | 1117223 A | 6/1968 | |
| GB | 1359031 A | 7/1974 | |
| GB | 1407219 A | 9/1975 | |
| GB | 1445174 A | 8/1976 | |
| GB | 2012534 A | 8/1979 | |
| GB | 2057835 A | 4/1981 | |
| GB | 2066032 A | 7/1981 | |
| GB | 2068203 A | 8/1981 | |
| GB | 2103463 A | 2/1983 | |
| JP | S52-59383 U | 4/1977 | |
| JP | S55-105523 U | 7/1980 | |
| JP | S55-151114 U | 10/1980 | |
| JP | S56-24815 A | 3/1981 | |
| JP | S56-024815 U | 3/1981 | |
| JP | S64-3306 Y2 | 7/1986 | |
| JP | S61-33858 Y2 | 10/1986 | |
| JP | H0530815 A | 2/1993 | |
| JP | H05192013 A | 8/1993 | |
| JP | H0591214 U | 12/1993 | |
| JP | H06165612 A | 6/1994 | |
| JP | 2540454 B2 | 10/1996 | |
| JP | H1159886 A | 3/1999 | |
| JP | 2000041420 A | 2/2000 | |
| JP | 2007117941 A | 5/2007 | |
| NL | 1000674 C2 | 12/1996 | |
| NL | 1005451 | 9/1998 | |
| NL | 1011957 C2 | 11/2000 | |
| NL | 1019071 C2 | 4/2003 | |
| NL | 1025174 C2 | 7/2005 | |
| RU | 2044436 C1 | 9/1995 | |
| RU | 2105452 C1 | 2/1998 | |
| RU | 2137337 C1 | 9/1999 | |
| RU | 2227385 C1 | 4/2004 | |
| RU | 2343675 C1 | 1/2009 | |
| RU | 2529317 C2 | 9/2014 | |
| RU | 2535261 C2 | 12/2014 | |
| RU | 2013145876 A | 4/2015 | |
| RU | 2578471 C2 | 3/2016 | |
| RU | 2605356 C2 | 12/2016 | |
| SU | 130264 A1 | 11/1959 | |
| SU | 264033 A1 | 11/1970 | |
| SU | 281928 A1 | 11/1971 | |
| SU | 445391 A1 | 10/1974 | |
| SU | 948316 A1 | 8/1982 | |
| SU | 990606 A1 | 1/1983 | |
| SU | 1253450 A1 | 8/1986 | |
| SU | 1613023 A1 | 12/1990 | |
| SU | 1683531 A1 | 10/1991 | |
| SU | 1782400 A1 | 12/1992 | |
| WO | WO 85/04547 A1 | 10/1985 | |
| WO | WO 98/049884 A1 | 11/1998 | |
| WO | WO 02/005623 A1 | 1/2002 | |
| WO | WO 2005/011358 A1 | 2/2005 | |
| WO | WO 2005/065441 A1 | 7/2005 | |
| WO | WO 2008/108732 A1 | 9/2008 | |
| WO | WO 2008/125197 A1 | 10/2008 | |
| WO | WO 2010/059101 A1 | 5/2010 | |
| WO | WO 2010/124360 A1 | 11/2010 | |
| WO | WO 2012/135015 A2 | 10/2012 | |
| WO | WO 2013/049198 A1 | 4/2013 | |
| WO | WO 2013/186175 A1 | 12/2013 | |
| WO | WO 2016/054715 A1 | 4/2016 | |
| WO | WO 2017/117638 A1 | 7/2017 | |
| WO | WO 2019/050944 A1 | 3/2019 | |
| WO | WO 2019/068582 A1 | 4/2019 | |
| WO | WO 2019/091871 A1 | 5/2019 | |
| WO | WO 2019/202194 A1 | 10/2019 | |
| WO | WO 2019/241856 A1 | 12/2019 | |
| WO | WO 2020/014752 A1 | 1/2020 | |

OTHER PUBLICATIONS

Amended Final joint Claim Construction Chart, filed Dec. 2, 2019 (Dkt. No. 173), in 18 pages.
Breece, H. Edward, Harold V. Hansen, and Thomas A. Hoerner. Fundamentals of machine operation: planting. J. Deere, 1975, in 184 pages.
Bufton, L. P. "The influence of seed-drill design on the spatial arrangement of seedlings and on seedling emergence." Symposium on the Timing of Field vegetable Production 72. 1977, in 23 pages.
Continental Bucket Elevator & Seed Belts Product Information (accessed first on May 19, 2020), in 2 pages. URL: https://www.continental-industry.com/en/Solutions/Conveyor-Belt-Systems/Processing-special-belts/Seeding-Harvesting/Products/Product-Range/Bucket-Elevator-Seed-Belts.
Exhibit 01 to Precision Planting LLC and AGCO Corporation's initial invalidity contentions relating to Australian Patent No. AU-A1-61 986/80 to Hedderwick ("Hedderwick '80 App."), served Jul. 12, 2019, in 98 pages.
Exhibit 02 to Precision Planting LLC and AGCO Corporation's initial invalidity contentions relating to Belgian Patent No. 335843 to Wodke ("Wodke"), served Jul. 12, 2019, in 74 pages.
Exhibit 03 to Precision Planting LLC and AGCO Corporation's initial invalidity contentions relating to German Published Patent No. DE1090458B to Witte ("Witte"), served Jul. 12, 2019, in 103 pages.
Exhibit 04 to Precision Planting LLC and AGCO Corporation's initial invalidity contentions relating to German Published Patent Application No. 28,26,658 to Holdt ("Holdt"), served Jul. 12, 2019, in 76 pages.
Exhibit 05 to Precision Planting LLC and AGCO Corporation's initial invalidity contentions relating to German Patent No. 389840 to Hempel ("Hempel"), served Jul. 12, 2019, in 69 pages.
Exhibit 06 to Precision Planting LLC and AGCO Corporation's initial invalidity contentions relating to French Patent No. 1,408,127 to Plinke ("Plinke"), served Jul. 12, 2019, in 65 pages.

(56) References Cited

OTHER PUBLICATIONS

Exhibit 07 to Precision Planting LLC and AGCO Corporation's initial invalidity contentions relating to French Published Patent Application No. 2,414,288 A1 to Benac ("Benac"), served Jul. 12, 2019, in 123 pages.
Exhibit 08 to Precision Planting LLC and AGCO Corporation's initial invalidity contentions relating to French Published Patent Application No. 2638054A1 to Damonneville ("Damonneville"), served Jul. 12, 2019, in 109 pages.
Exhibit 09 to Precision Planting LLC and AGCO Corporation's initial invalidity contentions relating to UK Patent Application No. GB2,012,534A to Curtis ("Curtis"), served Jul. 12, 2019, in 86 pages.
Exhibit 10 to Precision Planting LLC and AGCO Corporation's initial invalidity contentions relating to UK Published Patent Application No. 2,057,835 A to Hedderwick ("Hedderwick '835"), served Jul. 12, 2019, in 100 pages.
Exhibit 11 to Precision Planting LLC and AGCO Corporation's initial invalidity contentions relating to Japanese Utility Model Application JP 56-024815 ("Yamahata"), served Jul. 12, 2019, in 94 pages.
Exhibit 1002 to Petition for Inter Partes Review of U.S. Pat. No. 8,813,663 filed on behalf of Precision Planting, LLC and AGCO Corp.: Declaration of Douglas S. Prairie, filed on May 29, 2019, in 131 pages.
Exhibit 1002 to Petition for Inter Partes Review of U.S. Pat. No. 9,480,199 filed on behalf of Precision Planting, LLC and AGCO Corp.: Declaration of Douglas S. Prairie, filed on May 31, 2019, in 106 pages.
Exhibit 1002 to Petition for Inter Partes Review of U.S. Pat. No. 9,686,906 filed on behalf of Precision Planting, LLC and AGCO Corp.: Declaration of Randal K. Taylor, filed on May 30, 2019, in 156 pages.
Exhibit 1002 to Petition for Inter Partes Review of U.S. Pat. No. 9,699,955 filed on behalf of Precision Planting, LLC and AGCO Corp.: Declaration of Douglas S. Prairie, filed on May 31, 2019, in 138 pages.
Exhibit 1002 to Petition for Inter Partes Review of U.S. Pat. No. 9,807,924 filed on behalf of Precision Planting, LLC and AGCO Corp.: Declaration of Randal K. Taylor, filed on May 29, 2019, in 141 pages.
Exhibit 1002 to Petition for Inter Partes Review of U.S. Pat. No. 9,820,429 filed on behalf of Precision Planting, LLC and AGCO Corp.: Declaration of Douglas S. Prairie, filed on May 31, 2019, in 156 pages.
Exhibit 1002 to Petition for Inter Partes Review of U.S. Pat. No. 9,861,031 filed on behalf of Precision Planting, LLC and AGCO Corp.: Declaration of Douglas S. Prairie, filed on May 29, 2019, in 140 pages.
Exhibit 1002 to Petition for Inter Partes Review of U.S. Pat. No. 10,004,173 filed on behalf of Precision Planting, LLC and AGCO Corp.: Declaration of Douglas S. Prairie, filed on Jun. 3, 2019, in 163 pages.
Exhibit 12 to Precision Planting LLC and AGCO Corporation's initial invalidity contentions relating to Japanese Utility Model Registration Publication No. JP 61-33858 Y2 to Yamatake ("Yamatake"), served Jul. 12, 2019, in 71 pages.
Exhibit 13 to Precision Planting LLC and AGCO Corporation's initial invalidity contentions relating to Japanese Published Patent JP64003306Y2 to Koyama ("Koyama"), served Jul. 12, 2019, in 77 pages.
Exhibit 14 to Precision Planting LLC and AGCO Corporation's initial invalidity contentions relating to Netherlands Patent Application No. 1,005,451C2 to Pronk ("Pronk"), served Jul. 12, 2019, in 63 pages.
Exhibit 15 to Precision Planting LLC and AGCO Corporation's initial invalidity contentions relating to U.S. Patent Application Publication No. 2003/0159631 to Sauder et al. ("Sauder '631 App."), served Jul. 12, 2019, in 179 pages.

Exhibit 16 to Precision Planting LLC and AGCO Corporation's initial invalidity contentions relating to U.S. Patent Application Publication No. 2003/0167986A1 to Sauder et al. ("Sauder '986 App."), served Jul. 12, 2019, in 72 pages.
Exhibit 17 to Precision Planting LLC and AGCO Corporation's initial invalidity contentions relating to U.S. Patent Application Publication No. US 2003/0183647 A1 to Ven Huizen ("Ven Huizen '647 App."), served Jul. 12, 2019, in 115 pages.
Exhibit 18 to Precision Planting LLC and AGCO Corporation's initial invalidity contentions relating to U.S. Patent Application Publication No. 2006/0278726 A1 to Holly ("Holly '726 App."), served Jul. 12, 2019, in 83 pages.
Exhibit 19 to Precision Planting LLC and AGCO Corporation's initial invalidity contentions relating to U.S. Patent Application Publication No. US 2006/0283363 A1 to Wollman ("Wollman"), served Jul. 12, 2019, in 128 pages.
Exhibit 20 to Precision Planting LLC and AGCO Corporation's initial invalidity contentions relating to U.S. Patent Application Publication No. 2007/039528 A1 to Sauder et al. ("Sauder '528 App."), served Jul. 12, 2019, in 89 pages.
Exhibit 21 to Precision Planting LLC and AGCO Corporation's initial invalidity contentions relating to U.S. Patent Application Publication No. 2010/0107944 to Snipes et al. ("Snipes"), served Jul. 12, 2019, in 97 pages.
Exhibit 22 to Precision Planting LLC and AGCO Corporation's initial invalidity contentions relating to U.S. Patent Application Publication No. 2010/0192819 ("Garner"), served Jul. 12, 2019, in 45 pages.
Exhibit 23 to Precision Planting LLC and AGCO Corporation's initial invalidity contentions relating to U.S. Pat. No. 1,376,933 to Gould ("Gould"), served Jul. 12, 2019, in 74 pages.
Exhibit 24 to Precision Planting LLC and AGCO Corporation's initial invalidity contentions relating to U.S. Pat. No. 2,566,406 to Dougherty ("Dougherty"), served Jul. 12, 2019, in 72 pages.
Exhibit 25 to Precision Planting LLC and AGCO Corporation's initial invalidity contentions relating to U.S. Pat. No. 2,684,781 to Allen et al. ("Allen"), served Jul. 12, 2019, in 70 pages.
Exhibit 26 to Precision Planting LLC and AGCO Corporation's initial invalidity contentions relating to U.S. Pat. No. 3,077,290 to Rehder ("Rehder '290"), served Jul. 12, 2019, in 98 pages.
Exhibit 27 to Precision Planting LLC and AGCO Corporation's initial invalidity contentions relating to U.S. Pat. No. 3,253,739 to Martin ("Martin '739"), served Jul. 12, 2019, in 124 pages.
Exhibit 28 to Precision Planting LLC and AGCO Corporation's initial invalidity contentions relating to U.S. Pat. No. 3,272,159 to Sanderson ("Sanderson"), served Jul. 12, 2019, in 69 pages.
Exhibit 29 to Precision Planting LLC and AGCO Corporation's initial invalidity contentions relating to U.S. Pat. No. 3,325,060 to Rehder ("Rehder '060"), served Jul. 12, 2019, in 67 pages.
Exhibit 30 to Precision Planting LLC and AGCO Corporation's initial invalidity contentions relating to U.S. Pat. No. 3,329,310 ("Ramsay"), served Jul. 12, 2019, in 125 pages.
Exhibit 31 to Precision Planting LLC and AGCO Corporation's initial invalidity contentions relating to U.S. Pat. No. 3,413,941 ("Roberson"), served Jul. 12, 2019, in 81 pages.
Exhibit 32 to Precision Planting LLC and AGCO Corporation's initial invalidity contentions relating to U.S. Pat. No. 3,468,441 to Longman ("Longman"), served Jul. 12, 2019, in 140 pages.
Exhibit 33 to Precision Planting LLC and AGCO Corporation's initial invalidity contentions relating to U.S. Pat. No. 3,561,380 to Adams ("Adams"), served Jul. 12, 2019, in 75 pages.
Exhibit 34 to Precision Planting LLC and AGCO Corporation's initial invalidity contentions relating to U.S. Pat. No. 3,570,424 to Wigham ("Wigham '424"), served Jul. 12, 2019, in 66 pages.
Exhibit 35 to Precision Planting LLC and AGCO Corporation's initial invalidity contentions relating to U.S. Pat. No. 3,690,511 to Wigham ("Wigham '511"), served Jul. 12, 2019, in 91 pages.
Exhibit 36 to Precision Planting LLC and AGCO Corporation's initial invalidity contentions relating to U.S. Pat. No. 3,841,522 to Hatcher ("Hatcher"), served Jul. 12, 2019, in 101 pages.
Exhibit 37 to Precision Planting LLC and AGCO Corporation's initial invalidity contentions relating to U.S. Pat. No. 3,913,503 to Becker ("Becker"), served Jul. 12, 2019, in 64 pages.

(56) References Cited

OTHER PUBLICATIONS

Exhibit 38 to Precision Planting LLC and AGCO Corporation's initial invalidity contentions relating to U.S. Pat. No. 3,982,661 to Feltrop ("Feltrop"), served Jul. 12, 2019, in 73 pages.
Exhibit 39 to Precision Planting LLC and AGCO Corporation's initial invalidity contentions relating to U.S. Pat. No. 4,023,509 to Hanson ("Hanson"), served Jul. 12, 2019, in 100 pages.
Exhibit 40 to Precision Planting LLC and AGCO Corporation's initial invalidity contentions relating to U.S. Pat. No. 4,026,437 to Biddle ("Biddle"), served Jul. 12, 2019, in 71 pages.
Exhibit 41 to Precision Planting LLC and AGCO Corporation's initial invalidity contentions relating to U.S. Pat. No. 4,029,235 ("Grataloup"), served Jul. 12, 2019, in 94 pages.
Exhibit 42 to Precision Planting LLC and AGCO Corporation's initial invalidity contentions relating to U.S. Pat. No. 4,193,523 to Koning ("Koning"), served Jul. 12, 2019, in 106 pages.
Exhibit 43 to Precision Planting LLC and AGCO Corporation's initial invalidity contentions relating to U.S. Pat. No. 4,239,126 to Dobson et al. ("Dobson"), served Jul. 12, 2019, in 72 pages.
Exhibit 44 to Precision Planting LLC and AGCO Corporation's initial invalidity contentions relating to U.S. Pat. No. 4,306,509 ("Hassan"), served Jul. 12, 2019, in 71 pages.
Exhibit 45 to Precision Planting LLC and AGCO Corporation's initial invalidity contentions relating to U.S. Pat. No. 4,324,347 to Thomas ("Thomas"), served Jul. 12, 2019, in 68 pages.
Exhibit 46 to Precision Planting LLC and AGCO Corporation's initial invalidity contentions relating to U.S. Pat. No. 4,449,642 ("Dooley"), served Jul. 12, 2019, in 130 pages.
Exhibit 47 to Precision Planting LLC and AGCO Corporation's initial invalidity contentions relating to U.S. Pat. No. 4,450,979 to Deckler ("Deckler '979"), served Jul. 12, 2019, in 79 pages.
Exhibit 48 to Precision Planting LLC and AGCO Corporation's initial invalidity contentions relating to U.S. Pat. No. 4,519,494 to McEvoy ("McEvoy"), served Jul. 12, 2019, in 55 pages.
Exhibit 49 to Precision Planting LLC and AGCO Corporation's initial invalidity contentions relating to U.S. Pat. No. 4,628,841 to Powilleit ("Powilleit"), served Jul. 12, 2019, in 79 pages.
Exhibit 50 to Precision Planting LLC and AGCO Corporation's initial invalidity contentions relating to U.S. Pat. No. 4,896,615 to Hood et al. ("Hood"), served Jul. 12, 2019, in 81 pages.
Exhibit 51 to Precision Planting LLC and AGCO Corporation's initial invalidity contentions relating to U.S. Pat. No. 4,915,258 to Olson ("Olson"), served Jul. 12, 2019, in 74 pages.
Exhibit 52 to Precision Planting LLC and AGCO Corporation's initial invalidity contentions relating to U.S. Pat. No. 5,058,766 to Deckler ("Deckler '766"), served Jul. 12, 2019, in 69 pages.
Exhibit 53 to Precision Planting LLC and AGCO Corporation's initial invalidity contentions relating to U.S. Pat. No. 5,167,317 to Van der Schoot ("Van der Schoot"), served Jul. 12, 2019, in 56 pages.
Exhibit 54 to Precision Planting LLC and AGCO Corporation's initial invalidity contentions relating to U.S. Pat. No. 5,402,741 to Traux et al. ("Traux"), served Jul. 12, 2019, in 74 pages.
Exhibit 55 to Precision Planting LLC and AGCO Corporation's initial invalidity contentions relating to U.S. Pat. No. 5,431,117 to Steffens et al. ("Steffens"), served Jul. 12, 2019, in 66 pages.
Exhibit 56 to Precision Planting LLC and AGCO Corporation's initial invalidity contentions relating to U.S. Pat. No. 5,784,985 to Lodico et al. ("Lodico"), served Jul. 12, 2019, in 68 pages.
Exhibit 57 to Precision Planting LLC and AGCO Corporation's initial invalidity contentions relating to U.S. Pat. No. 5,802,994 to Kinkead ("Kinkead"), served Jul. 12, 2019, in 67 pages.
Exhibit 58 to Precision Planting LLC and AGCO Corporation's initial invalidity contentions relating to U.S. Pat. No. 5,918,726 ("Temmink"), served Jul. 12, 2019, in 106 pages.
Exhibit 59 to Precision Planting LLC and AGCO Corporation's initial invalidity contentions relating to U.S. Pat. No. 5,992,338 ("Romans"), served Jul. 12, 2019, in 159 pages.
Exhibit 60 to Precision Planting LLC and AGCO Corporation's initial invalidity contentions relating to U.S. Pat. No. 6,000,528(A) to Van Maanen ("Van Maanen"), served Jul. 12, 2019, in 64 pages.
Exhibit 61 to Precision Planting LLC and AGCO Corporation's initial invalidity contentions relating to U.S. Pat. No. 6,173,664 to Heimbuch ("Heimbuch"), served Jul. 12, 2019, in 71 pages.
Exhibit 62 to Precision Planting LLC and AGCO Corporation's initial invalidity contentions relating to U.S. Pat. No. 6,244,201 to Mauch et al. ("Mauch"), served Jul. 12, 2019, in 85 pages.
Exhibit 63 to Precision Planting LLC and AGCO Corporation's initial invalidity contentions relating to U.S. Pat. No. 6,269,758 to Sauder ("Sauder '758"), served Jul. 12, 2019, in 72 pages.
Exhibit 64 to Precision Planting LLC and AGCO Corporation's initial invalidity contentions relating to U.S. Pat. No. 6,352,042 to Martin et al. ("Martin'042"), served Jul. 12, 2019, in 67 pages.
Exhibit 65 to Precision Planting LLC and AGCO Corporation's initial invalidity contentions relating to U.S. Pat. No. 6,516,733 to Sauder et al. ("Sauder '733"), served Jul. 12, 2019, in 108 pages.
Exhibit 66 to Precision Planting LLC and AGCO Corporation's initial invalidity contentions relating to U.S. Pat. No. 6,581,535 ("Barry"), served Jul. 12, 2019, in 62 pages.
Exhibit 67 to Precision Planting LLC and AGCO Corporation's initial invalidity contentions relating to U.S. Pat. No. 6,651,570 to Thiemke ("Thiemke"), served Jul. 12, 2019, in 90 pages.
Exhibit 68 to Precision Planting LLC and AGCO Corporation's initial invalidity contentions relating to U.S. Pat. No. 6,681,706 to Sauder et al. ("Sauder '706"), served Jul. 12, 2019, in 157 pages.
Exhibit 69 to Precision Planting LLC and AGCO Corporation's initial invalidity contentions relating to U.S. Pat. No. 6,748,885 ("Sauder '885"), served Jul. 12, 2019, in 210 pages.
Exhibit 70 to Precision Planting LLC and AGCO Corporation's initial invalidity contentions relating to U.S. Pat. No. 6,932,236 to Ven Huizen ("Ven Huizen '236"), served Jul. 12, 2019, in 78 pages.
Exhibit 71 to Precision Planting LLC and AGCO Corporation's initial invalidity contentions relating to U.S. Pat. No. 7,086,269 ("Sauder '269"), served Jul. 12, 2019, in 125 pages.
Exhibit 72 to Precision Planting LLC and AGCO Corporation's initial invalidity contentions relating to U.S. Pat. No. 7,162,963 to Sauder ("Sauder '963"), served Jul. 12, 2019, in 116 pages.
Exhibit 73 to Precision Planting LLC and AGCO Corporation's initial invalidity contentions relating to U.S. Pat. No. 7,490,565 B2 to Holly ("Holly '565"), served Jul. 12, 2019, in 86 pages.
Exhibit 74 to Precision Planting LLC and AGCO Corporation's initial invalidity contentions relating to U.S. Pat. No. 7,617,785 to Wendte ("Wendte"), served Jul. 12, 2019, in 76 pages.
Exhibit 75 to Precision Planting LLC and AGCO Corporation's initial invalidity contentions relating to U.S. Pat. No. 7,631,606 B2 to Sauder et al. ("Sauder '606"), served Jul. 12, 2019, in 81 pages.
Exhibit 76 to Precision Planting LLC and AGCO Corporation's initial invalidity contentions relating to U.S. Pat. No. 7,938,073 to Dunham et al. ("Dunham"), served Jul. 12, 2019, in 87 pages.
Exhibit 77 to Precision Planting LLC and AGCO Corporation's initial invalidity contentions relating to William Rowlan Ritchie, Aspects of Seed Transfer Within a Direct Drilling Coulter (Opener) (1982) (M.S. thesis, Massey University) (on file with author) ("Ritchie"), served Jul. 12, 2019, in 72 pages.
Exhibit 78 to Precision Planting LLC and AGCO Corporation's initial invalidity contentions relating to Breece, et al., Fundamentals of Machine Operation (1981) ("Breece"), served Jul. 12, 2019, in 226 pages.
Exhibit 79 to Precision Planting LLC and AGCO Corporation's initial invalidity contentions relating to L.P. Bufton, The Influence of Seed-Drill Design on the Spatial Arrangement of Seedlings and on Seedling Emergence, 72 Acta Horticulturae 135 (1978) ("Bufton"), served Jul. 12, 2019, in 57 pages.
Exhibit A to the Final Joint Claim Construction Chart, relating to U.S. Pat. No. 8,813,663 to Garner et al., filed Oct. 25, 2019 (Dkt. No. 158-1), in 17 pages.
Exhibit AA to the Final Joint Claim Construction Chart, relating to selections from U.S. Appl. No. 14/505,829 to Garner et al., filed Oct. 25, 2019 (Dkt. No. 158-27).

(56) References Cited

OTHER PUBLICATIONS

Exhibit B to the Final Joint Claim Construction Chart, relating to U.S. Pat. No. 9,480,199 to Garner et al., filed Oct. 25, 2019 (Dkt. No. 158-2), in 17 pages.
Exhibit C to the Final Joint Claim Construction Chart, relating to U.S. Pat. No. 9,820,429 to Garner et al., filed Oct. 25, 2019 (Dkt. No. 158-3), in 18 pages.
Exhibit D to the Final Joint Claim Construction Chart, relating to U.S. Pat. No. 9,699,955 to Garner et al., filed Oct. 25, 2019 (Dkt. No. 158-4), in 18 pages.
Exhibit E to the Final Joint Claim Construction Chart, relating to U.S. Pat. No. 9,807,924 to Garner et al., filed Oct. 25, 2019 (Dkt. No. 158-5), in 18 pages.
Exhibit F to the Final Joint Claim Construction Chart, relating to U.S. Pat. No. 9,686,906 to Garner et al., filed Oct. 25, 2019 (Dkt. No. 158-6), in 18 pages.
Exhibit G to the Final Joint Claim Construction Chart, relating to U.S. Pat. No. 9,861,031 to Garner et al., filed Oct. 25, 2019 (Dkt. No. 158-7), in 17 pages.
Exhibit H to the Final Joint Claim Construction Chart, relating to U.S. Pat. No. 10,004,173 to Garner et al., filed Oct. 25, 2019 (Dkt. No. 158-8), in 18 pages.
Exhibit I to the Final Joint Claim Construction Chart, relating to U.S. Pat. No. 8,850,998 to Garner et al., filed Oct. 25, 2019 (Dkt. No. 158-9), in 23 pages.
Exhibit J to the Final Joint Claim Construction Chart, relating to U.S. Pat. No. 9,661,799 to Garner et al., filed Oct. 25, 2019 (Dkt. No. 158-10), in 24 pages.
Exhibit K to the Final Joint Claim Construction Chart, relating to U.S. Pat. No. 9,510,502 to Garner et al., filed Oct. 25, 2019 (Dkt. No. 158-11), in 33 pages.
Exhibit L to the Final Joint Claim Construction Chart, relating to U.S. Pat. No. 8,850,995 to Garner et al., filed Oct. 25, 2019 (Dkt. No. 158-12), in 17 pages.
Exhibit M to the Final Joint Claim Construction Chart, relating to selections from U.S. Appl. No. 13/943,561 to Garner et al., filed Oct. 25, 2019 (Dkt. No. 158-13).
Exhibit N to the Final Joint Claim Construction Chart, relating to selections from U.S. Appl. No. 14/254,463 to Garner et al., filed Oct. 25, 2019 (Dkt. No. 158-14).
Exhibit O to the Final Joint Claim Construction Chart, relating to selections from U.S. Appl. No. 14/254,463 to Garner et al., filed Oct. 25, 2019 (Dkt. No. 158-15).
Exhibit P to the Final Joint Claim Construction Chart, relating to selections from U.S. Appl. No. 14/617,497 to Garner et al., filed Oct. 25, 2019 (Dkt. No. 158-16).
Exhibit Q to the Final Joint Claim Construction Chart, relating to selections from U.S. Appl. No. 14/617,497 to Garner et al., filed Oct. 25, 2019 (Dkt. No. 158-17).
Exhibit R to the Final Joint Claim Construction Chart, relating to selections from U.S. Appl. No. 14/704,513 to Garner et al., filed Oct. 25, 2019 (Dkt. No. 158-18).
Exhibit S to the Final Joint Claim Construction Chart, relating to selections from U.S. Appl. No. 14/704,568 to Garner et al., filed Oct. 25, 2019 (Dkt. No. 158-19).
Exhibit T to the Final Joint Claim Construction Chart, relating to selections from U.S. Appl. No. 14/704,568 to Garner et al., filed Oct. 25, 2019 (Dkt. No. 158-20).
Exhibit U to the Final Joint Claim Construction Chart, relating to selections from U.S. Appl. No. 14/705,004 to Garner et al., filed Oct. 25, 2019 (Dkt. No. 158-21).
Exhibit V to the Final Joint Claim Construction Chart, relating to selections from U.S. Appl. No. 14/616,877 to Garner et al., filed Oct. 25, 2019 (Dkt. No. 158-22).
Exhibit W to the Final Joint Claim Construction Chart, relating to selections from U.S. Appl. No. 14/616,877 to Garner et al., filed Oct. 25, 2019 (Dkt. No. 158-23).
Exhibit X to the Final Joint Claim Construction Chart, relating to selections from U.S. Appl. No. 15/674,122 to Garner et al., filed Oct. 25, 2019 (Dkt. No. 158-24).
Exhibit Y to the Final Joint Claim Construction Chart, relating to selections from U.S. Appl. No. 13/072,051 to Garner et al., filed Oct. 25, 2019 (Dkt. No. 158-25).
Exhibit Z to the Final Joint Claim Construction Chart, relating to selections from U.S. Appl. No. 14/215,182 to Garner et al., filed Oct. 25, 2019 (Dkt. No. 158-26).
Exhibits 1-15 to Joint Claim Construction Brief, filed Oct. 25, 2019 (Dkt. No. 160-1), in 142 pages.
Exhibits 16-28 to Joint Claim Construction Brief, filed Oct. 25, 2019 (Dkt. No. 160-2), in 300 pages.
Exhibits 29-31 to Joint Claim Construction Brief, filed Oct. 25, 2019 (Dkt. No. 160-3), in 29 pages.
Exhibits 32-33 to Joint Claim Construction Brief, filed Oct. 25, 2019 (Dkt. No. 160-4), in 102 pages.
Extended European Search Report and Written Opinion issued in European Patent Application No. 10152013.8, dated May 27, 2010, in 7 pages (Dkt. No. 18616-EP-ORD).
Final Joint Claim Construction Chart, filed Oct. 25, 2019 (Dkt. No. 158), in 18 pages.
Joint Appendix B To Joint Claim Construction Brief, filed Oct. 25, 2019 (Dkt. No. 160), in 4 pages.
Joint Claim Construction Brief, filed Oct. 25, 2019 (Dkt. No. 159), in 143 pages.
Petition for Inter Partes Review of U.S. Pat. No. 10,004,173 filed on behalf of Precision Planting, LLC and AGCO Corp., filed on Jun. 3, 2019, in 108 pages.
Petition for Inter Partes Review of U.S. Pat. No. 8,813,663 filed on behalf of Precision Planting, LLC and AGCO Corp., filed on May 29, 2019, in 92 pages.
Petition for Inter Partes Review of U.S. Pat. No. 9,480,199 filed on behalf of Precision Planting, LLC and AGCO Corp., filed on May 31, 2019, in 90 pages.
Petition for Inter Partes Review of U.S. Pat. No. 9,686,906 filed on behalf of Precision Planting, LLC and AGCO Corp., filed on May 30, 2019, in 99 pages.
Petition for Inter Partes Review of U.S. Pat. No. 9,699,955 filed on behalf of Precision Planting, LLC and AGCO Corp., filed on May 31, 2019, in 90 pages.
Petition for Inter Partes Review of U.S. Pat. No. 9,807,924 filed on behalf of Precision Planting, LLC and AGCO Corp., filed on May 29, 2019, in 96 pages.
Petition for Inter Partes Review of U.S. Pat. No. 9,820,429 filed on behalf of Precision Planting, LLC and AGCO Corp., filed on May 31, 2019, in 102 pages.
Petition for Inter Partes Review of U.S. Pat. No. 9,861,031 filed on behalf of Precision Planting, LLC and AGCO Corp., filed on May 29, 2019, in 95 pages.
Precision Planting LLC and AGCO Corporation's initial invalidity contentions pursuant to Paragraph 4.d. of the District of Delaware Default Standard for Discovery, served Jul. 12, 2019, in 657 pages.
Ritchie, William Rowlan. Aspects of seed transfer within a direct drilling coulter (opener): a thesis presented in partial fulfilment of the requirements for the degree of Master of Agricultural Science in Agricultural Mechanisation at Massriey University. Diss. Massey University, 1982, in 162 pages.
International Search Report and Written Opinion, re PCT Application No. PCT/US2012/030306, mailed Jun. 20, 2012, in 12 pages (Dkt. No. P20316-2-WO).
Schmidt Ag Services | Seed (accessed on May 28, 2020), in 1 page. URL: https://schmidtag.com/seed/ (filed as Exhibit 1063 to the Inter Partes Review of U.S. Pat. No. 9,861,031 filed on behalf of Precision Planting, LLC and AGCO Corp.).
Chen, Jiafa, et al. "The genetic basis of natural variation in kernel size and related traits using a four-way cross population in maize." PLoS One 11.4 (2016): e0153428, in 12 pages (filed as Exhibit 1138 to the Inter Partes Review of U.S. Pat. No. 9,861,031 filed on behalf of Precision Planting, LLC and AGCO Corp.).
Deere Abandons Proposed Acquisition of Precision Planting from Monsanto | Decision to Terminate Deal Preserves Competition in High-Speed Precision Planting Systems Market (published on May 1, 2017) (accessed on May 27, 2020), in 2 pages. URL: https://www.justice.gov/opa/pr/deere-abandons-proposed-acquisition-precision-planting-monsanto (filed as Exhibit 1077 to the Inter

(56) References Cited

OTHER PUBLICATIONS

Partes Review of U.S. Pat. No. 9,861,031 filed on behalf of Precision Planting, LLC and AGCO Corp.).
Excerpt(s) from Berube, Margery S., and David A. Jost, eds. The American heritage college dictionary. Houghton Mifflin, 2010 (definition of accelerate), in 3 pages (filed as Exhibit 1071 to the Inter Partes Review of U.S. Pat. No. 9,861,031 filed on behalf of Precision Planting, LLC and AGCO Corp.).
Excerpt(s) from Cald, I. "Cambridge Advanced Learner's Dictionary, ed. by Patrick Gillard, Kate Woodford & Guy Jackson." (2003), in 3 pages (filed as Exhibit 1033 to the Inter Partes Review of U.S. Pat. No. 9,807,922 filed on behalf of Precision Planting, LLC and AGCO Corp.).
Excerpt(s) from Dictionary, Concise Oxford English. "Edited by Catherine Soanes and Angus Stevenson." (2008) (definition of capture), in 3 pages (filed as Exhibit 1116 to the Inter Partes Review of U.S. Pat. No. 9,861,031 filed on behalf of Precision Planting, LLC and AGCO Corp.).
Excerpt(s) from Dictionary, Concise Oxford English. "Edited by Catherine Soanes and Angus Stevenson." (2008) (definition of adjacent), in 3 pages (filed as Exhibit 1144 to the Inter Partes Review of U.S. Pat. No. 9,820,429 filed on behalf of Precision Planting, LLC and AGCO Corp.).
Excerpt(s) from Grove, Phillip. Webster's third new international dictionary. Merriam-Webster Incorporated, 2002 (definition of sweep), in 3 pages (filed as Exhibit 1032 to the Inter Partes Review of U.S. Pat. No. 9,820,429 filed on behalf of Precision Planting, LLC and AGCO Corp.).
Excerpt(s) from Grove, Phillip. Webster's third new international dictionary. Merriam-Webster Incorporated, 2002 (definition of nip), in 4 pages (filed as Exhibit 1025 to the Inter Partes Review of U.S. Pat. No. 9,699,955 filed on behalf of Precision Planting, LLC and AGCO Corp.).
Excerpt(s) from Guralnik, David Bernard, and Michael Agnes. Webster's new world college dictionary. Wiley Pub., 2009 (definition of adjacent), in 3 pages (filed as Exhibit 1145 to the Inter Partes Review of U.S. Pat. No. 9,820,429 filed on behalf of Precision Planting, LLC and AGCO Corp.).
Excerpt(s) from Hunt, Donnell. Farm power and machinery management. Waveland Press, 2008, in 6 pages (filed as Exhibit 1128 to the Inter Partes Review of U.S. Pat. No. 9,861,031 filed on behalf of Precision Planting, LLC and AGCO Corp.).
Excerpt(s) from Kramer, Samuel Noah. "History Begins at Sumer: Twenty-seven Firsts." Man's Recorded History (1959), in 13 pages (filed as Exhibit 1019 to the Inter Partes Review of U.S. Pat. No. 8,813,663 filed on behalf of Precision Planting, LLC and AGCO Corp.).
Excerpt(s) from Staff, Merriam-Webster. Merriam-Webster's collegiate dictionary. vol. 2. Merriam-Webster, 2004 (definition of nip), in 3 pages (filed as Exhibit 1026 to the Inter Partes Review of U.S. Pat. No. 9,699,955 filed on behalf of Precision Planting, LLC and AGCO Corp.).
Excerpts from Kepner, R. A., R. Bainer, and E. L. Barger. "Principles of farm machinery third edition." (1978), in 12 pages (filed as Exhibit 1106 to the Inter Partes Review of U.S. Pat. No. 9,861,031 filed on behalf of Precision Planting, LLC and AGCO Corp.).
Excerpts from Waite, Maurice. Oxford American desk dictionary and thesaurus. Oxford University Press (definition of loop), in 3 pages (filed as Exhibit 1110 to the Inter Partes Review of U.S. Pat. No. 9,861,031 filed on behalf of Precision Planting, LLC and AGCO Corp.).
Exhibit 1002 to Petition for Inter Partes Review of U.S. Pat. No. 9,510,502 filed on behalf of Precision Planting, LLC and AGCO Corp.: Declaration of Randal K. Taylor, filed on May 24, 2019, in 130 pages.
Exhibit 1094 to the Inter Partes Review of U.S. Pat. No. 9,861,031 filed on behalf of Precision Planting, LLC and AGCO Corp., Comparison of Petitioner's Proposed Combination and SpeedTube, filed Jun. 26, 2020, in 1 page.

Exhibit 1135 to Reply to Patent Owner Response for the Inter Partes Review of U.S. Pat. No. 9,861,031 filed on behalf of Precision Planting, LLC and AGCO Corp.: Reply Declaration of Douglas S. Prairie in Support of Petitioners' Reply to Patent Owner Response, filed Jun. 26, 2020, in 125 pages.
Exhibit 1135 to Reply to Patent Owner Response for the Inter Partes Review of U.S. Pat. No. 9,820,429 filed on behalf of Precision Planting, LLC and AGCO Corp.: Reply Declaration of Douglas S. Prairie in Support of Petitioners' Reply to Patent Owner Response, filed Jul. 31, 2020 in 128 pages.
Exhibit 1135 to Reply to Patent Owner Response for the Inter Partes Review of U.S. Pat. No. 10,004,173 filed on behalf of Precision Planting, LLC and AGCO Corp.: Reply Declaration of Douglas S. Prairie in Support of Petitioners' Reply to Patent Owner Response, filed Jul. 31, 2020, in 129 pages.
Exhibit 1135 to Reply to Patent Owner Response for the Inter Partes Review of U.S. Pat. No. 9,807,924 filed on behalf of Precision Planting, LLC and AGCO Corp.: Reply Declaration of Randal Taylor in Support of Petitioners' Reply to Patent Owner Response, filed Jun. 26, 2020, in 97 pages.
Exhibit 1135 to Reply to Patent Owner Response for the Inter Partes Review of U.S. Pat. No. 8,813,663 filed on behalf of Precision Planting, LLC and AGCO Corp.: Reply Declaration of Douglas S. Prairie in Support of Petitioners' Reply to Patent Owner Response, filed Jun. 26, 2020, in 124 pages.
Exhibit 1135 to Reply to Patent Owner Response for the Inter Partes Review of U.S. Pat. No. 9,807,922 filed on behalf of Precision Planting, LLC and AGCO Corp.: Reply Declaration of Douglas S. Prairie in Support of Petitioners' Reply to Patent Owner Response, filed Aug. 3, 2020, in 83 pages.
Exhibit 1135 to Reply to Patent Owner Response for the Inter Partes Review of U.S. Pat. No. 9,480,199 filed on behalf of Precision Planting, LLC and AGCO Corp.: Reply Declaration of Douglas S. Prairie in Support of Petitioners' Reply to Patent Owner Response, filed Jun. 29, 2020, in 128 pages.
Exhibit 1135 to Reply to Patent Owner Response for the Inter Partes Review of U.S. Pat. No. 9,686,906 filed on behalf of Precision Planting, LLC and AGCO Corp.: Reply Declaration of Randal Taylor in Support of Petitioners' Reply to Patent Owner Response, filed Jun. 26, 2020, in 99 pages.
Exhibit 1135 to Reply to Patent Owner Response for the Inter Partes Review of U.S. Pat. No. 9,699,955 filed on behalf of Precision Planting, LLC and AGCO Corp.: Reply Declaration of Douglas S. Prairie in Support of Petitioners' Reply to Patent Owner Response, filed Jun. 29, 2020, in 119 pages.
Exhibit 1141 to the Inter Partes Review of U.S. Pat. No. 10,004,173 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 8,813,663 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,480,199 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,686,906 filed on behalf of Precision Planting, LLC and AGCO Corp.: Declaration of Myles McDonagh, filed Aug. 17, 2020, in 5 pages.
Exhibit 1141 to the Inter Partes Review of U.S. Pat. No. 9,699,955 filed on behalf of Precision Planting, LLC and AGCO Corp.: Declaration of Myles McDonagh, filed Aug. 17, 2020, in 6 pages.
Exhibit 1141 to the Inter Partes Review of U.S. Pat. No. 9,807,922 filed on behalf of Precision Planting, LLC and AGCO Corp.: Declaration of Myles McDonagh, filed Aug. 3, 2020, in 6 pages.
Exhibit 1141 to the Inter Partes Review of U.S. Pat. No. 9,807,924 filed on behalf of Precision Planting, LLC and AGCO Corp.: Declaration of Myles McDonagh, filed Aug. 17, 2020, in 5 pages.
Exhibit 1141 to the Inter Partes Review of U.S. Pat. No. 9,820,429 filed on behalf of Precision Planting, LLC and AGCO Corp.: Declaration of Myles McDonagh, filed Jul. 30, 2020, in 6 pages.
Exhibit 1141 to the Inter Partes Review of U.S. Pat. No. 9,861,031 filed on behalf of Precision Planting, LLC and AGCO Corp.: Declaration of Myles McDonagh, filed Aug. 17, 2020, in 6 pages.

(56) References Cited

OTHER PUBLICATIONS

Exhibit 1146-1 to the Inter Partes Review of U.S. Pat. No. 10,004,173 filed on behalf of Precision Planting, LLC and AGCO Corp.: Petitioners' Trial Hearing Presentation—Part 1 of 3, filed Oct. 1, 2020, in 93 pages.
Exhibit 1146-1 to the Inter Partes Review of U.S. Pat. No. 9,807,922 filed on behalf of Precision Planting, LLC and AGCO Corp.: Petitioners' Trial Hearing Presentation—Part 1 of 3, filed Oct. 1, 2020, in 93 pages.
Exhibit 1146-1 to the Inter Partes Review of U.S. Pat. No. 9,820,429 filed on behalf of Precision Planting, LLC and AGCO Corp.: Petitioners' Trial Hearing Presentation—Part 1 of 3, filed Oct. 1, 2020, in 93 pages.
Exhibit 1146-2 to the Inter Partes Review of U.S. Pat. No. 10,004,173 filed on behalf of Precision Planting, LLC and AGCO Corp.: Petitioners' Trial Hearing Presentation—Part 2 of 3, filed Oct. 1, 2020, in 84 pages.
Exhibit 1146-2 to the Inter Partes Review of U.S. Pat. No. 9,807,922 filed on behalf of Precision Planting, LLC and AGCO Corp.: Petitioners' Trial Hearing Presentation—Part 2 of 3, filed Oct. 1, 2020, in 84 pages.
Exhibit 1146-2 to the Inter Partes Review of U.S. Pat. No. 9,820,429 filed on behalf of Precision Planting, LLC and AGCO Corp.: Petitioners' Trial Hearing Presentation—Part 2 of 3, filed Oct. 1, 2020, in 84 pages.
Exhibit 1146-3 to the Inter Partes Review of U.S. Pat. No. 10,004,173 filed on behalf of Precision Planting, LLC and AGCO Corp.: Petitioners' Trial Hearing Presentation—Part 3 of 3, filed Oct. 1, 2020, in 106 pages.
Exhibit 1146-3 to the Inter Partes Review of U.S. Pat. No. 9,807,922 filed on behalf of Precision Planting, LLC and AGCO Corp.: Petitioners' Trial Hearing Presentation—Part 3 of 3, filed Oct. 1, 2020, in 106 pages.
Exhibit 1146-3 to the Inter Partes Review of U.S. Pat. No. 9,820,429 filed on behalf of Precision Planting, LLC and AGCO Corp.: Petitioners' Trial Hearing Presentation—Part 3 of 3, filed Oct. 1, 2020, in 106 pages.
Exhibit 1147-1 to the Inter Partes Review of U.S. Pat. No. 8,813,663 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,480,199 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,686,906 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,699,955 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,807,924 filed on behalf of Precision Planting, LLC and AGCO Corp.: Petitioners' Trial Hearing Presentation—Part 1 of 2, filed Aug. 21, 2020, in 150 pages.
Exhibit 1147-1 to the Inter Partes Review of U.S. Pat. No. 9,861,031 filed on behalf of Precision Planting, LLC and AGCO Corp.: Petitioners' Trial Hearing Presentation—Part 1 of 2, filed Aug. 21, 2020, in 150 pages.
Exhibit 1147-2 to the Inter Partes Review of U.S. Pat. No. 8,813,663 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,480,199 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,686,906 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,699,955 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,807,924 filed on behalf of Precision Planting, LLC and AGCO Corp.: Petitioners' Trial Hearing Presentation—Part 2 of 2, filed Aug. 21, 2020, in 143 pages.
Exhibit 1147-2 to the Inter Partes Review of U.S. Pat. No. 9,861,031 filed on behalf of Precision Planting, LLC and AGCO Corp.: Petitioners' Trial Hearing Presentation—Part 2 of 2, filed Aug. 21, 2020, in 143 pages.
Exhibit 2018 to the Inter Partes Review of U.S. Pat. No. 10,004,173 filed on behalf of Precision Planting, LLC and AGCO Corp.: Declaration of Randal K. Taylor, filed Nov. 14, 2019, in 156 pages.
Exhibit 2018 to the Inter Partes Review of U.S. Pat. No. 9,699,955 filed on behalf of Precision Planting, LLC and AGCO Corp.: Declaration of Randal K. Taylor, filed Nov. 14, 2019, in 156 pages.
Exhibit 2018 to the Inter Partes Review of U.S. Pat. No. 9,807,922 filed on behalf of Precision Planting, LLC and AGCO Corp.: Declaration of Randal K. Taylor, filed Nov. 14, 2019, in 156 pages.
Exhibit 2025 to the Inter Partes Review of U.S. Pat. No. 10,004,173 filed on behalf of Precision Planting, LLC and AGCO Corp.: Declaration of Daniel B. Thiemke, filed Apr. 22, 2020, in 15 pages.
Exhibit 2025 to the Inter Partes Review of U.S. Pat. No. 8,813,663 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,480,199 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,686,906 filed on behalf of Precision Planting, LLC and AGCO Corp.: Declaration of Daniel B. Thiemke, filed Mar. 20, 2020, in 15 pages.
Exhibit 2025 to the Inter Partes Review of U.S. Pat. No. 9,699,955 filed on behalf of Precision Planting, LLC and AGCO Corp.: Declaration of Daniel B. Thiemke, filed Mar. 24, 2020, in 15 pages.
Exhibit 2025 to the Inter Partes Review of U.S. Pat. No. 9,807,922 filed on behalf of Precision Planting, LLC and AGCO Corp.: Declaration of Daniel B. Thiemke, filed Apr. 27, 2020, in 15 pages.
Exhibit 2025 to the Inter Partes Review of U.S. Pat. No. 9,807,924 filed on behalf of Precision Planting, LLC and AGCO Corp.: Declaration of Daniel B. Thiemke, filed Mar. 24, 2020, in 15 pages.
Exhibit 2025 to the Inter Partes Review of U.S. Pat. No. 9,820,429 filed on behalf of Precision Planting, LLC and AGCO Corp.: Declaration of Daniel B. Thiemke, filed Apr. 23, 2020, in 15 pages.
Exhibit 2025 to the Inter Partes Review of U.S. Pat. No. 9,861,031 filed on behalf of Precision Planting, LLC and AGCO Corp.: Declaration of Daniel B. Thiemke, filed Mar. 24, 2020, in 15 pages.
Exhibit 2031 to the Inter Partes Review of U.S. Pat. No. 10,004,173 filed on behalf of Precision Planting, LLC and AGCO Corp.: Declaration of Rodney L. Schmidt, filed Apr. 22, 2020, in 9 pages.
Exhibit 2031 to the Inter Partes Review of U.S. Pat. No. 8,813,663 filed on behalf of Precision Planting, LLC and AGCO Corp.: Declaration of Rodney L. Schmidt, filed Mar. 20, 2020, in 9 pages.
Exhibit 2031 to the Inter Partes Review of U.S. Pat. No. 9,480,199 filed on behalf of Precision Planting, LLC and AGCO Corp.: Declaration of Rodney L. Schmidt, filed Mar. 20, 2020, in 9 pages.
Exhibit 2031 to the Inter Partes Review of U.S. Pat. No. 9,686,906 filed on behalf of Precision Planting, LLC and AGCO Corp.: Declaration of Rodney L. Schmidt, filed Mar. 20, 2020, in 9 pages.
Exhibit 2031 to the Inter Partes Review of U.S. Pat. No. 9,699,955 filed on behalf of Precision Planting, LLC and AGCO Corp.: Declaration of Rodney L. Schmidt, filed Mar. 24, 2020, in 9 pages.
Exhibit 2031 to the Inter Partes Review of U.S. Pat. No. 9,807,922 filed on behalf of Precision Planting, LLC and AGCO Corp.: Declaration of Rodney L. Schmidt, filed Apr. 27, 2020, in 9 pages.
Exhibit 2031 to the Inter Partes Review of U.S. Pat. No. 9,807,924 filed on behalf of Precision Planting, LLC and AGCO Corp.: Declaration of Rodney L. Schmidt, filed Mar. 24, 2020, in 9 pages.

(56) References Cited

OTHER PUBLICATIONS

Exhibit 2031 to the Inter Partes Review of U.S. Pat. No. 9,820,429 filed on behalf of Precision Planting, LLC and AGCO Corp.: Declaration of Rodney L. Schmidt, filed Apr. 23, 2020, in 9 pages.
Exhibit 2031 to the Inter Partes Review of U.S. Pat. No. 9,861,031 filed on behalf of Precision Planting, LLC and AGCO Corp.: Declaration of Rodney L. Schmidt, filed Mar. 24, 2020, in 9 pages.
Exhibit 2032 to the Inter Partes Review of U.S. Pat. No. 10,004,173 filed on behalf of Precision Planting, LLC and AGCO Corp.: Declaration of Lucas Veale, filed Apr. 22, 2020, in 11 pages.
Exhibit 2032 to the Inter Partes Review of U.S. Pat. No. 8,813,663 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,480,199 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,686,906 filed on behalf of Precision Planting, LLC and AGCO Corp.: Declaration of Lucas Veale, filed Mar. 20, 2020, in 11 pages.
Exhibit 2032 to the Inter Partes Review of U.S. Pat. No. 9,699,955 filed on behalf of Precision Planting, LLC and AGCO Corp.: Declaration of Lucas Veale, filed Mar. 24, 2020, in 11 pages.
Exhibit 2032 to the Inter Partes Review of U.S. Pat. No. 9,807,922 filed on behalf of Precision Planting, LLC and AGCO Corp.: Declaration of Lucas Veale, filed Apr. 27, 2020, in 11 pages.
Exhibit 2032 to the Inter Partes Review of U.S. Pat. No. 9,807,924 filed on behalf of Precision Planting, LLC and AGCO Corp.: Declaration of Lucas Veale, filed Mar. 24, 2020, in 11 pages.
Exhibit 2032 to the Inter Partes Review of U.S. Pat. No. 9,861,031 filed on behalf of Precision Planting, LLC and AGCO Corp.: Declaration of Lucas Veale, filed Mar. 24, 2020, in 11 pages.
Exhibit 2033 to the Inter Partes Review of U.S. Pat. No. 10,004,173 filed on behalf of Precision Planting, LLC and AGCO Corp.: Redacted Declaration of William R. Hough, filed Apr. 22, 2020, in 24 pages.
Exhibit 2033 to the Inter Partes Review of U.S. Pat. No. 8,813,663 filed on behalf of Precision Planting, LLC and AGCO Corp.: Redacted Declaration of William R. Hough, filed Mar. 20, 2020, in 24 pages.
Exhibit 2033 to the Inter Partes Review of U.S. Pat. No. 9,480,199 filed on behalf of Precision Planting, LLC and AGCO Corp.: Redacted Declaration of William R. Hough, filed Mar. 20, 2020, in 24 pages.
Exhibit 2033 to the Inter Partes Review of U.S. Pat. No. 9,686,906 filed on behalf of Precision Planting, LLC and AGCO Corp.: Redacted Declaration of William R. Hough, filed Mar. 20, 2020, in 24 pages.
Exhibit 2033 to the Inter Partes Review of U.S. Pat. No. 9,699,955 filed on behalf of Precision Planting, LLC and AGCO Corp.: Redacted Declaration of William R. Hough, filed Mar. 24, 2020, in 24 pages.
Exhibit 2033 to the Inter Partes Review of U.S. Pat. No. 9,807,922 filed on behalf of Precision Planting, LLC and AGCO Corp.: Redacted Declaration of William R. Hough, filed Apr. 27, 2020, in 24 pages.
Exhibit 2033 to the Inter Partes Review of U.S. Pat. No. 9,807,924 filed on behalf of Precision Planting, LLC and AGCO Corp.: Redacted Declaration of William R. Hough, filed Mar. 24, 2020, in 24 pages.
Exhibit 2033 to the Inter Partes Review of U.S. Pat. No. 9,820,429 filed on behalf of Precision Planting, LLC and AGCO Corp.: Redacted Declaration of William R. Hough, filed Apr. 23, 2020, in 24 pages.
Exhibit 2033 to the Inter Partes Review of U.S. Pat. No. 9,861,031 filed on behalf of Precision Planting, LLC and AGCO Corp.: Redacted Declaration of William R. Hough, filed Mar. 24, 2020, in 24 pages.
Exhibit 2200 to Patent Owner Response for the Inter Partes Review of U.S. Pat. No. 8,813,663 filed on behalf of Precision Planting, LLC and AGCO Corp.: Declaration of Dr. James L. Glancey, Ph.D., P.E., filed Mar. 20, 2020, in 303 pages.
Exhibit 2201 to Patent Owner Response for the Inter Partes Review of U.S. Pat. No. 9,861,031 filed on behalf of Precision Planting, LLC and AGCO Corp.: Declaration of Dr. James L. Glancey, Ph.D., P.E., filed Mar. 24, 2020, in 304 pages.
Exhibit 2202 to Patent Owner Response for the Inter Partes Review of U.S. Pat. No. 9,699,955 filed on behalf of Precision Planting, LLC and AGCO Corp.: Declaration of Dr. James L. Glancey, Ph.D., P.E., filed Mar. 24, 2020, in 307 pages.
Exhibit 2203 to Patent Owner Response for the Inter Partes Review of U.S. Pat. No. 10,004,173 filed on behalf of Precision Planting, LLC and AGCO Corp.: Declaration of Dr. James L. Glancey, Ph.D., P.E., filed Apr. 22, 2020, in 315 pages.
Exhibit 2204 to Patent Owner Response for the Inter Partes Review of U.S. Pat. No. 9,820,429 filed on behalf of Precision Planting, LLC and AGCO Corp.: Declaration of Dr. James L. Glancey, Ph.D., P.E., filed Apr. 23, 2020, in 334 pages.
Exhibit 2205 to Patent Owner Response for the Inter Partes Review of U.S. Pat. No. 9,480,199 filed on behalf of Precision Planting, LLC and AGCO Corp.: Declaration of Dr. James L. Glancey, Ph.D., P.E., filed Mar. 20, 2020, in 297 pages.
Exhibit 2206 to Patent Owner Response for the Inter Partes Review of U.S. Pat. No. 9,686,906 filed on behalf of Precision Planting, LLC and AGCO Corp.: Declaration of Dr. James L. Glancey, Ph.D., P.E., filed Mar. 20, 2020, in 266 pages.
Exhibit 2207 to Patent Owner Response for the Inter Partes Review of U.S. Pat. No. 9,807,924 filed on behalf of Precision Planting, LLC and AGCO Corp.: Declaration of Dr. James L. Glancey, Ph.D., P.E., filed Mar. 24, 2020, in 269 pages.
Exhibit 2208 to Patent Owner Response for the Inter Partes Review of U.S. Pat. No. 9,807,922 filed on behalf of Precision Planting, LLC and AGCO Corp.: Declaration of Dr. James L. Glancey, Ph.D., P.E., filed Apr. 27, 2020, in 174 pages.
Exhibit 2230 to the Inter Partes Review of U.S. Pat. No. 8,813,663 filed on behalf of Precision Planting, LLC and AGCO Corp.: Declaration of Raj Paul, filed Mar. 20, 2020, in 29 pages.
Exhibit 2231 to the Inter Partes Review of U.S. Pat. No. 9,861,031 filed on behalf of Precision Planting, LLC and AGCO Corp.: Declaration of Raj Paul, filed Mar. 24, 2020, in 29 pages.
Exhibit 2232 to the Inter Partes Review of U.S. Pat. No. 9,699,955 filed on behalf of Precision Planting, LLC and AGCO Corp.: Declaration of Raj Paul, filed Mar. 24, 2020, in 29 pages.
Exhibit 2233 to the Inter Partes Review of U.S. Pat. No. 10,004,173 filed on behalf of Precision Planting, LLC and AGCO Corp.: Declaration of Raj Paul, filed Apr. 22, 2020, in 29 pages.
Exhibit 2234 to the Inter Partes Review of U.S. Pat. No. 9,820,429 filed on behalf of Precision Planting, LLC and AGCO Corp.: Declaration of Raj Paul, filed Apr. 23, 2020, in 30 pages.
Exhibit 2235 to the Inter Partes Review of U.S. Pat. No. 9,480,199 filed on behalf of Precision Planting, LLC and AGCO Corp.: Declaration of Raj Paul, filed Mar. 20, 2020, in 29 pages.
Exhibit 2236 to the Inter Partes Review of U.S. Pat. No. 9,686,906 filed on behalf of Precision Planting, LLC and AGCO Corp.: Declaration of Raj Paul, filed Mar. 20, 2020, in 29 pages.
Exhibit 2237 to the Inter Partes Review of U.S. Pat. No. 9,807,924 filed on behalf of Precision Planting, LLC and AGCO Corp.: Declaration of Raj Paul, filed Mar. 24, 2020, in 29 pages.
Exhibit 2238 to the Inter Partes Review of U.S. Pat. No. 9,807,922 filed on behalf of Precision Planting, LLC and AGCO Corp.: Declaration of Raj Paul, filed Apr. 27, 2020, in 29 pages.
Exhibit 2271 to the Inter Partes Review of U.S. Pat. No. 9,686,906 filed on behalf of Precision Planting, LLC and AGCO Corp.: Excerpt(s) from the Declaration of Dr. James L. Glancey, Ph.D., P.E., filed Aug. 5, 2020, in 6 pages.
Exhibit 2271 to the Inter Partes Review of U.S. Pat. No. 9,807,924 filed on behalf of Precision Planting, LLC and AGCO Corp.: Excerpt(s) from the Declaration of Dr. James L. Glancey, Ph.D., P.E., filed Aug. 7, 2020, in 6 pages.
Exhibit 2272 to the Inter Partes Review of U.S. Pat. No. 8,813,663 filed on behalf of Precision Planting, LLC and AGCO Corp.: Deere's Trial Demonstratives, filed Aug. 20, 2020, in 223 pages.

(56) References Cited

OTHER PUBLICATIONS

Exhibit 2272 to the Inter Partes Review of U.S. Pat. No. 9,480,199 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,686,906 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,699,955 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,807,924 filed on behalf of Precision Planting, LLC and AGCO Corp.: Deere's Trial Demonstratives, filed Aug. 20, 2020, in 223 pages.
Exhibit 2272 to the Inter Partes Review of U.S. Pat. No. 9,861,031 filed on behalf of Precision Planting, LLC and AGCO Corp.: Deere's Trial Demonstratives, filed Aug. 20, 2020, in 223 pages.
Exhibit 2275 to the Inter Partes Review of U.S. Pat. No. 10,004,173 filed on behalf of Precision Planting, LLC and AGCO Corp.: Deere's Trial Demonstratives, filed Oct. 2, 2020, in 250 pages.
Exhibit 2275 to the Inter Partes Review of U.S. Pat. No. 9,807,922 filed on behalf of Precision Planting, LLC and AGCO Corp.: Deere's Trial Demonstratives, filed Oct. 2, 2020, in 250 pages.
Exhibit 2275 to the Inter Partes Review of U.S. Pat. No. 9,820,429 filed on behalf of Precision Planting, LLC and AGCO Corp.: Deere's Trial Demonstratives, filed Oct. 2, 2020, in 250 pages.
Extended European Search Report and Written Opinion issued in European Patent Application No. 15152645.6, dated Jun. 18, 2015, in 6 pages (Dkt. No. P22396-EP-ORD).
Extended European Search Report and Written Opinion issued in European Patent Application No. 15152614.2, dated Jun. 18, 2015, 7 pages (Dkt. No. P22214-EP-ORD).
Extended European Search Report and Written Opinion issued in European Patent Application No. 15152071.5, dated Jun. 18, 2015, in 7 pages (Dkt. No. P22182-EP-ORD).
Extended European Search Report and Written Opinion issued in European Patent Application No. 15152076.4, dated Jun. 18, 2015, in 7 pages (Dkt. No. P22178-EP-ORD).
Extended European Search Report and Written Opinion issued in European Patent Application No. 12764844.2, dated Jun. 10, 2015, in 6 pages (Dkt. No. P20316-EP-1PCT).
Extended European Search Report and Written Opinion issued in European Patent Application No. 12763381.6, dated Jun. 12, 2015, in 6 pages (Dkt. No. P20316-EP-2PCT).
Extended European Search Report and Written Opinion issued in European Patent Application No. 12765056.2, dated Jun. 11, 2015, in 7 pages (Dkt. No. P20316-EP-3PCT).
Extended European Search Report and Written Opinion issued in European Patent Application No. 10736588.4, dated Jul. 16, 2013, in 9 pages (Dkt. No. 18582-EP-PCT).
Extended European Search Report and Written Opinion issued in European Patent Application No. 11862395.8, dated Jun. 9, 2015, in 6 pages (Dkt. No. 18582-EP-CIP1).
Extended European Search Report and Written Opinion issued in European Patent Application No. 11862750.4, dated Aug. 28, 2014, in 7 pages (Dkt. No. 18582-EP-CIP2).
Extended European Search Report and Written Opinion issued in European Patent Application No. 10152014.6, dated May 27, 2010, in 6 pages (Dkt. No. 18616-EP-ORD).
Field demo shows planter hits mark at high speed | The Western Producer (published on Sep. 5, 2015) (accessed on May 4, 2020), in 1 page. URL: https://www.producer.com/2014/09/field-demo-shows-planter-hits-mark-at-high-speed/ (filed as Exhibit 1104 to the Inter Partes Review of U.S. Pat. No. 9,861,031 filed on behalf of Precision Planting, LLC and AGCO Corp.).
Final Written Decision for the Inter Partes Review of U.S. Pat. No. 8,813,663 filed on behalf of Precision Planting, LLC and AGCO Corp., issued Nov. 30, 2020, in 49 pages.
Final Written Decision for the Inter Partes Review of U.S. Pat. No. 9,480,199 filed on behalf of Precision Planting, LLC and AGCO Corp., issued Nov. 30, 2020, in 39 pages.
Final Written Decision for the Inter Partes Review of U.S. Pat. No. 9,861,031 filed on behalf of Precision Planting, LLC and AGCO Corp., issued Dec. 4, 2020, in 49 pages.
Final Written Decision for the Inter Partes Review of U.S. Pat. No. 9,699,955 filed on behalf of Precision Planting, LLC and AGCO Corp., issued Dec. 15, 2020, in 48 pages.
Final Written Decision for the Inter Partes Review of U.S. Pat. No. 9,807,924 filed on behalf of Precision Planting, LLC and AGCO Corp., issued Dec. 15, 2020, in 42 pages.
Final Written Decision for the Inter Partes Review of U.S. Pat. No. 9,686,906 filed on behalf of Precision Planting, LLC and AGCO Corp., issued Dec. 2, 2020, in 37 pages.
Final Written Decision for the Inter Partes Review of U.S. Pat. No. 9,807,922 filed on behalf of Precision Planting, LLC and AGCO Corp., issued Dec. 28, 2020, in 45 pages.
Final Written Decision for the Inter Partes Review of U.S. Pat. No. 9,820,429 filed on behalf of Precision Planting, LLC and AGCO Corp., issued Dec. 31, 2020, in 47 pages.
Final Written Decision for the Inter Partes Review of U.S. Pat. No. 10,004,173 filed on behalf of Precision Planting, LLC and AGCO Corp., issued Jan. 11, 2021, in 46 pages.
History of IA Crops—Living History Farms | leaning-fields (accessed on May 28, 2020), in 2 pages. URL: https://www.lhf.org/learning-fields (filed as Exhibit 1064 to the Inter Partes Review of U.S. Pat. No. 9,861,031 filed on behalf of Precision Planting, LLC and AGCO Corp.).
International Search Report and Written Opinion, re PCT Application No. PCT/US2012/030281, mailed Jun. 20, 2012, in 6 pages (Dkt. No. P20316-WO).
International Search Report and Written Opinion, re PCT Application No. PCT/US2012/030326, mailed Mar. 18, 2013, in 8 pages (Dkt. No. P20316-3-WO).
Maestro delivers accurate corn seed placement at 10 m.p.h. | The Western Producer (published May 31, 2013) (accessed May 4, 2020), in 2 pages. URL: https://www.producer.com/2013/05/maestro-delivers-accurate-corn-seed-placement-at-10-m-p-h/ (filed as Exhibit 1103 to the Inter Partes Review of U.S. Pat. No. 9,861,031 filed on behalf of Precision Planting, LLC and AGCO Corp.).
Merriam-Webster.com Dictionary, (definition of just) (accessed on Jun. 7, 2020), in 13 pages). URL: https://www.merriam-webster.com/dictionary/just (filed as Exhibit 1095 to the Inter Partes Review of U.S. Pat. No. 9,861,031 filed on behalf of Precision Planting, LLC and AGCO Corp.).
Patent Owner Response for the Inter Partes Review of U.S. Pat. No. 9,861,031 filed on behalf of Precision Planting, LLC and AGCO Corp., filed Mar. 24, 2020, in 100 pages.
Patent Owner Response for the Inter Partes Review of U.S. Pat. No. 9,820,429 filed on behalf of Precision Planting, LLC and AGCO Corp., filed Apr. 23, 2020, in 114 pages.
Patent Owner Response for the Inter Partes Review of U.S. Pat. No. 10,004,173 filed on behalf of Precision Planting, LLC and AGCO Corp., filed Apr. 22, 2020, in 104 pages.
Patent Owner Response for the Inter Partes Review of U.S. Pat. No. 9,807,924 filed on behalf of Precision Planting, LLC and AGCO Corp., filed Mar. 24, 2020, in 91 pages.
Patent Owner Response for the Inter Partes Review of U.S. Pat. No. 8,813,663 filed on behalf of Precision Planting, LLC and AGCO Corp., filed Mar. 20, 2020, in 104 pages.
Patent Owner Response for the Inter Partes Review of U.S. Pat. No. 9,807,922 filed on behalf of Precision Planting, LLC and AGCO Corp., filed Apr. 27, 2020, in 64 pages.
Patent Owner Response for the Inter Partes Review of U.S. Pat. No. 9,480,199 filed on behalf of Precision Planting, LLC and AGCO Corp., filed Mar. 20, 2020, in 106 pages.
Patent Owner Response for the Inter Partes Review of U.S. Pat. No. 9,686,906 filed on behalf of Precision Planting, LLC and AGCO Corp., filed Mar. 20, 2020, in 90 pages.
Patent Owner Response for the Inter Partes Review of U.S. Pat. No. 9,699,955 filed on behalf of Precision Planting, LLC and AGCO Corp., filed Mar. 24, 2020, in 107 pages.
Patent Owner Sur-Reply for the Inter Partes Review of U.S. Pat. No. 10,004,173 filed on behalf of Precision Planting, LLC and AGCO Corp., filed Sep. 11, 2020, in 42 pages.

(56) References Cited

OTHER PUBLICATIONS

Patent Owner Sur-Reply for the Inter Partes Review of U.S. Pat. No. 9,807,922 filed on behalf of Precision Planting, LLC and AGCO Corp., filed Sep. 11, 2020, in 31 pages.
Patent Owner Sur-Reply for the Inter Partes Review of U.S. Pat. No. 9,861,031 filed on behalf of Precision Planting, LLC and AGCO Corp., filed Aug. 7, 2020, in 43 pages.
Patent Owner Sur-Reply for the Inter Partes Review of U.S. Pat. No. 9,820,429 filed on behalf of Precision Planting, LLC and AGCO Corp., filed Sep. 11, 2020, in 45 pages.
Patent Owner Sur-Reply for the Inter Partes Review of U.S. Pat. No. 9,807,924 filed on behalf of Precision Planting, LLC and AGCO Corp., filed Aug. 7, 2020, in 42 pages.
Patent Owner Sur-Reply for the Inter Partes Review of U.S. Pat. No. 8,813,663 filed on behalf of Precision Planting, LLC and AGCO Corp., filed Aug. 5, 2020, in 41 pages.
Patent Owner Sur-Reply for the Inter Partes Review of U.S. Pat. No. 9,480,199 filed on behalf of Precision Planting, LLC and AGCO Corp., filed Aug. 5, 2020, in 40 pages.
Patent Owner Sur-Reply for the Inter Partes Review of U.S. Pat. No. 9,686,906 filed on behalf of Precision Planting, LLC and AGCO Corp., filed Aug. 5, 2020, in 42 pages.
Patent Owner Sur-Reply for the Inter Partes Review of U.S. Pat. No. 9,699,955 filed on behalf of Precision Planting, LLC and AGCO Corp., filed Aug. 7, 2020, in 42 pages.
Petition for Inter Partes Review of U.S. Pat. No. 9,510,502 filed on behalf of Precision Planting, LLC and AGCO Corp., filed on May 24, 2019, in 77 pages.
Petition for Inter Partes Review of U.S. Pat. No. 9,807,922 filed on behalf of Precision Planting, LLC and AGCO Corp., filed on May 31, 2019, in 91 pages.
Exhibit 1002 to Petition for Inter Partes Review of U.S. Pat. No. 9,807,922 filed on behalf of Precision Planting, LLC and AGCO Corp.: Declaration of Douglas S. Prairie, filed on May 31, 2019, in 126 pages.
Reply to Patent Owner Response for the Inter Partes Review of U.S. Pat. No. 9,861,031 filed on behalf of Precision Planting, LLC and AGCO Corp., filed Jun. 26, 2020, in 40 pages.
Reply to Patent Owner Response for the Inter Partes Review of U.S. Pat. No. 9,820,429 filed on behalf of Precision Planting, LLC and AGCO Corp., filed Jul. 31, 2020, in 45 pages.
Reply to Patent Owner Response for the Inter Partes Review of U.S. Pat. No. 10,004,173 filed on behalf of Precision Planting, LLC and AGCO Corp., filed Jul. 31, 2020, in 40 pages.
Reply to Patent Owner Response for the Inter Partes Review of U.S. Pat. No. 9,807,924, filed on behalf of Precision Planting, LLC and AGCO Corp., filed Jun. 26, 2020, in 37 pages.
Reply to Patent Owner Response for the Inter Partes Review of U.S. Pat. No. 8,813,663 filed on behalf of Precision Planting, LLC and AGCO Corp., filed Jun. 26, 2020, in 41 pages.
Reply to Patent Owner Response for the Inter Partes Review of U.S. Pat. No. 9,807,922 filed on behalf of Precision Planting, LLC and AGCO Corp., filed Aug. 3, 2020, in 39 pages.
Reply to Patent Owner Response for the Inter Partes Review of U.S. Pat. No. 9,480,199 filed on behalf of Precision Planting, LLC and AGCO Corp., filed Jun. 29, 2020, in 42 pages.
Reply to Patent Owner Response for the Inter Partes Review of U.S. Pat. No. 9,686,906, filed on behalf of Precision Planting, LLC and AGCO Corp., filed Jun. 26, 2020, in 37 pages.
Reply to Patent Owner Response for the Inter Partes Review of U.S. Pat. No. 9,699,955, filed on behalf of Precision Planting, LLC and AGCO Corp., filed Jun. 29, 2020, in 40 pages.
Sloan Implement | ExactEmerge Retrofit Kit (accessed Apr. 29, 2020), in 4 pages. URL: https://www.sloans.com/feature-products/exact-emerge-retrofit-kit/ (filed as Exhibit 1122 to the Inter Partes Review of U.S. Pat. No. 9,861,031 filed on behalf of Precision Planting, LLC and AGCO Corp.).
Sloan Implement | Web Specials (published Apr. 2, 2020) (accessed Apr. 29, 2020), in 33 pages. URL: http://www.sloans.com/flyer/web-specials/ (filed as Exhibit 1123 to the Inter Partes Review of U.S. Pat. No. 9,861,031 filed on behalf of Precision Planting, LLC and AGCO Corp.).
Sloan Support | John Deere ExactEmerge: Buy New or Retrofit? (published Jun. 14, 2017) (accessed Apr. 29, 2020), in 7 pages. URL: https://sloansupport.com/2017/06/14/john-deere-exactemerge-buy-new-or-retrofit/ (filed as Exhibit 1121 to the Inter Partes Review of U.S. Pat. No. 9,861,031 filed on behalf of Precision Planting, LLC and AGCO Corp.).
Top 5 Farms with the Largest Acreage in the U.S. | Successful Farming (published Sep. 28, 2019) (accessed Jun. 16, 2020), in 8 pages. URL: https://222.agriculture.com/farm-management/farm-land/top-5-farms-with-the-largest-acreage-in-the-US (filed as Exhibit 1081 to the Inter Partes Review of U.S. Pat. No. 9,861,031 filed on behalf of Precision Planting, LLC and AGCO Corp.).
Monosem Pneumatic Planter Operator's Manual, NG Plus Mounted Planter, dated 1994, in 70 pages.
Monosem Pneumatic Planter Operator's Manual, NG Plus Mounted Planter, dated 2000, in 51 pages.
Deere & Company Operator's Manual, 494A 495A Corn Planters (OMB25384), dated 1967, in 68 pages.
Deere & Company Operator's Manual, 694A, 695A, 894A Corn Planters (OMB25348), dated 1966, in 68 pages.
Deere & Company Operator's Manual, 694A, 695A, 894A Corn Planters (OMB25391), dated 1967, in 64 pages.
Deere & Company Operator's Manual, 71 Flexi-Planter (OMH135752), dated 1988, in 140 pages.
Deere & Company Product Brochure, 494-A and 495-A Four-Row Corn Planters (A1477-62- 12-Pltr.), dated 1962, in 24 pages.
Kinze Manufacturing, Inc. and Ag Leader Technology, Inc.'s Counterclaims, Answer, and Affirmative Defenses, filed Feb. 8, 2021 (Dkt. No. 23), in 193 pages.
Breece, H. Edward, Harold V. Hansen, and Thomas A. Hoerner. Fundamentals of machine operation: planting. J. Deere, 1981, in 179 pages.
Kinze Manufacturing, Inc. and Ag Leader Technology, Inc.'s Counterclaims, Answer, and Affirmative Defenses to Deere's First Amended Complaint, filed Mar. 15, 2021 (Dkt. No. 38), in 217 pages.
Breece, H. Edward, Harold V. Hansen, and Thomas A. Hoerner. Fundamentals of Machine Operation: Planting. J. Deere (first edition), 1975, in 176 pages.
Breece, H. Edward, Harold V. Hansen, and Thomas A. Hoerner. Fundamentos de Funcionamiento de Maquinaria: Siembra. J. Deere, 1975, in 179 pages. Concise Explanation of Relevance: The instant non-patent literature document, Cite No. 2, is a Spanish-language translation or version of Breece et al., Fundamentals of Machine Operation: Planting (1975), cited herein as non-patent literature document, Cite No. 1.
Breece, H. Edward, Harold V. Hansen, and Thomas A. Hoerner. Fundamentals of Machine Operation: Planting. J. Deere, 1981 (second edition), in 191 pages.
Breece, H. Edward, Harold V. Hansen, Thomas A. Hoerner, and Robert H. Gunter. Fundamentals of Machine Operation: Planting. J. Deere, 1992 (third edition), in 222 pages.
Keith R. Carlson. Fundamentals of Machine Operation: Planting, Instructor's Kit. J. Deere, 1981, in 149 pages.
Keith R. Carlson. Fundamentals of Machine Operation: Planting, Instructor Guide. J. Deere, 1981, in 85 pages.
Keith R. Carlson and Mary Kellum. Fundamentals of Machine Operation: Planting, Instructor Guide. J. Deere, 1992, in 96 pages.
Keith R. Carlson. Fundamentals of Machine Operation: Planting, Student Guide. J. Deere, 1981, in 59 pages.
Plaintiff Deere & Company and Defendants AGCO Corporation and Precision Planting LLC's Final Joint Claim Construction Chart, filed Aug. 13, 2019 (Dkt. No. 121), in 17 pages.
Plaintiff Deere & Company and Defendants AGCO Corporation and Precision Planting LLC's Joint Claim Construction Chart Exhibits, filed Aug. 13, 2019 (Dkt. No. 121-1), in 386 pages.
Transcript of Markman Hearing in *Deere & Company* v. *AGCO Corporation, et al.,* held on Dec. 3, 2019, in 250 pages.
Plaintiff Deere & Company and Defendants AGCO Corporation and Precision Planting LLC's Proposed Claim Construction Order, filed Dec. 16, 2019 (Dkt. No. 188), in 5 pages.

(56) References Cited

OTHER PUBLICATIONS

Cover letter to Plaintiff Deere & Company and Defendants AGCO Corporation and Precision Planting LLC's Proposed Claim Construction Order, filed Dec. 16, 2019 (Dkt. No. 188-1), in 1 page.
Claim Construction Order in *Deere & Company v. AGCO Corporation, et al.*, filed Dec. 17, 2019 (Dkt. No. 191), in 5 pages.
Plaintiff Deere & Company's Supplemental Claim Construction Brief, filed Dec. 12, 2019 (Dkt. No. 192), in 11 pages.
Defendants AGCO Corporation et al.'s Supplemental Claim Construction Brief, filed Dec. 18, 2019 (Dkt. No. 194—Redacted Version of Dkt. No. 193), in 19 pages.
Defendants AGCO Corporation et al.'s Motion for Further Claim Construction in Light of Deere's Positions Asserted in IPR Proceedings, filed Jun. 30, 2021 (Dkt. No. 212—Redacted Version of Dkt. No. 211), in 21 pages.
Exhibits 1-13 to Defendants AGCO Corporation et al.'s Motion for Further Claim Construction in Light of Deere's Positions Asserted in IPR Proceedings, filed Jun. 30, 2021 (Dkt. No. 212-1), in 73 pages.
Proposed Order re Defendants AGCO Corporation et al.'s Motion for Further Claim Construction in Light of Deere's Positions Asserted in IPR Proceedings, filed Jun. 30, 2021 (Dkt. No. 212-2), in 1 page.
Plaintiff Deere & Company's Opposition to Defendants AGCO Corporation et al.'s Motion for Further Claim Construction, filed Jul. 9, 2021 (Dkt. No. 214—Redacted Version of Dkt. No. 213), in 21 pages.
Exhibits A-F to Plaintiff Deere & Company's Opposition to Defendants AGCO Corporation et al.'s Motion for Further Claim Construction, filed Jul. 9, 2021 (Dkt. No. 214-1), in 237 pages.
Exhibits G-R to Plaintiff Deere & Company's Opposition to Defendants AGCO Corporation et al.'s Motion for Further Claim Construction, filed Jul. 9, 2021 (Dkt. No. 214-2), in 157 pages.
Memorandum Order Denying Defendants AGCO Corporation et al.'s Motion for Further Claim Construction, Dkt. No. 211, filed Jul. 27, 2021 (Dkt. No. 215), in 2 pages.
AGCO Corporation and Precision Planting LLC's Amended Invalidity Contentions, served Oct. 25, 2021, in 115 pages.
Exhibit 7-B to AGCO Corporation and Precision Planting LLC's Amended Invalidity Contentions: French Published Patent Application No. 2,414,288 A1 to Benac ("Benac"), served Oct. 25, 2021, in 47 pages.
Exhibit 10-B to AGCO Corporation and Precision Planting LLC's Amended Invalidity Contentions: UK Published Patent Application No. 2,057,835 A to Hedderwick ("Hedderwick '835"), served Oct. 25, 2021, in 34 pages.
Exhibit 41-B to AGCO Corporation and Precision Planting LLC's Amended Invalidity Contentions: U.S. Pat. No. 4,029,235 ("Grataloup"), served Oct. 25, 2021, in 40 pages.
Exhibit 80-B to AGCO Corporation and Precision Planting LLC's Amended Invalidity Contentions: John Deere 495 Planter ("495 Planter"), served Oct. 25, 2021, in 95 pages.
Exhibit C-81 to AGCO Corporation and Precision Planting LLC's Amended Invalidity Contentions: 495 Planter and Benac, served Oct. 25, 2021, in 8 pages.
Exhibit C-82 to AGCO Corporation and Precision Planting LLC's Amended Invalidity Contentions: 495 Planter and Grataloup, served Oct. 25, 2021, in 8 pages.
Exhibit C-83 to AGCO Corporation and Precision Planting LLC's Amended Invalidity Contentions: Hedderwick and Grataloup, served Oct. 25, 2021, in 8 pages.
Prosecution Materials Related to Russian Patent Application RU 2013145876 A, dated Apr. 11, 2016, in 29 pages.
Kinze Manufacturing, Inc. and Ag Leader Technology, Inc.'s Counterclaims, Answer, and Affirmative Defenses to Deere's Second Amended and Supplemental Complaint, filed Jul. 16, 2021 (Dkt. No. 111), in 228 pages.
Kinze Manufacturing, Inc. and Ag Leader Technology, Inc.'s Preliminary Invalidity Contentions, served Oct. 18, 2021, in 26 pages.

Appendix A to Kinze Manufacturing, Inc. and Ag Leader Technology, Inc.'s Preliminary Invalidity Contentions, Prior Art Lists, served Oct. 18, 2021, in 46 pages.
Appendix B to Kinze Manufacturing, Inc. and Ag Leader Technology, Inc.'s Preliminary Invalidity Contentions, Exemplary Motivations to Combine, served Oct. 18, 2021, in 115 pages.
Appendix C to Kinze Manufacturing, Inc. and Ag Leader Technology, Inc.'s Preliminary Invalidity Contentions, Prior Art Grouped to Claimed Prior Art Concepts, served Oct. 18, 2021, in 300 pages.
Exhibit 01 to Kinze Manufacturing, Inc. and Ag Leader Technology, Inc.'s Preliminary Invalidity Contentions relating to a Claim Chart—U.S. Pat. No. 9,693,498 & European Patent Application Publication No. 0 606 541 ("Ballmer 541"), served Oct. 18, 2021, in 9 pages.
Exhibit 02 to Kinze Manufacturing, Inc. and Ag Leader Technology, Inc.'s Preliminary Invalidity Contentions relating to a Claim Chart—U.S. Pat. No. 9,693,498 & U.S. Pat. No. 5,601,209 ("Barsi 209"), served Oct. 18, 2021, in 7 pages.
Exhibit 03 to Kinze Manufacturing, Inc. and Ag Leader Technology, Inc.'s Preliminary Invalidity Contentions relating to a Claim Chart—U.S. Pat. No. 9,693,498 & U.S. Patent Application Publication No. 2010/0192818 ("Garner 818"), served Oct. 18, 2021, in 8 pages.
Exhibit 04 to Kinze Manufacturing, Inc. and Ag Leader Technology, Inc.'s Preliminary Invalidity Contentions relating to a Claim Chart—U.S. Pat. No. 9,693,498 & U.S. Patent Application Publication No. 2010/0192819 ("Garner 819"), served Oct. 18, 2021, in 9 pages.
Exhibit 05 to Kinze Manufacturing, Inc. and Ag Leader Technology, Inc.'s Preliminary Invalidity Contentions relating to a Claim Chart—U.S. Pat. No. 9,693,498 & U.S. Pat. No. 4,600,122 ("Lundie 122"), served Oct. 18, 2021, in 10 pages.
Exhibit 06 to Kinze Manufacturing, Inc. and Ag Leader Technology, Inc.'s Preliminary Invalidity Contentions relating to a Claim Chart—U.S. Pat. No. 9,693,498 & U.S. Pat. No. 7,404,366 ("Mariman 366"), served Oct. 18, 2021, in 9 pages.
Exhibit 07 to Kinze Manufacturing, Inc. and Ag Leader Technology, Inc.'s Preliminary Invalidity Contentions relating to a Claim Chart—U.S. Pat. No. 9,693,498 & German Published Patent Application DE 34 41 704 A1 ("Romberg 704"), served Oct. 18, 2021, in 11 pages.
Exhibit 08 to Kinze Manufacturing, Inc. and Ag Leader Technology, Inc.'s Preliminary Invalidity Contentions relating to a Claim Chart—U.S. Pat. No. 8,850,998 & French Patent Application Publication No. 2 414 288 ("Benac 288"), served Oct. 18, 2021, in 8 pages.
Exhibit 09 to Kinze Manufacturing, Inc. and Ag Leader Technology, Inc.'s Preliminary Invalidity Contentions relating to a Claim Chart—U.S. Pat. No. 8,850,998 & John Deere Model 495/495A/695A Planter Products ("Deere 495A" or "Model 495A"), served Oct. 18, 2021, in 26 pages.
Exhibit 10 to Kinze Manufacturing, Inc. and Ag Leader Technology, Inc.'s Preliminary Invalidity Contentions relating to a Claim Chart—U.S. Pat. No. 8,850,998 & U.S. Pat. No. 2,566,406 ("Dougherty 406"), served Oct. 18, 2021, in 9 pages.
Exhibit 11 to Kinze Manufacturing, Inc. and Ag Leader Technology, Inc.'s Preliminary Invalidity Contentions relating to a Claim Chart—U.S. Pat. No. 8,850,998 & U.S. Patent Application Publication No. 2010/0192819 ("Garner 819"), served Oct. 18, 2021, in 14 pages.
Exhibit 12 to Kinze Manufacturing, Inc. and Ag Leader Technology, Inc.'s Preliminary Invalidity Contentions relating to a Claim Chart—U.S. Pat. No. 8,850,998 & U.S. Pat. No. 4,023,509 to Hanson ("Hanson 509"), served Oct. 18, 2021, in 8 pages.
Exhibit 13 to Kinze Manufacturing, Inc. and Ag Leader Technology, Inc.'s Preliminary Invalidity Contentions relating to a Claim Chart—U.S. Pat. No. 8,850,998 & UK Patent Application Publication No. GB 2 057 835 ("Hedderwick 835"), served Oct. 18, 2021, in 10 pages.
Exhibit 14 to Kinze Manufacturing, Inc. and Ag Leader Technology, Inc.'s Preliminary Invalidity Contentions relating to a Claim Chart—U.S. Pat. No. 8,850,998 & German Patent No. 389840 ("Hempel 840"), served Oct. 18, 2021, in 8 pages.
Exhibit 15 to Kinze Manufacturing, Inc. and Ag Leader Technology, Inc.'s Preliminary Invalidity Contentions relating to a Claim Chart—U.S. Pat. No. 8,850,998 & German Patent Application Publication No. 28 26 658 ("Holdt 658"), served Oct. 18, 2021, in 8 pages.

(56) References Cited

OTHER PUBLICATIONS

Exhibit 16 to Kinze Manufacturing, Inc. and Ag Leader Technology, Inc.'s Preliminary Invalidity Contentions relating to a Claim Chart—U.S. Pat. No. 9,686,906 & Netherlands Patent Application Publication No. 1005451 of Berkhout ("Berkhout 451"), served Oct. 18, 2021, in 13 pages.

Exhibit 17 to Kinze Manufacturing, Inc. and Ag Leader Technology, Inc.'s Preliminary Invalidity Contentions relating to a Claim Chart—U.S. Pat. No. 9,686,906 & U.S. Pat. No. 1,422,534 to Brown ("Brown 534"), served Oct. 18, 2021, in 11 pages.

Exhibit 18 to Kinze Manufacturing, Inc. and Ag Leader Technology, Inc.'s Preliminary Invalidity Contentions relating to a Claim Chart—U.S. Pat. No. 9,686,906 & U.S. Pat. No. 658,348 to Crowley ("Crowley 348"), served Oct. 18, 2021, in 15 pages.

Exhibit 19 to Kinze Manufacturing, Inc. and Ag Leader Technology, Inc.'s Preliminary Invalidity Contentions relating to a Claim Chart—U.S. Pat. No. 9,686,906 & John Deere Model 495/495A/695A Planter Products ("Deere 495A" or "Model 495A"), served Oct. 18, 2021, in 40 pages.

Exhibit 20 to Kinze Manufacturing, Inc. and Ag Leader Technology, Inc.'s Preliminary Invalidity Contentions relating to a Claim Chart—U.S. Pat. No. 9,686,906 & U.S. Pat. No. 4,333,561 to Schlegel ("Schlegel 561"), served Oct. 18, 2021, in 19 pages.

Exhibit 21 to Kinze Manufacturing, Inc. and Ag Leader Technology, Inc.'s Preliminary Invalidity Contentions relating to a Claim Chart—U.S. Pat. No. 9,686,906 & U.S. Pat. No. 3,176,636 ("Wilcox 636"), served Oct. 18, 2021, in 26 pages.

Exhibit 22 to Kinze Manufacturing, Inc. and Ag Leader Technology, Inc.'s Preliminary Invalidity Contentions relating to a Claim Chart—U.S. Pat. No. 9,686,906 & German Patent Application Publication No. 1 090 458 of Witte (Witte 458), served Oct. 18, 2021, in 10 pages.

Exhibit 23 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,681,706 ("Sauder 706"), served Oct. 18, 2021, in 8 pages.

Exhibit 24 to Kinze Manufacturing, Inc. and Ag Leader Technology, Inc.'s Preliminary Invalidity Contentions relating to a Claim Chart—U.S. Pat. No. 9,807,924 & Netherlands Patent Application Publication No. 1005451 to Berkhout ("Berkhout 451"), served Oct. 18, 2021, in 6 pages.

Exhibit 25 to Kinze Manufacturing, Inc. and Ag Leader Technology, Inc.'s Preliminary Invalidity Contentions relating to a Claim Chart—U.S. Pat. No. 9,807,924 & U.S. Pat. No. 658,348 to Crowley ("Crowley 348"), served Oct. 18, 2021, in 7 pages.

Exhibit 26 to Kinze Manufacturing, Inc. and Ag Leader Technology, Inc.'s Preliminary Invalidity Contentions relating to a Claim Chart—U.S. Pat. No. 9,807,924 & John Deere Model 495/495A/695A Planter Products ("Deere 495A" or "Model 495A"), served Oct. 18, 2021, in 27 pages.

Exhibit 27 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,681,706 ("Sauder 706"), served Oct. 18, 2021, in 8 pages.

Exhibit 28 to Kinze Manufacturing, Inc. and Ag Leader Technology, Inc.'s Preliminary Invalidity Contentions relating to a Claim Chart—U.S. Pat. No. 9,807,924 & U.S. Pat. No. 1,264,454 to Terrell et al. ("Terrell 454"), served Oct. 18, 2021, in 8 pages.

Exhibit 29 to Kinze Manufacturing, Inc. and Ag Leader Technology, Inc.'s Preliminary Invalidity Contentions relating to a Claim Chart—U.S. Pat. No. 9,807,924 & U.S. Pat. No. 6,651,570 to Thiemke ("Thiemke 570"), served Oct. 18, 2021, in 10 pages.

Exhibit 30 to Kinze Manufacturing, Inc. and Ag Leader Technology, Inc.'s Preliminary Invalidity Contentions relating to a Claim Chart—U.S. Pat. No. 9,807,924 & U.S. Pat. No. 3,176,636 ("Wilcox 636"), served Oct. 18, 2021, in 18 pages.

Exhibit 31 to Kinze Manufacturing, Inc. and Ag Leader Technology, Inc.'s Preliminary Invalidity Contentions relating to a Claim Chart—U.S. Pat. No. 9,807,924 & German Patent Application No. 1 090 458 of Witte ("Witte 458"), served Oct. 18, 2021, in 6 pages.

Exhibit 32 to Kinze Manufacturing, Inc. and Ag Leader Technology, Inc.'s Preliminary Invalidity Contentions relating to a Claim Chart—U.S. Pat. No. 9,861,031 & U.K. Patent Application No. GB 2,012,534A ("Curtis 534" or "Curtis GB" or "Curtis GB 534"), served Oct. 18, 2021, in 21 pages.

Exhibit 33 to Kinze Manufacturing, Inc. and Ag Leader Technology, Inc.'s Preliminary Invalidity Contentions relating to a Claim Chart—U.S. Pat. No. 9,861,031 & John Deere Model 495/495A/695A Planter Products ("Deere 495A" or "Model 495A"), served Oct. 18, 2021, in 55 pages.

Exhibit 34 to Kinze Manufacturing, Inc. and Ag Leader Technology, Inc.'s Preliminary Invalidity Contentions relating to a Claim Chart—U.S. Pat. No. 9,861,031 (Claims 1, 2, 4, 5, 8 & 9) & U.S. Patent Application Publication No. 2010/0192819 to Garner ("Garner 819"), served Oct. 18, 2021, in 22 pages.

Exhibit 35 to Kinze Manufacturing, Inc. and Ag Leader Technology, Inc.'s Preliminary Invalidity Contentions relating to a Claim Chart—U.S. Pat. No. 9,861,031 & French Patent Application Publication No. FR 2 591 061 to Gras ("Gras 061"), served Oct. 18, 2021, in 39 pages.

Exhibit 36 to Kinze Manufacturing, Inc. and Ag Leader Technology, Inc.'s Preliminary Invalidity Contentions relating to a Claim Chart—U.S. Pat. No. 9,861,031 & UK Patent Application GB 2057835A ("Hedderwick 835"), served Oct. 18, 2021, in 55 pages.

Exhibit 37 to Kinze Manufacturing, Inc. and Ag Leader Technology, Inc.'s Preliminary Invalidity Contentions relating to a Claim Chart—U.S. Pat. No. 9,861,031 & German Published Patent Application DE2826658A1 ("Holdt" or "Holdt 658"), served Oct. 18, 2021, in 38 pages.

Exhibit 38 to Kinze Manufacturing, Inc. and Ag Leader Technology, Inc.'s Preliminary Invalidity Contentions relating to a Claim Chart—U.S. Pat. No. 9,861,031 (Claims 1, 2, 4, 5, 8 & 9) & International Patent App. Pub. No. WO 2013/049198Al to Radtke et al. ("Radtke 198"), served Oct. 18, 2021, in 12 pages.

Exhibit 39 to Kinze Manufacturing, Inc. and Ag Leader Technology, Inc.'s Preliminary Invalidity Contentions relating to a Claim Chart—U.S. Pat. No. 9,861,031 & U.S. Pat. No. 6,681,706 ("Sauder 706"), served Oct. 18, 2021, in 74 pages.

Exhibit 40 to Kinze Manufacturing, Inc. and Ag Leader Technology, Inc.'s Preliminary Invalidity Contentions relating to a Claim Chart—U.S. Pat. No. 9,861,031 & U.S. Pat. No. 3,176,636 to Wilcox ("Wilcox"), served Oct. 18, 2021, in 67 pages.

Exhibit 41 to Kinze Manufacturing, Inc. and Ag Leader Technology, Inc.'s Preliminary Invalidity Contentions relating to a Claim Chart—U.S. Pat. No. 9,480,199 & U.K. Patent Application No. GB 2,012,534A ("Curtis 534" or "Curtis GB" or "Curtis GB 534"), served Oct. 18, 2021, in 30 pages.

Exhibit 42 to Kinze Manufacturing, Inc. and Ag Leader Technology, Inc.'s Preliminary Invalidity Contentions relating to a Claim Chart—U.S. Pat. No. 9,480,199 (Claims 1-6) & John Deere Model 495/495A/695A Planter Products ("Deere 495A" or "Model 495A"), served Oct. 18, 2021, in 54 pages.

Exhibit 43 to Kinze Manufacturing, Inc. and Ag Leader Technology, Inc.'s Preliminary Invalidity Contentions relating to a Claim Chart—U.S. Pat. No. 9,480,199 & Deere Prior Art Vacuum Planters ("Deere Prior Art vacuum Planters"), served Oct. 18, 2021, in 35 pages.

Exhibit 44 to Kinze Manufacturing, Inc. and Ag Leader Technology, Inc.'s Preliminary Invalidity Contentions relating to a Claim Chart—U.S. Pat. No. 9,480,199 (Claims 1-6) & U.S. Pat. No. 2,566,406 to Dougherty ("Dougherty" or "Dougherty 406"), served Oct. 18, 2021, in 34 pages.

Exhibit 45 to Kinze Manufacturing, Inc. and Ag Leader Technology, Inc.'s Preliminary Invalidity Contentions relating to a Claim Chart—U.S. Pat. No. 9,480,199 & German Utility Model Publication No. 4400142 ("DE8400142" or "Franz 142"), served Oct. 18, 2021, in 23 pages.

Exhibit 46 to Kinze Manufacturing, Inc. and Ag Leader Technology, Inc.'s Preliminary Invalidity Contentions relating to a Claim Chart—U.S. Pat. No. 9,480,199 & French Patent Application 2591061 ("Gras 061" or "Gras 2") (incorporating French Patent Application 2574243 ("Gras 243" or "Gras 1")), served Oct. 18, 2021, in 39 pages.

(56) References Cited

OTHER PUBLICATIONS

Exhibit 47 to Kinze Manufacturing, Inc. and Ag Leader Technology, Inc.'s Preliminary Invalidity Contentions relating to a Claim Chart—U.S. Pat. No. 9,480,199 & UK Patent Application GB 2057835A ("Hedderwick" or "Hedderwick 835"), served Oct. 18, 2021, in 27 pages.
Exhibit 48 to Kinze Manufacturing, Inc. and Ag Leader Technology, Inc.'s Preliminary Invalidity Contentions relating to a Claim Chart—U.S. Pat. No. 9,480,199 (Claims 1-6) & German Published Patent Application DE2826658A1 ("Holdt" or "Holdt 658"), served Oct. 18, 2021, in 34 pages.
Exhibit 49 to Kinze Manufacturing, Inc. and Ag Leader Technology, Inc.'s Preliminary Invalidity Contentions relating to a Claim Chart—U.S. Pat. No. 9,480,199 & Monosem (Deere) Prior Art Planters, served Oct. 18, 2021, in 28 pages.
Exhibit 50 to Kinze Manufacturing, Inc. and Ag Leader Technology, Inc.'s Preliminary Invalidity Contentions relating to a Claim Chart—U.S. Pat. No. 9,480,199 (Claims 1-6) & U.S. Pat. No. 6,681,706 ("Sauder 706"), served Oct. 18, 2021, in 68 pages.
Exhibit 51 to Kinze Manufacturing, Inc. and Ag Leader Technology, Inc.'s Preliminary Invalidity Contentions relating to a Claim Chart—U.S. Pat. No. 9,480,199 & European Patent Application Publication 0182220 (EP0182220) ("Syring" or "Syring 220"), served Oct. 18, 2021, in 18 pages.
Exhibit 52 to Kinze Manufacturing, Inc. and Ag Leader Technology, Inc.'s Preliminary Invalidity Contentions relating to a Claim Chart—U.S. Pat. No. 9,480,199 & U.S. Pat. No. 3,176,636 to Wilcox ("Wilcox" or "Wilcox 636"), served Oct. 18, 2021, in 53 pages.
Exhibit 53 to Kinze Manufacturing, Inc. and Ag Leader Technology, Inc.'s Preliminary Invalidity Contentions relating to a Claim Chart—U.S. Pat. No. 9,480,199 & Japanese Utility Model Application JP 56-024815 ("Yamahata" or "Yamahata 815" or "JP 815"), served Oct. 18, 2021, in 39 pages.
Exhibit 54 to Kinze Manufacturing, Inc. and Ag Leader Technology, Inc.'s Preliminary Invalidity Contentions relating to a Claim Chart—U.S. Pat. No. 9,699,955 & U.K. Patent Application No. GB 2,012,534A ("Curtis 534" or "Curtis GB" or "Curtis GB 534"), served Oct. 18, 2021, in 18 pages.
Exhibit 55 to Kinze Manufacturing, Inc. and Ag Leader Technology, Inc.'s Preliminary Invalidity Contentions relating to a Claim Chart—U.S. Pat. No. 9,699,955 & John Deere Model 495/495A/695A Planter Products ("Deere 495A" or "Model 495A"), served Oct. 18, 2021, in 34 pages.
Exhibit 56 to Kinze Manufacturing, Inc. and Ag Leader Technology, Inc.'s Preliminary Invalidity Contentions relating to a Claim Chart—U.S. Pat. No. 9,699,955 & Deere Prior Art Vacuum Planters ("Deere Prior Art vacuum Planters"), served Oct. 18, 2021, in 29 pages.
Exhibit 57 to Kinze Manufacturing, Inc. and Ag Leader Technology, Inc.'s Preliminary Invalidity Contentions relating to a Claim Chart—U.S. Pat. No. 9,699,955 & French Patent Application 2591061 ("Gras 061" or "Gras 2") (incorporating French Patent Application 2574243 ("Gras 243" or "Gras 1")), served Oct. 18, 2021, in 30 pages.
Exhibit 58 to Kinze Manufacturing, Inc. and Ag Leader Technology, Inc.'s Preliminary Invalidity Contentions relating to a Claim Chart—U.S. Pat. No. 9,699,955 & UK Patent Application GB 2057835A ("Hedderwick" or "Hedderwick 835"), served Oct. 18, 2021, in 14 pages.
Exhibit 59 to Kinze Manufacturing, Inc. and Ag Leader Technology, Inc.'s Preliminary Invalidity Contentions relating to a Claim Chart—U.S. Pat. No. 9,699,955 & German Published Patent Application DE2826658A1 ("Holdt" or "Holdt 658"), served Oct. 18, 2021, in 37 pages.
Exhibit 60 to Kinze Manufacturing, Inc. and Ag Leader Technology, Inc.'s Preliminary Invalidity Contentions relating to a Claim Chart—U.S. Pat. No. 9,699,955 (Claims 8-10 and 12-13) & U.S. Pat. No. 6,681,706 ("Sauder 706"), served Oct. 18, 2021, in 87 pages.
Exhibit 61 to Kinze Manufacturing, Inc. and Ag Leader Technology, Inc.'s Preliminary Invalidity Contentions relating to a Claim Chart—U.S. Pat. No. 9,699,955 & U.S. Pat. No. 3,176,636 to Wilcox ("Wilcox" or "Wilcox 636"), served Oct. 18, 2021, in 51 pages.
Exhibit 62 to Kinze Manufacturing, Inc. and Ag Leader Technology, Inc.'s Preliminary Invalidity Contentions relating to a Claim Chart—U.S. Pat. No. 10,004,173 & U.K. Patent Application No. GB 2,012,534A ("Curtis 534" or "Curtis GB" or "Curtis GB 534"), served Oct. 18, 2021, in 28 pages.
Exhibit 63 to Kinze Manufacturing, Inc. and Ag Leader Technology, Inc.'s Preliminary Invalidity Contentions relating to a Claim Chart—U.S. Pat. No. 10,004,173 & John Deere Model 495/495A/695A Planter Products ("Deere 495A" or "Model 495A"), served Oct. 18, 2021, in 73 pages.
Exhibit 64 to Kinze Manufacturing, Inc. and Ag Leader Technology, Inc.'s Preliminary Invalidity Contentions relating to a Claim Chart—U.S. Pat. No. 10,004,173 (Claims 1-4, 6, 11-16) & U.S. Patent Application Publication No. 2010/0192819 to Garner ("Garner 819"), served Oct. 18, 2021, in 18 pages.
Exhibit 65 to Kinze Manufacturing, Inc. and Ag Leader Technology, Inc.'s Preliminary Invalidity Contentions relating to a Claim Chart—U.S. Pat. No. 10,004,173 & French Patent Application Publication No. FR 2 591 061 to Gras ("Gras 061"), served Oct. 18, 2021, in 66 pages.
Exhibit 66 to Kinze Manufacturing, Inc. and Ag Leader Technology, Inc.'s Preliminary Invalidity Contentions relating to a Claim Chart—U.S. Pat. No. 10,004,173 & UK Patent Application GB 2057835A ("Hedderwick 835"), served Oct. 18, 2021, in 84 pages.
Exhibit 67 to Kinze Manufacturing, Inc. and Ag Leader Technology, Inc.'s Preliminary Invalidity Contentions relating to a Claim Chart—U.S. Pat. No. 10,004,173 & German Published Patent Application DE2826658A1 ("Holdt" or "Holdt 658"), served Oct. 18, 2021, in 54 pages.
Exhibit 68 to Kinze Manufacturing, Inc. and Ag Leader Technology, Inc.'s Preliminary Invalidity Contentions relating to a Claim Chart—U.S. Pat. No. 10,004,173 (Claims 1-4, 6, 11-16) & International Patent App. Pub. No. WO 2013/049198Al to Radtke et al. ("Radtke 198"), served Oct. 18, 2021, in 17 pages.
Exhibit 69 to Kinze Manufacturing, Inc. and Ag Leader Technology, Inc.'s Preliminary Invalidity Contentions relating to a Claim Chart—U.S. Pat. No. 10,004,173 & U.S. Pat. No. 6,681,706 ("Sauder 706"), served Oct. 18, 2021, in 136 pages.
Exhibit 70 to Kinze Manufacturing, Inc. and Ag Leader Technology, Inc.'s Preliminary Invalidity Contentions relating to a Claim Chart—U.S. Pat. No. 10,004,173 & U.S. Pat. No. 3,176,636 to Wilcox ("Wilcox"), served Oct. 18, 2021, in 105 pages.
Exhibit 71 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 658,348 ("Crowley" or "Crowley 348"), served Oct. 18, 2021, in 30 pages.
Exhibit 72 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.K. Patent Application No. GB 2,012,534A ("Curtis 534" or "Curtis GB" or "Curtis GB 534"), served Oct. 18, 2021, in 33 pages.
Exhibit 73 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & John Deere Model 495/495A/695A Planter Products ("Deere 495A" or "Model 495A"), served Oct. 18, 2021, in 84 pages.
Exhibit 74 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Deere Prior Art Vacuum Planters ("Deere Prior Art vacuum Planters"), served Oct. 18, 2021, in 66 pages.
Exhibit 75 to Kinze Manufacturing, Inc. and Ag Leader Technology, Inc.'s Preliminary Invalidity Contentions relating to a Claim Chart—U.S. Pat. No. 8,813,663 (Claims 1, 4, 6) & French Patent Application 2591061 ("Gras 061" or "Gras 2") (incorporating French Patent Application 2574243 ("Gras 243" or "Gras 1")), served Oct. 18, 2021, in 63 pages.
Exhibit 76 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 4,023,509 ("Hanson 509"), served Oct. 18, 2021, in 55 pages.

(56) References Cited

OTHER PUBLICATIONS

Exhibit 77 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & UK Patent Application GB 2057835A ("Hedderwick" or "Hedderwick 835"), served Oct. 18, 2021, in 38 pages.
Exhibit 78 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & German Published Patent Application DE2826658A1 ("Holdt" or "Holdt 658"), served Oct. 18, 2021, in 75 pages.
Exhibit 79 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 6,681,706 ("Sauder 706"), served Oct. 18, 2021, in 174 pages.
Exhibit 80 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & U.S. Pat. No. 3,176,636 to Wilcox ("Wilcox" or "Wilcox 636"), served Oct. 18, 2021, in 97 pages.
Exhibit 81 to Kinze Manufacturing, Inc. and Ag Leader Technology, Inc.'s Preliminary Invalidity Contentions relating to a Claim Chart—U.S. Pat. No. 10,729,063 (claims 1-8 and 10-19) & U.K. Patent Application No. GB 2,012,534A ("Curtis 534" or "Curtis GB" or "Curtis GB 534"), served Oct. 18, 2021, in 46 pages.
Exhibit 82 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & John Deere Model 495/495A/695A Planter Products ("Deere 495A" or "Model 495A"), served Oct. 18, 2021, in 97 pages.
Exhibit 83 to Kinze Manufacturing, Inc. and Ag Leader Technology, Inc.'s Preliminary Invalidity Contentions relating to a Claim Chart—U.S. Pat. No. 10,729,063 & Deere Prior Art Vacuum Planters ("Deere Prior Art vacuum Planters"), served Oct. 18, 2021, in 81 pages.
Exhibit 84 to Kinze Manufacturing, Inc. and Ag Leader Technology, Inc.'s Preliminary Invalidity Contentions relating to a Claim Chart—U.S. Pat. No. 10,729,063 (Claims 1-8, 10- 19) & U.S. Appl. No. 12/364,010 (Publication No. US 2010/0192819 "819 Publication" or "Garner 819"), served Oct. 18, 2021, in 16 pages.
Exhibit 85 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & French Patent Application Publication No. FR 2 591 061 ("Gras 061"), served Oct. 18, 2021, in 73 pages.
Exhibit 86 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & UK Patent Application GB 2057835A ("Hedderwick" or "Hedderwick 835"), served Oct. 18, 2021, in 41 pages.
Exhibit 87 to Kinze Manufacturing, Inc. and Ag Leader Technology, Inc.'s Preliminary Invalidity Contentions relating to a Claim Chart—U.S. Pat. No. 10,729,063 & German Published Patent Application DE2826658A1 ("Holdt" or "Holdt 658"), served Oct. 18, 2021, in 92 pages.
Exhibit 88 to Kinze Manufacturing, Inc. and Ag Leader Technology, Inc.'s Preliminary Invalidity Contentions relating to a Claim Chart—U.S. Pat. No. 10,729,063 (Claims 1-8, 10- 19) & International Patent Application PCT/US20 12/057327 (International Publication No. WO 2013/049198 Al), served Oct. 18, 2021, in 39 pages.
Exhibit 89 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & U.S. Pat. No. 6,681,706 ("Sauder 706"), served Oct. 18, 2021, in 161 pages.
Exhibit 90 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & U.S. Pat. No. 3,176,636 to Wilcox ("Wilcox" or "Wilcox 636"), served Oct. 18, 2021, in 103 pages.

Exhibit 91 to Kinze Manufacturing, Inc. and Ag Leader Technology, Inc.'s Preliminary Invalidity Contentions relating to a Claim Chart—U.S. Pat. No. Re. 48,572 & U.K. Patent Application No. GB 2,012,534A ("Curtis 534" or "Curtis GB" or "Curtis GB 534"), served Oct. 18, 2021, in 68 pages.
Exhibit 92 to Kinze Manufacturing, Inc. and Ag Leader Technology, Inc.'s Preliminary Invalidity Contentions relating to a Claim Chart—U.S. Pat. No. Re. 48,572 & John Deere Model 495/495A/695A Planter Products ("Deere 495A" or "Model 495A"), served Oct. 18, 2021, in 184 pages.
Exhibit 93 to Kinze Manufacturing, Inc. and Ag Leader Technology, Inc.'s Preliminary Invalidity Contentions relating to a Claim Chart—U.S. Pat. No. Re. 48,572 & U.S. Patent Application Publication No. 2010/0192819 to Garner ("Garner 819"), served Oct. 18, 2021, in 53 pages.
Exhibit 94 to Kinze Manufacturing, Inc. and Ag Leader Technology, Inc.'s Preliminary Invalidity Contentions relating to a Claim Chart—U.S. Pat. No. Re. 48,572 & U.S. Pat. No. 3,627,050 to Hansen and assigned to Deere ("Hansen" or "Hansen 050"), served Oct. 18, 2021, in 184 pages.
Exhibit 95 to Kinze Manufacturing, Inc. and Ag Leader Technology, Inc.'s Preliminary Invalidity Contentions relating to a Claim Chart—U.S. Pat. No. Re. 48,572 & UK Patent Application GB 2057835A ("Hedderwick 835"), served Oct. 18, 2021, in 236 pages.
Exhibit 96 to Kinze Manufacturing, Inc. and Ag Leader Technology, Inc.'s Preliminary Invalidity Contentions relating to a Claim Chart—U.S. Pat. No. Re. 48,572 & German Published Patent Application DE2826658A1 ("Holdt" or "Holdt 658"), served Oct. 18, 2021, in 136 pages.
Exhibit 97 to Kinze Manufacturing, Inc. and Ag Leader Technology, Inc.'s Preliminary Invalidity Contentions relating to a Claim Chart—U.S. Pat. No. Re. 48,572 & U.S. Pat. No. 6,681,706 ("Sauder 706"), served Oct. 18, 2021, in 215 pages.
Exhibit 98 to Kinze Manufacturing, Inc. and Ag Leader Technology, Inc.'s Preliminary Invalidity Contentions relating to a Claim Chart—U.S. Pat. No. Re. 48,572 & U.S. Pat. No. 3,176,636 to Wilcox ("Wilcox"), served Oct. 18, 2021, in 232 pages.
Ref. # 414 cited in Appendix A—Prior Art List to the Preliminary Invalidity Contentions filed on behalf of Kinze Manufacturing, Inc. and Ag Leader Technology, Inc.: Chapter 12—Mechanical Grain Conveying ("Bern 2006") (listing a publication or prior art date of Dec. 7, 2006 and a first named inventor / applicant / author of Bern), served Oct. 18, 2021, in 65 pages.
Ref. # 415 cited in Appendix A—Prior Art List to the Preliminary Invalidity Contentions filed on behalf of Kinze Manufacturing, Inc. and Ag Leader Technology, Inc.: Fundamentals of Machine Operation—Planting (1975) ("Breece 1975") (listing a publication or prior art date of 1975 and a first named inventor / applicant / author of Breece), served Oct. 18, 2021, in 176 pages.
Ref. # 416 cited in Appendix A—Prior Art List to the Preliminary Invalidity Contentions filed on behalf of Kinze Manufacturing, Inc. and Ag Leader Technology, Inc.: Fundamentals of Machine Operation—Planting (1981) ("Breece 1981") (listing a publication or prior art date of 1981 and a first named inventor / applicant / author of Breece), served Oct. 18, 2021, in 184 pages.
Ref. # 417 cited in Appendix A—Prior Art List to the Preliminary Invalidity Contentions filed on behalf of Kinze Manufacturing, Inc. and Ag Leader Technology, Inc.: The Influence of Seed-Drill Design on the Spatial Arrangement of Seedlings and on Seedling Emergence ("Bufton 1978") (listing a publication or prior art date of 1978 and a first named inventor / applicant / author of Bufton), served Oct. 18, 2021, in 26 pages.
Ref. # 418 cited in Appendix A—Prior Art List to the Preliminary Invalidity Contentions filed on behalf of Kinze Manufacturing, Inc. and Ag Leader Technology, Inc.: GQ_RB_Loader_Unloader_EN_14298_01_WEB (1) ("Buhler EN-1429-8-01") (listing a publication or prior art date of pre 2008 and a first named inventor / applicant / author of Buhler), served Oct. 18, 2021, in 13 pages.
Ref. # 419 cited in Appendix A—Prior Art List to the Preliminary Invalidity Contentions filed on behalf of Kinze Manufacturing, Inc. and Ag Leader Technology, Inc.: Allis Chalmers Advertisement: Plant to Prosper with new A-C Short Drop Planters ("Chalmers

(56) References Cited

OTHER PUBLICATIONS

1953") (listing a publication or prior art date of Feb. 1953 and a first named inventor / applicant / author of Chalmers), served Oct. 18, 2021, in 1 page.

Ref. # 420 cited in Appendix A—Prior Art List to the Preliminary Invalidity Contentions filed on behalf of Kinze Manufacturing, Inc. and Ag Leader Technology, Inc.: Cockshutt Farm Equipment Hi Speed Planters Brochure (AD 25-2-57-22M-B) (listing a publication or prior art date of pre 2008 and a first named inventor / applicant / author of Cockshutt), served Oct. 18, 2021, in 8 pages.

Ref. # 421 cited in Appendix A—Prior Art List to the Preliminary Invalidity Contentions filed on behalf of Kinze Manufacturing, Inc. and Ag Leader Technology, Inc.: Spade-Punch Planter for Precision Planting ("Debicki 1996") (listing a publication or prior art date of 1996 and a first named inventor / applicant / author of Debicki), served Oct. 18, 2021, in 9 pages.

Ref. # 422 cited in Appendix A—Prior Art List to the Preliminary Invalidity Contentions filed on behalf of Kinze Manufacturing, Inc. and Ag Leader Technology, Inc.: John Deere_Drawn and Integral Planters Brochure (A-15-79-9) (listing a publication or prior art date of 1981 and a first named inventor / applicant / author of Deere), served Oct. 18, 2021, in 40 pages.

Ref. # 423 cited in Appendix A—Prior Art List to the Preliminary Invalidity Contentions filed on behalf of Kinze Manufacturing, Inc. and Ag Leader Technology, Inc.: John Deere Drawn and Integral Planters Brochure ("Deere DIP 1981") (listing a publication or prior art date of 1981 and a first named inventor / applicant / author of Deere), served Oct. 18, 2021, in 44 pages.

Ref. # 424 cited in Appendix A—Prior Art List to the Preliminary Invalidity Contentions filed on behalf of Kinze Manufacturing, Inc. and Ag Leader Technology, Inc.: John Deere Drawn, Integral and Unit Planters Brochure ("Deere DIP 1987") (listing a publication or prior art date of 1987 and a first named inventor / applicant / author of Deere), served Oct. 18, 2021, in 32 pages.

Ref. # 425 cited in Appendix A—Prior Art List to the Preliminary Invalidity Contentions filed on behalf of Kinze Manufacturing, Inc. and Ag Leader Technology, Inc.: John Deere, 494, 494A, 495, and 495A Corn Planters Parts Catalog (PC541) ("Deere PC541") (listing a publication or prior art date of 1996 and a first named inventor / applicant / author of Deere), served Oct. 18, 2021, in 320 pages.

Ref. # 426 cited in Appendix A—Prior Art List to the Preliminary Invalidity Contentions filed on behalf of Kinze Manufacturing, Inc. and Ag Leader Technology, Inc.: Deere MaxEmerge TM Registration file (listing a publication or prior art date of Nov. 3, 1981 and a first named inventor / applicant / author of Deere), served Oct. 18, 2021, in 153 pages.

Ref. # 427 cited in Appendix A—Prior Art List to the Preliminary Invalidity Contentions filed on behalf of Kinze Manufacturing, Inc. and Ag Leader Technology, Inc.: John Deere 71 Flexi- Planter Parts Catalog ("Deere PC1001") (listing a publication or prior art date of Oct. 30, 1995 and a first named inventor / applicant / author of Deere), served Oct. 18, 2021, in 220 pages.

Screenshots taken from Ref. # 428, a video, cited in Appendix A—Prior Art List to the Preliminary Invalidity Contentions filed on behalf of Kinze Manufacturing, Inc. and Ag Leader Technology, Inc.: John Deere Presents: 494 and 495 Corn Planters (JD-AV-27) (Deere JD-AV-27) (listing a publication or prior art date of Mar. 1961 and a first named inventor / applicant / author of Deere), served Oct. 18, 2021, in 61 pages.

Transcript of Ref. # 428, a video, cited in Appendix A—Prior Art List to the Preliminary Invalidity Contentions filed on behalf of Kinze Manufacturing, Inc. and Ag Leader Technology, Inc.: John Deere Presents: 494 and 495 Corn Planters (JD-AV-27) (Deere JD-AV-27) (listing a publication or prior art date of Mar. 1961 and a first named inventor / applicant / author of Deere), served Oct. 18, 2021, in 5 pages.

Ref. # 429 cited in Appendix A—Prior Art List to the Preliminary Invalidity Contentions filed on behalf of Kinze Manufacturing, Inc. and Ag Leader Technology, Inc.: Deere—2007—Rate Charts and Setting—OMA85407 ("Deere OMA85407") (listing a publication or prior art date of pre 2008 and a first named inventor / applicant / author of Deere), served Oct. 18, 2021, in 204 pages.

Ref. # 430 cited in Appendix A—Prior Art List to the Preliminary Invalidity Contentions filed on behalf of Kinze Manufacturing, Inc. and Ag Leader Technology, Inc.: John Deere 1300 Planter Operators Manual OMB25492 ("Deere OMB25492") (listing a publication or prior art date of pre 2008 and a first named inventor / applicant / author of Deere), served Oct. 18, 2021, in 76 pages.

Ref. # 431 cited in Appendix A—Prior Art List to the Preliminary Invalidity Contentions filed on behalf of Kinze Manufacturing, Inc. and Ag Leader Technology, Inc.: John Deere 246 and 446 Corn Planters and 247 and 447 Cotton Planters Operator's Manual (OM-B25366) (listing a publication or prior art date of pre 2008 and a first named inventor / applicant / author of Deere), served Oct. 18, 2021, in 72 pages.

Ref. # 432 cited in Appendix A—Prior Art List to the Preliminary Invalidity Contentions filed on behalf of Kinze Manufacturing, Inc. and Ag Leader Technology, Inc.: John Deere 494 and 495 Corn Planters Operators Manual (OMB25002B) ("Deere OMB25002B") (listing a publication or prior art date of pre 2008 and a first named inventor / applicant / author of Deere), served Oct. 18, 2021, in 76 pages.

Ref. # 433 cited in Appendix A—Prior Art List to the Preliminary Invalidity Contentions filed on behalf of Kinze Manufacturing, Inc. and Ag Leader Technology, Inc.: John Deere 494A and 495A Corn Planters Operators Manual (OMB25384) ("Deere OM-B25384") (listing a publication or prior art date of pre 2008 and a first named inventor / applicant / author of Deere), served Oct. 18, 2021, in 68 pages.

Ref. # 434 cited in Appendix A—Prior Art List to the Preliminary Invalidity Contentions filed on behalf of Kinze Manufacturing, Inc. and Ag Leader Technology, Inc.: John Deere 494A and 495A Four Row Corn Planter Brochure (A1477-62-12-Pltr.) ("Deere A1477-62-12-Pltr.") (listing a publication or prior art date of pre 2008 and a first named inventor / applicant / author of Deere), served Oct. 18, 2021, in 24 pages.

Ref. # 435 cited in Appendix A—Prior Art List to the Preliminary Invalidity Contentions filed on behalf of Kinze Manufacturing, Inc. and Ag Leader Technology, Inc.: John Deere 694A, 695A, 894A Corn Planters Operators Manual (OMB25384) [sic] ("Deere OMB25384") [sic] (truly, OMB25391) (listing a publication or prior art date of pre 2008 and a first named inventor / applicant / author of Deere), served Oct. 18, 2021, in 64 pages.

Ref. # 436 cited in Appendix A—Prior Art List to the Preliminary Invalidity Contentions filed on behalf of Kinze Manufacturing, Inc. and Ag Leader Technology, Inc.: John Deere 71 Flexi-Planter Operators Manual (OMH135752) ("Deere OMH135752") (listing a publication or prior art date of pre 2008 and a first named inventor / applicant / author of Deere), served Oct. 18, 2021, in 140 pages.

Ref. # 437 cited in Appendix A—Prior Art List to the Preliminary Invalidity Contentions filed on behalf of Kinze Manufacturing, Inc. and Ag Leader Technology, Inc.: John Deere 80 Unit Planter Operators Manual (OMA28630) ("Deere OMA28630") (listing a publication or prior art date of pre 2008 and a first named inventor / applicant / author of Deere), served Oct. 18, 2021, in 68 pages.

Ref. # 438 cited in Appendix A—Prior Art List to the Preliminary Invalidity Contentions filed on behalf of Kinze Manufacturing, Inc. and Ag Leader Technology, Inc.: John Deere 80 Unit Planter Operators Manual (OMB25537) ("Deere OMB25537") (listing a publication or prior art date of pre 2008 and a first named inventor / applicant / author of Deere), served Oct. 18, 2021, in 36 pages.

Ref. # 439 cited in Appendix A—Prior Art List to the Preliminary Invalidity Contentions filed on behalf of Kinze Manufacturing, Inc. and Ag Leader Technology, Inc.: John Deere MaxEmerge 2 Plateless Metering Units (OMH136460) ("Deere OMH136460") (listing a publication or prior art date of pre 2008 and a first named inventor / applicant / author of Deere), served Oct. 18, 2021, in 122 pages.

Ref. # 440 cited in Appendix A—Prior Art List to the Preliminary Invalidity Contentions filed on behalf of Kinze Manufacturing, Inc. and Ag Leader Technology, Inc.: John Deere Planter Parts Guide (DKD1661) ("Deere DKD1661") (listing a publication or prior art date of pre 2008 and a first named inventor / applicant / author of Deere), served Oct. 18, 2021, in 27 pages.

(56) References Cited

OTHER PUBLICATIONS

Ref. # 441 cited in Appendix A—Prior Art List to the Preliminary Invalidity Contentions filed on behalf of Kinze Manufacturing, Inc. and Ag Leader Technology, Inc.: Sembradora Flexible John Deere 71 Operators Manual (OMA29205) ("Deere OMA29205") (listing a publication or prior art date of pre 2008 and a first named inventor / applicant / author of Deere), served Oct. 18, 2021, in 104 pages. Concise Explanation of Relevance: The instant non-patent literature document, Cite No. 417, is a Spanish-language translation or version of John Deere 71 Flexi-Planter Operators Manual (OMH135752), cited herein as non-patent literature document, Cite No. 412 (entitled Ref. # 436 cited in Appendix A—Prior Art List to the Preliminary Invalidity Contentions filed on behalf of Kinze Manufacturing, Inc. and Ag Leader Technology, Inc.: John Deere 71 Flexi-Planter Operators Manual (OMH135752) ("Deere OMH135752") (listing a publication or prior art date of pre 2008 and a first named inventor / applicant / author of Deere), served Oct. 18, 2021, in 140 pages.).

Ref. # 442 cited in Appendix A—Prior Art List to the Preliminary Invalidity Contentions filed on behalf of Kinze Manufacturing, Inc. and Ag Leader Technology, Inc.: John Deere_494_495_694_695_Fourand-Six-Row Corn Planters Brochure (A-1410-60-9) ("Deere A-1410-60-9") (listing a publication or prior art date of pre 2008 and a first named inventor / applicant / author of Deere), served Oct. 18, 2021, in 28 pages.

Ref. # 443 cited in Appendix A—Prior Art List to the Preliminary Invalidity Contentions filed on behalf of Kinze Manufacturing, Inc. and Ag Leader Technology, Inc.: John Deere_Zone System for Corn (D-101-63-7) ("Deere D-101-63-7") (listing a publication or prior art date of pre 2008 and a first named inventor / applicant / author of Deere), served Oct. 18, 2021, in 28 pages.

Ref. # 444 cited in Appendix A—Prior Art List to the Preliminary Invalidity Contentions filed on behalf of Kinze Manufacturing, Inc. and Ag Leader Technology, Inc.: John Deere 694A, 695A, 894A Corn Planters Operators Manual (OMB25391) ("Deere OMB25391") (listing a publication or prior art date of pre 2008 and a first named inventor / applicant / author of Deere), served Oct. 18, 2021, in 64 pages.

Ref. # 445 cited in Appendix A—Prior Art List to the Preliminary Invalidity Contentions filed on behalf of Kinze Manufacturing, Inc. and Ag Leader Technology, Inc.: John Deere 7200 MaxEmerge 2 Drawn Conservation Planters 4-Row and 6-Row Narrow (OMA54938) ("Deere OMA54938") (listing a publication or prior art date of pre 2008 and a first named inventor / applicant / author of Deere), served Oct. 18, 2021, in 352 pages.

Ref. # 446 cited in Appendix A—Prior Art List to the Preliminary Invalidity Contentions filed on behalf of Kinze Manufacturing, Inc. and Ag Leader Technology, Inc.: John Deere 7200 MaxEmerge 2 Drawn Conservation Planters 6-Row Wide and 8-Row Narrow Planters (OMA54942) ("Deere OMA54942") (listing a publication or prior art date of pre 2008 and a first named inventor / applicant / author of Deere), served Oct. 18, 2021, in 346 pages.

Ref. # 447 cited in Appendix A—Prior Art List to the Preliminary Invalidity Contentions filed on behalf of Kinze Manufacturing, Inc. and Ag Leader Technology, Inc.: John Deere 7200 Front-Fold MaxEmerge 2 Drawn Conservation Planter, 12-Row Flex-Frame (OMA54948) ("Deere OMA54948") (listing a publication or prior art date of pre 2008 and a first named inventor / applicant / author of Deere), served Oct. 18, 2021, in 346 pages.

Ref. # 448 cited in Appendix A—Prior Art List to the Preliminary Invalidity Contentions filed on behalf of Kinze Manufacturing, Inc. and Ag Leader Technology, Inc.: John Deere 7300 MaxEmerge 2 Integral Planters Operators Manual (OMA54956) ("Deere OMA54956") (listing a publication or prior art date of pre 2008 and a first named inventor / applicant / author of Deere), served Oct. 18, 2021, in 294 pages.

Ref. # 449 cited in Appendix A—Prior Art List to the Preliminary Invalidity Contentions filed on behalf of Kinze Manufacturing, Inc. and Ag Leader Technology, Inc.: John Deere 7500 MaxEmerge Plus Drawn Conservation Planters 6-Row Wide and 8-Row Narrow Planter Operators Manual (OMA56574) ("Deere OMA56574") (listing a publication or prior art date of Pre 2008 and a first named inventor / applicant / author of Deere), served Oct. 18, 2021, in 350 pages.

Ref. # 450 cited in Appendix A—Prior Art List to the Preliminary Invalidity Contentions filed on behalf of Kinze Manufacturing, Inc. and Ag Leader Technology, Inc.: John Deere 1770NT CCS 16-Row Narrow Planter with Pro-Series XP Row Units Operators Manual (OMA83922) ("Deere OMA83922") (listing a publication or prior art date of pre 2008 and a first named inventor / applicant / author of Deere), served Oct. 18, 2021, in 340 pages.

Ref. # 451 cited in Appendix A—Prior Art List to the Preliminary Invalidity Contentions filed on behalf of Kinze Manufacturing, Inc. and Ag Leader Technology, Inc.: John Deere 1770NT CCS 12-Row Narrow Planter with MaxEmerge XP Row Units Operators Manual (OMA83926) ("Deere OMA83926") (listing a publication or prior art date of pre 2008 and a first named inventor / applicant / author of Deere), served Oct. 18, 2021, in 444 pages.

Ref. # 452 cited in Appendix A—Prior Art List to the Preliminary Invalidity Contentions filed on behalf of Kinze Manufacturing, Inc. and Ag Leader Technology, Inc.: John Deere 1770NT CCS 24-Row Narrow Planter with MaxEmerge XP Row Units Operators Manual (OMA83938) ("Deere OMA83938") (listing a publication or prior art date of pre 2008 and a first named inventor / applicant / author of Deere), served Oct. 18, 2021, in 432 pages.

Ref. # 453 cited in Appendix A—Prior Art List to the Preliminary Invalidity Contentions filed on behalf of Kinze Manufacturing, Inc. and Ag Leader Technology, Inc.: John Deere MaxEmerge 2 Vacuum Metering Units Operators Manual (OMH136461) ("Deere OMH136461") (listing a publication or prior art date of pre 2008 and a first named inventor / applicant / author of Deere), served Oct. 18, 2021, in 94 pages.

Ref. # 454 cited in Appendix A—Prior Art List to the Preliminary Invalidity Contentions filed on behalf of Kinze Manufacturing, Inc. and Ag Leader Technology, Inc.: John Deere 1740 Planter Operators Manual (OMP73961) ("Deere OMP73961") (listing a publication or prior art date of pre 2008 and a first named inventor / applicant / author of Deere), served Oct. 18, 2021, in 216 pages.

Ref. # 455 cited in Appendix A—Prior Art List to the Preliminary Invalidity Contentions filed on behalf of Kinze Manufacturing, Inc. and Ag Leader Technology, Inc.: John Deere 7000 and 7100 MaxEmerge Planting Units Parts Catalog (PC2604) ("Deere PC2604") (listing a publication or prior art date of pre 2008 and a first named inventor / applicant / author of Deere), served Oct. 18, 2021, in 112 pages.

Ref. # 456 cited in Appendix A—Prior Art List to the Preliminary Invalidity Contentions filed on behalf of Kinze Manufacturing, Inc. and Ag Leader Technology, Inc.: John Deere Operators Manual—MaxEmerge 2 Vacuum Metering Units—OMH136461 ("Deere OMH136461") (listing a publication or prior art date of pre 2008 and a first named inventor / applicant / author of Deere), served Oct. 18, 2021, in 94 pages.

Ref. # 457 cited in Appendix A—Prior Art List to the Preliminary Invalidity Contentions filed on behalf of Kinze Manufacturing, Inc. and Ag Leader Technology, Inc.: Operators Manual—Rate Charts and Settings, Imperial (U.S.) Units—OMA84620 Issue F6 ("Deere OMA84620") (listing a publication or prior art date of pre 2008 and a first named inventor / applicant / author of Deere), served Oct. 18, 2021, in 214 pages.

Ref. # 458 cited in Appendix A—Prior Art List to the Preliminary Invalidity Contentions filed on behalf of Kinze Manufacturing, Inc. and Ag Leader Technology, Inc.: Planter.MaxEmerge-Plus.EPN-1750-E.English (2001) ("Deere EPN-1750-E") (listing a publication or prior art date of pre 2008 and a first named inventor / applicant / author of Deere), served Oct. 18, 2021, in 20 pages.

Ref. # 459 cited in Appendix A—Prior Art List to the Preliminary Invalidity Contentions filed on behalf of Kinze Manufacturing, Inc. and Ag Leader Technology, Inc.: John Deere 7100 Folding MaxEmerge Planter OMA34000 ("Deere OMA34000") (listing a publication or prior art date of pre 2008 and a first named inventor / applicant / author of Deere), served Oct. 18, 2021, in 168 pages.

Ref. # 460 cited in Appendix A—Prior Art List to the Preliminary Invalidity Contentions filed on behalf of Kinze Manufacturing, Inc.

(56) References Cited

OTHER PUBLICATIONS and Ag Leader Technology, Inc.: John Deere 7000 Max-Emerge 6-Row Wide, 8-Row Narrow and Wide and 12-Row Narrow Drawn Planters OMA40642 ("Deere OMA40642") (listing a publication or prior art date of pre 2008 and a first named inventor / applicant / author of Deere), served Oct. 18, 2021, in 204 pages.
Ref. # 461 cited in Appendix A—Prior Art List to the Preliminary Invalidity Contentions filed on behalf of Kinze Manufacturing, Inc. and Ag Leader Technology, Inc.: John Deere MaxEmerge 2 Plate Metering Units OMH136459 ("Deere OMH136459") (listing a publication or prior art date of pre 2008 and a first named inventor / applicant / author of Deere), served Oct. 18, 2021, in 126 pages.
Ref. # 462 cited in Appendix A—Prior Art List to the Preliminary Invalidity Contentions filed on behalf of Kinze Manufacturing, Inc. and Ag Leader Technology, Inc.: FarmProgress—Deere unveils new MaxEmerge Units ("FarmProgress 2004") (listing a publication or prior art date of Nov. 18, 2004 and a first named inventor / applicant / author of FarmProgress), served Oct. 18, 2021, in 5 pages.
Ref. # 463 cited in Appendix A—Prior Art List to the Preliminary Invalidity Contentions filed on behalf of Kinze Manufacturing, Inc. and Ag Leader Technology, Inc.: Felton Brush 2005—DesignFlex ("Felton DesignFlex") (listing a publication or prior art date of 2005 and a first named inventor / applicant / author of Felton), served Oct. 18, 2021, in 2 pages.
Ref. # 464 cited in Appendix A—Prior Art List to the Preliminary Invalidity Contentions filed on behalf of Kinze Manufacturing, Inc. and Ag Leader Technology, Inc.: Felton Brush 2005—Polymer Brush offers chemical resistance ("Felton Polymer Brush") (listing a publication or prior art date of 2005 and a first named inventor / applicant / author of Felton), served Oct. 18, 2021, in 5 pages.
Ref. # 465 cited in Appendix A—Prior Art List to the Preliminary Invalidity Contentions filed on behalf of Kinze Manufacturing, Inc. and Ag Leader Technology, Inc.: Ferguson Drill Type Corn Planter Brochure (HF-4602) ("Ferguson HF-4602") (listing a publication or prior art date of 1948 and a first named inventor / applicant / author of Ferguson), served Oct. 18, 2021, in 4 pages.
Ref. # 466 cited in Appendix A—Prior Art List to the Preliminary Invalidity Contentions filed on behalf of Kinze Manufacturing, Inc. and Ag Leader Technology, Inc.: Great Plains Manufacturing, Inc. Operators Manual for PT1230 Pull-Type Folding Planter ("Great Plains 2002") (listing a publication or prior art date of Jun. 24, 2002 and a first named inventor / applicant / author of Great Plains), served Oct. 18, 2021, in 76 pages.
Ref. # 467 cited in Appendix A—Prior Art List to the Preliminary Invalidity Contentions filed on behalf of Kinze Manufacturing, Inc. and Ag Leader Technology, Inc.: Belt Conveyors and Belt Elevators ("Hetzel 1905") (listing a publication or prior art date of 1922 and a first named inventor / applicant / author of Hetzel), served Oct. 18, 2021, in 1 page.
Ref. # 468 cited in Appendix A—Prior Art List to the Preliminary Invalidity Contentions filed on behalf of Kinze Manufacturing, Inc. and Ag Leader Technology, Inc.: International Harvester_McCormick Corn Planters Brochure (CR-1038-L) ("International Harvester CR-1038-L") (listing a publication or prior art date of pre 2008 and a first named inventor / applicant / author of International Harvester), served Oct. 18, 2021, in 16 pages.
Ref. # 469 cited in Appendix A—Prior Art List to the Preliminary Invalidity Contentions filed on behalf of Kinze Manufacturing, Inc. and Ag Leader Technology, Inc.: International Harvester_McCormick Corn Planters Brochure (CR-1063-G) ("International Harvester CR-1063-G") (listing a publication or prior art date of pre 2008 and a first named inventor / applicant / author of International Harvester), served Oct. 18, 2021, in 16 pages.
Ref. # 470 cited in Appendix A—Prior Art List to the Preliminary Invalidity Contentions filed on behalf of Kinze Manufacturing, Inc. and Ag Leader Technology, Inc.: Alternative measures of accuracy in plant spacing for planters using single seed metering ASAE 38(2): 379-387 ("Kachman 1995") (listing a publication or prior art date of 1995 and a first named inventor / applicant / author of Kachman), served Oct. 18, 2021, in 9 pages.

Ref. # 471 cited in Appendix A—Prior Art List to the Preliminary Invalidity Contentions filed on behalf of Kinze Manufacturing, Inc. and Ag Leader Technology, Inc.: Kinze 3000 Series Planters Brochure (PL-12-03) ("Kinze PL-12-03") (listing a publication or prior art date of Sep. 15, 2008 and a first named inventor / applicant / author of Kinze), served Oct. 18, 2021, in 40 pages.
Ref. # 472 cited in Appendix A—Prior Art List to the Preliminary Invalidity Contentions filed on behalf of Kinze Manufacturing, Inc. and Ag Leader Technology, Inc.: Kinze Model 3600 Twin-Line Planter—Operator and Parts Manual (M0195 Rev. 8/07) ("Kinze M0195") (listing a publication or prior art date of Aug. 2007 and a first named inventor / applicant / author of Kinze), served Oct. 18, 2021, in 394 pages.
Ref. # 473 cited in Appendix A—Prior Art List to the Preliminary Invalidity Contentions filed on behalf of Kinze Manufacturing, Inc. and Ag Leader Technology, Inc.: Kinze Model 3110 3 Point Mounted Planter Operator & Parts Manual (M0183 Rev. 3/08) ("Kinze M0183") (listing a publication or prior art date of Mar. 2008 and a first named inventor / applicant / author of Kinze), served Oct. 18, 2021, in 253 pages.
Ref. # 474 cited in Appendix A—Prior Art List to the Preliminary Invalidity Contentions filed on behalf of Kinze Manufacturing, Inc. and Ag Leader Technology, Inc.: Kinze Model 3600 Twin-Line Planter—Operator and Parts Manual (M0200Rev. 11/07) ("Kinze M0200") (listing a publication or prior art date of Nov. 2007 and a first named inventor / applicant / author of Kinze), served Oct. 18, 2021, in 428 pages.
Ref. # 475 cited in Appendix A—Prior Art List to the Preliminary Invalidity Contentions filed on behalf of Kinze Manufacturing, Inc. and Ag Leader Technology, Inc .: Monosem Pneumatic Planter Type NG "Plus" Operators Manual ("Monosem NG 'Plus'") (listing a publication or prior art date of 1989 and a first named inventor / applicant / author of Monosem), served Oct. 18, 2021, in 18 pages.
Ref. # 476 cited in Appendix A—Prior Art List to the Preliminary Invalidity Contentions filed on behalf of Kinze Manufacturing, Inc. and Ag Leader Technology, Inc.: Monosem Pneumatic Planter Operators Manual Pull Type Planter (listing a publication or prior art date of 1997 and a first named inventor / applicant / author of Monosem), served Oct. 18, 2021, in 56 pages.
Ref. # 477 cited in Appendix A—Prior Art List to the Preliminary Invalidity Contentions filed on behalf of Kinze Manufacturing, Inc. and Ag Leader Technology, Inc.: Monosem Pull Type Parts Replacement Parts Manual (listing a publication or prior art date of 1997 and a first named inventor / applicant / author of Monosem), served Oct. 18, 2021, in 54 pages.
Ref. # 478 cited in Appendix A—Prior Art List to the Preliminary Invalidity Contentions filed on behalf of Kinze Manufacturing, Inc. and Ag Leader Technology, Inc.: Monosem Pneumatic Planter—Operators Manual (NGPlus (1997)) (listing a publication or prior art date of 1997 and a first named inventor / applicant / author of Monosem), served Oct. 18, 2021, in 56 pages.
Ref. # 479 cited in Appendix A—Prior Art List to the Preliminary Invalidity Contentions filed on behalf of Kinze Manufacturing, Inc. and Ag Leader Technology, Inc.: Monosem Pneumatic Planter Operators Manual NG Plus Mounted Planter Operators Manual (listing a publication or prior art date of 2000 and a first named inventor / applicant / author of Monosem), served Oct. 18, 2021, in 51 pages.
Ref. # 480 cited in Appendix A—Prior Art List to the Preliminary Invalidity Contentions filed on behalf of Kinze Manufacturing, Inc. and Ag Leader Technology, Inc.: Monosem Notice Semoirs Planter Manual (NG et NG Plus 2) ("Monosem 90090") (listing a publication or prior art date of 2002 and a first named inventor / applicant / author of Monosem), served Oct. 18, 2021, in 60 pages.
Ref. # 481 cited in Appendix A—Prior Art List to the Preliminary Invalidity Contentions filed on behalf of Kinze Manufacturing, Inc. and Ag Leader Technology, Inc.: Monosem NC-2005 Assembly, Adjustment and Maintenance Instructions ("Monosem 2005") (listing a publication or prior art date of 2005 and a first named inventor / applicant / author of Monosem), served Oct. 18, 2021, in 60 pages.
Ref. # 482 cited in Appendix A—Prior Art List to the Preliminary Invalidity Contentions filed on behalf of Kinze Manufacturing, Inc. and Ag Leader Technology, Inc.: Monosem NC-2007 Assembly,

(56) References Cited

OTHER PUBLICATIONS

Adjustment and Maintenance Instructions ("Monosem 2007") (listing a publication or prior art date of 2007 and a first named inventor / applicant / author of Monosem), served Oct. 18, 2021, in 68 pages.
Ref. # 483 cited in Appendix A—Prior Art List to the Preliminary Invalidity Contentions filed on behalf of Kinze Manufacturing, Inc. and Ag Leader Technology, Inc.: Monosem 7×7 Mounted Planter—Operator and Parts Manual (NGPlus3 (Pre 2008)) (listing a publication or prior art date of pre 2008 and a first named inventor / applicant / author of Monosem), served Oct. 18, 2021, in 83 pages.
Ref. # 484 cited in Appendix A—Prior Art List to the Preliminary Invalidity Contentions filed on behalf of Kinze Manufacturing, Inc. and Ag Leader Technology, Inc.: Monosem Twin-Row Mounted Planter—Operator and Parts Manual (NGPlus3 (2008)) (listing a publication or prior art date of pre 2008 and a first named inventor / applicant / author of Monosem), served Oct. 18, 2021, in 88 pages.
Ref. # 485 cited in Appendix A—Prior Art List to the Preliminary Invalidity Contentions filed on behalf of Kinze Manufacturing, Inc. and Ag Leader Technology, Inc.: Monosem 6 Row Unit Single Manual (listing a publication or prior art date of pre 2008 and a first named inventor / applicant / author of Monosem), served Oct. 18, 2021, in 19 pages.
Ref. # 486 cited in Appendix A—Prior Art List to the Preliminary Invalidity Contentions filed on behalf of Kinze Manufacturing, Inc. and Ag Leader Technology, Inc.: Monosem 6 Row Unit Twin Manual (listing a publication or prior art date of pre 2008 and a first named inventor / applicant / author of Monosem), served Oct. 18, 2021, in 23 pages.
Ref. # 487 cited in Appendix A—Prior Art List to the Preliminary Invalidity Contentions filed on behalf of Kinze Manufacturing, Inc. and Ag Leader Technology, Inc.: Monosem MS Mini Seed Vegetable Planter Brochure ("Monosem Jan. 2016.ms") (listing a publication or prior art date of pre 2008 and a first named inventor / applicant / author of Monosem), served Oct. 18, 2021, in 16 pages.
Ref. # 488 cited in Appendix A—Prior Art List to the Preliminary Invalidity Contentions filed on behalf of Kinze Manufacturing, Inc. and Ag Leader Technology, Inc.: Monosem 2001—Not_Semoir-NGPlus2_FR-GB-DE-NL_2001 ("Monosem 79300") (listing a publication or prior art date of pre 2008 and a first named inventor / applicant / author of Monosem), served Oct. 18, 2021, in 60 pages.
Ref. # 489 cited in Appendix A—Prior Art List to the Preliminary Invalidity Contentions filed on behalf of Kinze Manufacturing, Inc. and Ag Leader Technology, Inc.: Planters and their Components—types, attributes, functional requirements, classification and description ("Murray 2006") (listing a publication or prior art date of 2006 and a first named inventor / applicant / author of Murray), served Oct. 18, 2021, in 178 pages.
Ref. # 490 cited in Appendix A—Prior Art List to the Preliminary Invalidity Contentions filed on behalf of Kinze Manufacturing, Inc. and Ag Leader Technology, Inc.: Aspects of Seed Transfer within a Direct Drilling Coulter (Opener) ("Ritchie 1982") (listing a publication or prior art date of 1982 and a first named inventor / applicant / author of Ritchie), served Oct. 18, 2021, in 162 pages.
Ref. # 491 cited in Appendix A—Prior Art List to the Preliminary Invalidity Contentions filed on behalf of Kinze Manufacturing, Inc. and Ag Leader Technology, Inc.: Field Slope Effects on Uniformity of Corn Seed Spacing for Three Precision Planter Metering Systems ("Searle 2008") (listing a publication or prior art date of 2008 and a first named inventor / applicant / author of Searle), served Oct. 18, 2021, in 7 pages.
Ref. # 492 cited in Appendix A—Prior Art List to the Preliminary Invalidity Contentions filed on behalf of Kinze Manufacturing, Inc. and Ag Leader Technology, Inc.: Evaluate Planter Meter and Seed Tube Systems for Seed Spacing Performance of Confection Sunflower Seed to Improve Plant Spacing in the Field ("Smith Pre 2008") (listing a publication or prior art date of pre 2008 and a first named inventor / applicant / author of smith), served Oct. 18, 2021, in 13 pages.
Ref. # 493 cited in Appendix A—Prior Art List to the Preliminary Invalidity Contentions filed on behalf of Kinze Manufacturing, Inc. and Ag Leader Technology, Inc.: Engineering Principles of Agricultural Machines ("Srivastava" or "Srivastava 2006") (listing a publication or prior art date of 2006 and a first named inventor / applicant / author of Srivastava), served Oct. 18, 2021, in 155 pages.
Ref. # 494 cited in Appendix A—Prior Art List to the Preliminary Invalidity Contentions filed on behalf of Kinze Manufacturing, Inc. and Ag Leader Technology, Inc.: A Seed Transport and Delivery Mechanism for the Revolving Spade Planter ("Yeon 2000") (listing a publication or prior art date of 2000 and a first named inventor / applicant / author of Yeon), served Oct. 18, 2021, in 127 pages.
Plaintiffs Deere & Company and John Deere Shared Services, Inc. and Defendants Kinze Manufacturing, Inc. and Ag Leader Technology, Inc.'s Joint Claim Construction Chart, filed Jan. 31, 2022 (Dkt. No. 161), in 5 pages.
Appendix 1 to Plaintiffs Deere & Company and John Deere Shared Services, Inc. and Defendants Kinze Manufacturing, Inc. and Ag Leader Technology, Inc.'s Joint Claim Construction Chart: Joint Chart of Proposed Constructions, filed Jan. 31, 2022 (Dkt. No. 161-1), in 20 pages.
Appendix 2 to Plaintiffs Deere & Company and John Deere Shared Services, Inc. and Defendants Kinze Manufacturing, Inc. and Ag Leader Technology, Inc.'s Joint Claim Construction Chart: Defendants' Chart of Asserted Invalid Terms (Mixing Apparatus and Method), filed Jan. 31, 2022 (Dkt. No. 161-2), in 7 pages.
Appendix 3 to Plaintiffs Deere & Company and John Deere Shared Services, Inc. and Defendants Kinze Manufacturing, Inc. and Ag Leader Technology, Inc.'s Joint Claim Construction Chart: Plaintiffs' Chart of Proposed Constructions and Supporting Evidence, filed Jan. 31, 2022 (Dkt. No. 161-3), in 88 pages.
Appendix 4 to Plaintiffs Deere & Company and John Deere Shared Services, Inc. and Defendants Kinze Manufacturing, Inc. and Ag Leader Technology, Inc.'s Joint Claim Construction Chart: Defendants' Chart of Proposed Constructions and Supporting Evidence, filed Jan. 31, 2022 (Dkt. No. 161-4), in 186 pages.
Defendants', Kinze Manufacturing, Inc. and Ag Leader Technology, Inc.'s, Opening Claim Construction Brief, filed Feb. 23, 2022 (Dkt. No. 165), in 47 pages.
Declaration of Mark A. Hagedorn in Support of Defendants', Kinze Manufacturing, Inc. and Ag Leader Technology, Inc.'s, Opening Claim Construction Brief, filed Feb. 23, 2022 (Dkt. No. 166), in 10 pages.
Exhibits 1-10 to Defendants', Kinze Manufacturing, Inc. and Ag Leader Technology, Inc.'s, Claim Construction Brief, filed Feb. 23, 2022 (Dkt. No. 166-1), in 571 pages.
Exhibits 11-21 to Defendants', Kinze Manufacturing, Inc. and Ag Leader Technology, Inc.'s, Claim Construction Brief, filed Feb. 23, 2022 (Dkt. No. 166-2), in 408 pages.
Exhibits 22-25 to Defendants', Kinze Manufacturing, Inc. and Ag Leader Technology, Inc.'s, Claim Construction Brief, filed Feb. 23, 2022 (Dkt. No. 166-3), in 486 pages.
Exhibits 26-33 to Defendants', Kinze Manufacturing, Inc. and Ag Leader Technology, Inc.'s, Claim Construction Brief, filed Feb. 23, 2022 (Dkt. No. 166-4), in 528 pages.
Exhibits 34-43 to Defendants', Kinze Manufacturing, Inc. and Ag Leader Technology, Inc.'s, Claim Construction Brief, filed Feb. 23, 2022 (Dkt. No. 166-5), in 681 pages.
Exhibits 44-48 to Defendants', Kinze Manufacturing, Inc. and Ag Leader Technology, Inc.'s, Claim Construction Brief, filed Feb. 23, 2022 (Dkt. No. 166-6), in 580 pages.
Exhibits 49-55 to Defendants', Kinze Manufacturing, Inc. and Ag Leader Technology, Inc.'s, Claim Construction Brief, filed Feb. 23, 2022 (Dkt. No. 166-7), in 944 pages.
Exhibits 56-60 to Defendants', Kinze Manufacturing, Inc. and Ag Leader Technology, Inc.'s, Claim Construction Brief, filed Feb. 23, 2022 (Dkt. No. 166-8), in 641 pages.
Exhibits 61-66 to Defendants', Kinze Manufacturing, Inc. and Ag Leader Technology, Inc.'s, Claim Construction Brief, filed Feb. 23, 2022 (Dkt. No. 166-9), in 920 pages.
Exhibits 67-81 to Defendants', Kinze Manufacturing, Inc. and Ag Leader Technology, Inc.'s, Claim Construction Brief, filed Feb. 23, 2022 (Dkt. No. 166-10), in 494 pages.

(56) References Cited

OTHER PUBLICATIONS

Plaintiffs', Deere & Company and John Deere Shared Services, Inc.'s, Opening Claim Construction Brief, filed Feb. 23, 2022 (Dkt. No. 167), in 42 pages.
Declaration of Nathan S. Mammen in Support of Plaintiffs', Deere & Company and John Deere Shared Services, Inc.'s, Opening Claim Construction Brief, filed Feb. 23, 2022 (Dkt. No. 167-1), in 3 pages.
Exhibit 1 to Plaintiffs', Deere & Company and John Deere Shared Services, Inc.'s, Opening Claim Construction Brief, filed Feb. 23, 2022 (Dkt. No. 167-2), in 17 pages.
Exhibit 2 to Plaintiffs', Deere & Company and John Deere Shared Services, Inc.'s, Opening Claim Construction Brief, filed Feb. 23, 2022 (Dkt. No. 167-3), in 17 pages.
Exhibit 3 to Plaintiffs', Deere & Company and John Deere Shared Services, Inc.'s, Opening Claim Construction Brief, filed Feb. 23, 2022 (Dkt. No. 167-4), in 18 pages.
Exhibit 4 to Plaintiffs', Deere & Company and John Deere Shared Services, Inc.'s, Opening Claim Construction Brief, filed Feb. 23, 2022 (Dkt. No. 167-5), in 17 pages.
Exhibit 5 to Plaintiffs', Deere & Company and John Deere Shared Services, Inc.'s, Opening Claim Construction Brief, filed Feb. 23, 2022 (Dkt. No. 167-6), in 18 pages.
Exhibit 6 to Plaintiffs', Deere & Company and John Deere Shared Services, Inc.'s, Opening Claim Construction Brief, filed Feb. 23, 2022 (Dkt. No. 167-7), in 18 pages.
Exhibit 7 to Plaintiffs', Deere & Company and John Deere Shared Services, Inc.'s, Opening Claim Construction Brief, filed Feb. 23, 2022 (Dkt. No. 167-8), in 18 pages.
Exhibit 8 to Plaintiffs', Deere & Company and John Deere Shared Services, Inc.'s, Opening Claim Construction Brief, filed Feb. 23, 2022 (Dkt. No. 167-9), in 23 pages.
Exhibit 9 to Plaintiffs', Deere & Company and John Deere Shared Services, Inc.'s, Opening Claim Construction Brief, filed Feb. 23, 2022 (Dkt. No. 167-10), in 23 pages.
Exhibit 10 to Plaintiffs', Deere & Company and John Deere Shared Services, Inc.'s, Opening Claim Construction Brief, filed Feb. 23, 2022 (Dkt. No. 167-11), in 29 pages.
Exhibit 11 to Plaintiffs', Deere & Company and John Deere Shared Services, Inc.'s, Opening Claim Construction Brief, filed Feb. 23, 2022 (Dkt. No. 167-12), in 44 pages.
Exhibit 12 to Plaintiffs', Deere & Company and John Deere Shared Services, Inc.'s, Opening Claim Construction Brief, filed Feb. 23, 2022 (Dkt. No. 167-13), in 114 pages.
Exhibit 13 to Plaintiffs', Deere & Company and John Deere Shared Services, Inc.'s, Opening Claim Construction Brief, filed Feb. 23, 2022 (Dkt. No. 167-14), in 6 pages.
Exhibit 14 to Plaintiffs', Deere & Company and John Deere Shared Services, Inc.'s, Opening Claim Construction Brief, filed Feb. 23, 2022 (Dkt. No. 167-15), in 144 pages.
Exhibit 15 to Plaintiffs', Deere & Company and John Deere Shared Services, Inc.'s, Opening Claim Construction Brief, filed Feb. 23, 2022 (Dkt. No. 167-16), in 128 pages.
Exhibit 16 to Plaintiffs', Deere & Company and John Deere Shared Services, Inc.'s, Opening Claim Construction Brief, filed Feb. 23, 2022 (Dkt. No. 167-17), in 17 pages.
Exhibit 17 to Plaintiffs', Deere & Company and John Deere Shared Services, Inc.'s, Opening Claim Construction Brief, filed Feb. 23, 2022 (Dkt. No. 167-18), in 9 pages.
Exhibit 18 to Plaintiffs', Deere & Company and John Deere Shared Services, Inc.'s, Opening Claim Construction Brief, filed Feb. 23, 2022 (Dkt. No. 167-19), in 5 pages.
Exhibit 19 to Plaintiffs', Deere & Company and John Deere Shared Services, Inc.'s, Opening Claim Construction Brief, filed Feb. 23, 2022 (Dkt. No. 167-20), in 4 pages.
Defendants', Kinze Manufacturing, Inc. and Ag Leader Technology, Inc.'s, Rebuttal Claim Construction Brief (Redacted Version), filed Mar. 22, 2022 (Dkt. No. 175), in 43 pages.
Rebuttal Declaration of Dr. John Long, Ph.D., P.E. in Support of Defendants', Kinze Manufacturing, Inc. and Ag Leader Technology, Inc.'s, Rebuttal Claim Construction Brief, filed Mar. 22, 2022 (Dkt. No. 175-1), in 25 pages.
Declaration of Mark A. Hagedorn in Support of Defendants', Kinze Manufacturing, Inc. and Ag Leader Technology, Inc.'s, Rebuttal Claim Construction Brief, filed Mar. 22, 2022 (Dkt. No. 175-2), in 4 pages.
Exhibits 83 to Defendants', Kinze Manufacturing, Inc. and Ag Leader Technology, Inc.'s, Claim Construction Brief, filed Mar. 22, 2022 (Dkt. No. 175-3), in 86 pages.
Exhibits 84 to Defendants', Kinze Manufacturing, Inc. and Ag Leader Technology, Inc.'s, Claim Construction Brief, filed Mar. 22, 2022 (Dkt. No. 175-4), in 27 pages.
Exhibits 86 to Defendants', Kinze Manufacturing, Inc. and Ag Leader Technology, Inc.'s, Claim Construction Brief, filed Mar. 22, 2022 (Dkt. No. 175-6), in 8 pages.
Exhibits 89 to Defendants', Kinze Manufacturing, Inc. and Ag Leader Technology, Inc.'s, Claim Construction Brief, filed Mar. 22, 2022 (Dkt. No. 175-9), in 22 pages.
Exhibits 92 to Defendants', Kinze Manufacturing, Inc. and Ag Leader Technology, Inc.'s, Claim Construction Brief, filed Mar. 22, 2022 (Dkt. No. 175-12), in 8 pages.
Plaintiffs', Deere & Company and John Deere Shared Services, Inc.'s, Reply Claim Construction Brief, filed Mar. 22, 2022 (Dkt. No. 176), in 43 pages.
Declaration of Nathan S. Mammen in Support of Plaintiffs', Deere & Company and John Deere Shared Services, Inc.'s, Reply Claim Construction Brief, filed Mar. 22, 2022 (Dkt. No. 176-1), in 3 pages.
Exhibit 20 to Plaintiffs', Deere & Company and John Deere Shared Services, Inc.'s, Reply Claim Construction Brief, filed Mar. 22, 2022 (Dkt. No. 176-2), in 10 pages.
Exhibit 21 to Plaintiffs', Deere & Company and John Deere Shared Services, Inc.'s, Reply Claim Construction Brief, filed Mar. 22, 2022 (Dkt. No. 176-3), in 20 pages.
Exhibit 22 to Plaintiffs', Deere & Company and John Deere Shared Services, Inc.'s, Reply Claim Construction Brief, filed Mar. 22, 2022 (Dkt. No. 176-4), in 71 pages.
Exhibit 23 to Plaintiffs', Deere & Company and John Deere Shared Services, Inc.'s, Reply Claim Construction Brief, filed Mar. 22, 2022 (Dkt. No. 176-5), in 46 pages.
Exhibit 24 to Plaintiffs', Deere & Company and John Deere Shared Services, Inc.'s, Reply Claim Construction Brief, filed Mar. 22, 2022 (Dkt. No. 176-6), in 27 pages.
Exhibit 25 to Plaintiffs', Deere & Company and John Deere Shared Services, Inc.'s, Reply Claim Construction Brief, filed Mar. 22, 2022 (Dkt. No. 176-7), in 26 pages.
Exhibit 26 to Plaintiffs', Deere & Company and John Deere Shared Services, Inc.'s, Reply Claim Construction Brief, filed Mar. 22, 2022 (Dkt. No. 176-8), in 6 pages.
Exhibit 27 to Plaintiffs', Deere & Company and John Deere Shared Services, Inc.'s, Reply Claim Construction Brief, filed Mar. 22, 2022 (Dkt. No. 176-9), in 53 pages.
Exhibit 28 to Plaintiffs', Deere & Company and John Deere Shared Services, Inc.'s, Reply Claim Construction Brief, filed Mar. 22, 2022 (Dkt. No. 176-10), in 15 pages.
Exhibit 29 to Plaintiffs', Deere & Company and John Deere Shared Services, Inc.'s, Reply Claim Construction Brief, filed Mar. 22, 2022 (Dkt. No. 176-11), in 15 pages.
Exhibit 30 to Plaintiffs', Deere & Company and John Deere Shared Services, Inc.'s, Reply Claim Construction Brief, filed Mar. 22, 2022 (Dkt. No. 176-12), in 50 pages.
Exhibit 31 to Plaintiffs', Deere & Company and John Deere Shared Services, Inc.'s, Reply Claim Construction Brief, filed Mar. 22, 2022 (Dkt. No. 176-13), in 40 pages.
Exhibit 32 to Plaintiffs', Deere & Company and John Deere Shared Services, Inc.'s, Reply Claim Construction Brief, filed Mar. 22, 2022 (Dkt. No. 176-14), in 50 pages.
Transcript of Markman Hearing in *Deere & Company et al.* v. *Kinze Manufacturing, Inc., et al.,* held on Monday, Mar. 28, 2022 (Dkt. No. 193), in 242 pages.

(56) References Cited

OTHER PUBLICATIONS

Kinze Manufacturing, Inc. and Ag Leader Technology, Inc.'s Supplemental Preliminary Invalidity Contentions, served Jun. 10, 2022, in 39 pages.
Supplemental Appendix B to Kinze Manufacturing, Inc. and Ag Leader Technology, Inc.'s Supplemental Preliminary Invalidity Contentions, Exemplary Motivations to Combine, served Jun. 10, 2022, in 123 pages.
Supplemental Appendix C to Kinze Manufacturing, Inc. and Ag Leader Technology, Inc.'s Supplemental Preliminary Invalidity Contentions, Prior Art Grouped to Claimed Prior Art Concepts, served Jun. 10, 2022, in 339 pages.
Exhibit 99 to Kinze Manufacturing, Inc. and Ag Leader Technology, Inc.'s Preliminary Invalidity Contentions relating to a Claim Chart—U.S. Pat. No. 9,686,906 & Russian Patent No. RU 2 137 337 ("RU 337"), served Jun. 10, 2022, in 15 pages.
Exhibit 100 to Kinze Manufacturing, Inc. and Ag Leader Technology, Inc.'s Preliminary Invalidity Contentions relating to a Claim Chart—U.S. Pat. No. Re. 48,572 & Russian Patent No. RU 2 137 337 ("RU 337"), served Jun. 10, 2022, in 116 pages.
Exhibit 101 to Kinze Manufacturing, Inc. and Ag Leader Technology, Inc.'s Preliminary Invalidity Contentions relating to a Claim Chart—U.S. Pat. No. 9,807,924 & Russian Patent No. RU 2 137 337 ("RU 337"), served Jun. 10, 2022, in 9 pages.
Exhibit 102 to Kinze Manufacturing, Inc. and Ag Leader Technology, Inc.'s Preliminary Invalidity Contentions relating to a Claim Chart—U.S. Pat. No. 9,861,031 & Russian Patent No. RU 2 137 337 ("RU 337"), served Jun. 10, 2022, in 15 pages.
Exhibit 103 to Kinze Manufacturing, Inc. and Ag Leader Technology, Inc.'s Preliminary Invalidity Contentions relating to a Claim Chart—U.S. Pat. No. 10,004,173 & Russian Patent No. 2137337 (RU 337), served Jun. 10, 2022, in 24 pages.
Exhibit 104 to Kinze Manufacturing, Inc. and Ag Leader Technology, Inc.'s Preliminary Invalidity Contentions relating to a Claim Chart—U.S. Pat. No. 8,813,663 & Russian Patent No. RU 2 137 337 ("RU 337"), served Jun. 10, 2022, in 29 pages.
Exhibit 105 to Kinze Manufacturing, Inc. and Ag Leader Technology, Inc.'s Preliminary Invalidity Contentions relating to a Claim Chart—U.S. Pat. No. 9,699,955 & Russian Patent No. RU 2 137 337 ("RU 337"), served Jun. 10, 2022, in 12 pages.
Exhibit 106 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Russian Patent No. RU 2 137 337 ("RU 337"), served Jun. 10, 2022, in 53 pages.
Exhibit 107 to Kinze Manufacturing, Inc. and Ag Leader Technology, Inc.'s Preliminary Invalidity Contentions relating to a Claim Chart—U.S. Pat. No. 9,480,199 & Russian Patent No. RU 2 137 337 ("RU 337"), served Jun. 10, 2022, in 19 pages.
Exhibit 108 to Kinze Manufacturing, Inc. and Ag Leader Technology, Inc.'s Preliminary Invalidity Contentions relating to a Claim Chart—U.S. Pat. No. 8,850,998 & Russian Patent No. RU 2 137 337 ("RU 337"), served Jun. 10, 2022, in 10 pages.
Exhibit 109 to Kinze Manufacturing, Inc. and Ag Leader Technology, Inc.'s Preliminary Invalidity Contentions relating to a Claim Chart—U.S. Pat. No. Re. 48,572 & Soviet Union Inventor's Certificate No. 281928 ("SU 928"), served Jun. 10, 2022, in 114 pages.
Exhibit 110 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 281928 ("SU 928"), served Jun. 10, 2022, in 13 pages.
Exhibit 111 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 281928 ("SU 928"), served Jun. 10, 2022, in 15 pages.
Exhibit 112 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 281928 ("SU 928"), served Jun. 10, 2022, in 23 pages.
Exhibit 113 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 281928 ("SU 928"), served Jun. 10, 2022, in 24 pages.
Exhibit 114 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Soviet Union Inventor's Certificate No. 281928 ("SU 928"), served Jun. 10, 2022, in 86 pages.
Exhibit 115 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 281928 ("SU 928"), served Jun. 10, 2022, in 11 pages.
Exhibit 116 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 281928 ("SU 928"), served Jun. 10, 2022, in 11 pages.
Exhibit 117 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 281928 ("SU 928"), served Jun. 10, 2022, in 18 pages.
Exhibit 118 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 281928 ("SU 928"), served Jun. 10, 2022, in 27 pages.
Exhibit 119 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 445391 ("SU 391"), served Jun. 10, 2022, in 16 pages.
Exhibit 120 to Kinze Manufacturing, Inc. and Ag Leader Technology, Inc.'s Preliminary Invalidity Contentions relating to a Claim Chart—U.S. Pat. No. Re. 48,572 & Soviet Union Inventor's Certificate No. 445391 ("SU 391"), served Jun. 10, 2022, in 110 pages.
Exhibit 121 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 445391 ("SU 391"), served Jun. 10, 2022, in 13 pages.
Exhibit 122 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 445391 ("SU 391"), served Jun. 10, 2022, in 19 pages.
Exhibit 123 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 445391 ("SU 391"), served Jun. 10, 2022, in 24 pages.
Exhibit 124 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 445391 ("SU 391"), served Jun. 10, 2022, in 13 pages.
Exhibit 125 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 445391 ("SU 391"), served Jun. 10, 2022, in 9 pages.
Exhibit 126 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 445391 ("SU 391"), served Jun. 10, 2022, in 9 pages.
Exhibit 127 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Soviet Union Inventor's Certificate No. 445391 ("SU 391"), served Jun. 10, 2022, in 85 pages.
Exhibit 128 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 445391 ("SU 391"), served Jun. 10, 2022, in 23 pages.
Exhibit 129 to Kinze Manufacturing, Inc. and Ag Leader Technology, Inc.'s Preliminary Invalidity Contentions relating to a Claim Chart—U.S. Pat. No. 10,004,173 & Soviet Union Inventor's Certificate No. 264033 ("SU 033"), served Jun. 10, 2022, in 32 pages.

(56) References Cited

OTHER PUBLICATIONS

Exhibit 130 to Kinze Manufacturing, Inc. and Ag Leader Technology, Inc.'s Preliminary Invalidity Contentions relating to a Claim Chart—U.S. Pat. No. 9,480,199 & Soviet Union Inventor's Certificate No. 264033 ("SU 033"), served Jun. 10, 2022, in 25 pages.
Exhibit 131 to Kinze Manufacturing, Inc. and Ag Leader Technology, Inc.'s Preliminary Invalidity Contentions relating to a Claim Chart—U.S. Pat. No. 10,729,063 (Claims 1-8 and 10-19) & Soviet Union Inventor's Certificate No. 264033 ("SU 033"), served Jun. 10, 2022, in 92 pages.
Exhibit 132 to Kinze Manufacturing, Inc. and Ag Leader Technology, Inc.'s Preliminary Invalidity Contentions relating to a Claim Chart—U.S. Pat. No. 9,861,031 & Soviet Union Inventor's Certificate No. 264033 ("SU 033"), served Jun. 10, 2022, in 19 pages.
Exhibit 133 to Kinze Manufacturing, Inc. and Ag Leader Technology, Inc.'s Preliminary Invalidity Contentions relating to a Claim Chart—U.S. Pat. No. 9,699,955 & Soviet Union Inventor's Certificate No. 264033 ("SU 033"), served Jun. 10, 2022, in 17 pages.
Exhibit 134 to Kinze Manufacturing, Inc. and Ag Leader Technology, Inc.'s Preliminary Invalidity Contentions relating to a Claim Chart—U.S. Pat. No. 9,807,924 & Soviet Union Inventor's Certificate No. 264033 ("SU 033"), served Jun. 10, 2022, in 14 pages.
Exhibit 135 to Kinze Manufacturing, Inc. and Ag Leader Technology, Inc.'s Preliminary Invalidity Contentions relating to a Claim Chart—U.S. Pat. No. 8,813,663 (Claims 1, 4 and 6) & Soviet Union Inventor's Certificate No. 264033 ("SU 033"), served Jun. 10, 2022, in 40 pages.
Exhibit 136 to Kinze Manufacturing, Inc. and Ag Leader Technology, Inc.'s Preliminary Invalidity Contentions relating to a Claim Chart—U.S. Patent No. RE48,572 & Soviet Union Inventor's Certificate No. 264033 ("SU 033"), served Jun. 10, 2022, in 80 pages.
Exhibit 137 to Kinze Manufacturing, Inc. and Ag Leader Technology, Inc.'s Preliminary Invalidity Contentions relating to a Claim Chart—U.S. Pat. No. 8,850,998 & Soviet Union Inventor's Certificate No. 264033 ("SU 033"), served Jun. 10, 2022, in 16 pages.
Exhibit 138 to Kinze Manufacturing, Inc. and Ag Leader Technology, Inc.'s Preliminary Invalidity Contentions relating to a Claim Chart—U.S. Pat. No. 9,686,906 & Soviet Union Inventor's Certificate No. 264033 ("SU 033"), served Jun. 10, 2022, in 22 pages.
Ref. # 581 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Plant-to-Stand Field Performance of Sugar Beet Planters" (Smyrillis 2002) (listing a publication or prior art date of 2002 and a first named inventor / applicant / author of Smyrillis), served Jun. 10, 2022, in 122 pages.
Ref. # 582 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Comparison of Two Planters for Sweet Corn (Fla. State Hort. Soc., 77:152-155 (1964) (listing a publication or prior art date of 1964 and a first named inventor / applicant / author of Guzman), served Jun. 10, 2022, in 4 pages.
Ref. # 583 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: Twose Mounted Seed Drill Brochure (listing a publication or prior art date of pre 2008 and a first named inventor / applicant / author of Twose), served Jun. 10, 2022, in 4 pages.
Ref. # 584 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 33 Vegetable Planter—Operators Manual (OMA25188 E3) (listing a publication or prior art date of pre 2008 and a first named inventor / applicant / author of Deere), served Jun. 10, 2022, in 20 pages.
Ref. # 585 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 33 Vegetable Planter—Parts Catalog (PC-1045) (listing a publication or prior art date of pre 2008 and a first named inventor / applicant / author of Deere), served Jun. 10, 2022, in 10 pages.
Ref. # 586 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "Here's the greatest news in Corn Planter History—John Deere's New Plateless Corn Planters" (B822 68-6 Litho in U.S.A.) (listing a publication or prior art date of pre 2008 and a first named inventor / applicant / author of Deere), served Jun. 10, 2022, in 8 pages.
Ref. # 587 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "The Planter With the Magic Fingers," The Farm Quarterly/Fall 1968 (reprint) (B-848-69-1 Litho in U.S.A.) ("The Farm Quarterly—Fall 1968") (listing a publication or prior art date of pre 2008 and a first named inventor / applicant / author of Deere), served Jun. 10, 2022, in 8 pages.
Ref. # 588 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 1240 Plateless Planter—Predelivery Instructions (PDI-B25436) (listing a publication or prior art date of pre 2008 and a first named inventor / applicant / author of Deere), served Jun. 10, 2022, in 24 pages.
Ref. # 589 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: John Deere 1240 Plateless Planter—Parts Catalog (PC-1143) (listing a publication or prior art date of pre 2008 and a first named inventor / applicant / author of Deere), served Jun. 10, 2022, in 41 pages.
Ref. # 590 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: New 80 Plateless Unit Planters (A-16T-1-71-1 Litho in U.S.A.) (listing a publication or prior art date of pre 2008 and a first named inventor / applicant / author of Deere), served Jun. 10, 2022, in 6 pages.
Ref. # 591 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: International Harvester—Sales Know-how Bulletin (No. 61- 3 (listing a publication or prior art date of 1961and a first named inventor / applicant / author of Int'l Harvester), served Jun. 10, 2022, in 4 pages.
Ref. # 592 cited in the table labeled "Non-Patent Literature" shown on pp. 9-10 of the Supplemental Preliminary Invalidity Contentions filed on behalf of Kinze Manufacturing, Inc. and Ag Leader Technology, Inc.: "The Operation Care and Repair of Farm Machinery" (listing a publication or prior art date of 1957 and a first named inventor / applicant / author of Deere), served Jun. 10, 2022, in 31 pages.
Defendants', Kinze Manufacturing, Inc. and Ag Leader Technology, Inc.'s, Motion to Amend Their Counterclaims to Include (1) Inequitable Conduct Claims and (2) a Claim of Abuse of Process (Redacted), filed Apr. 29, 2022 (Dkt. No. 190), in 15 pages.
Exhibit A to Defendants', Kinze Manufacturing, Inc. and Ag Leader Technology, Inc.'s, Motion to Amend Their Counterclaims to Include (1) Inequitable Conduct Claims and (2) a Claim of Abuse of Process: Kinze Manufacturing, Inc. and Ag Leader Technology, Inc.'s Counterclaims, Answer and Affirmative Defenses to Plaintiffs' Second Amended and Supplemental Complaint (Redacted), filed Apr. 29, 2022 (Dkt. No. 190-1), in 343 pages.
Exhibit B to Defendants', Kinze Manufacturing, Inc. and Ag Leader Technology, Inc.'s, Motion to Amend Their Counterclaims to Include (1) Inequitable Conduct Claims and (2) a Claim of Abuse of Process: Kinze Manufacturing, Inc. and Ag Leader Technology, Inc.'s Alternative Counterclaims, Answer and Affirmative Defenses to Plaintiffs' Second Amended and Supplemental Complaint (Redacted), filed Apr. 29, 2022 (Dkt. No. 190-2), in 348 pages.

(56) References Cited

OTHER PUBLICATIONS

Defendants', Kinze Manufacturing, Inc. and Ag Leader Technology, Inc.'s, Combined (1) Resistance to Motion to Dismiss Counterclaims for Inequitable Conduct and (2) Reply in Support of Motion for Leave to File a Counterclaim for Abuse of Process (Redacted), filed Jul. 8, 2022 (Dkt. No. 201), in 43 pages.
Defendants', Kinze Manufacturing, Inc. and Ag Leader Technology, Inc.'s, Sur-Reply on Motion to Dismiss Counterclaims for Inequitable Conduct (Redacted), filed Jul. 29, 2022 (Dkt. No. 211), in 10 pages.
Defendants', Kinze Manufacturing, Inc. and Ag Leader Technology, Inc.'s, Motion to Amend Counterclaim for Inequitable Conduct (Redacted), filed Oct. 21, 2022 (Dkt. No. 226), in 5 pages.
Defendants', Kinze Manufacturing, Inc. and Ag Leader Technology, Inc.'s, Second Amended Counterclaims, Answer, and Affirmative Defenses to Plaintiffs' Second Amended and Supplemental Complaint (Redacted), filed Oct. 21, 2022 (Dkt. No. 226-1), in 340 pages.
Defendants', Kinze Manufacturing, Inc. and Ag Leader Technology, Inc.'s, Brief in Support of Their Motion to Amend Their Inequitable Conduct Counterclaim (Redacted), filed Oct. 21, 2022 (Dkt. No. 226-3), in 11 pages.
Defendants', Kinze Manufacturing, Inc. and Ag Leader Technology, Inc.'s, Reply in Support of Motion to Amend Their Inequitable Conduct Counterclaim (Redacted), filed Dec. 5, 2022 (Dkt. No. 242), in 16 pages.
Screenshots taken from video John Deere Day Movies—1961—25th Anniversary (DVD #3), including: (1) John Deere Day Show 1961—The 25th Anniversary; and (2) Farming Frontiers 1971, Two-Cylinder Club, 2009 (reproducing ancient video footage).
Transcript of video John Deere Day Movies—1961—25th Anniversary (DVD #3), including: (1) John Deere Day Show 1961—The 25th Anniversary; and (2) Farming Frontiers 1971, Two-Cylinder Club, 2009 (reproducing ancient video footage), in 18 pages.
Case cover and disc of video John Deere Day Movies–1961—25th Anniversary (DVD #3), including: (1) John Deere Day Show 1961—The 25th Anniversary; and (2) Farming Frontiers 1971, Two-Cylinder Club, 2009 (reproducing ancient video footage), in 2 pages.
Screenshots taken from video John Deere Day Movies—1960 1963 (DVD #4), including: (1) John Deere Day 1963; and (2) Industrial Equipment—1960, Two-Cylinder Club, 2011 (reproducing ancient video footage).
Transcript of video John Deere Day Movies—1960 1963 (DVD #4), including: (1) John Deere Day 1963; and (2) Industrial Equipment—1960, Two-Cylinder Club, 2011 (reproducing ancient video footage), in 29 pages.
Case cover and disc of video John Deere Day Movies—1960 1963 (DVD #4), including: (1) John Deere Day 1963; and (2) Industrial Equipment—1960, Two-Cylinder Club, 2011 (reproducing ancient video footage), in 2 pages.
Screenshots taken from video John Deere Day Movies—1960 (DVD #9), including: (1) The final year of the "30" Series Tractors—COLOR (150 minutes). Host is Walter Cronkite; (2) Oddities In Farming; plow manufacturing field reports on the "430", "530", "630", "730", and "830"; (3) What's New for 1960 features the "435" and 8010. Final John Deere Day Show of the Two-Cylinder Era; and (4) Why Only Two Cylinders? (bonus film), Two-Cylinder Club, 2011 (reproducing ancient video footage).
Transcript of video John Deere Day Movies—1960 (DVD #9), including: (1) The final year of the "30" Series Tractors—COLOR (150 minutes). Host is Walter Cronkite; (2) Oddities In Farming; plow manufacturing field reports on the "430", "530", "630", "730", and "830"; (3) What's New for 1960 features the "435" and 8010. Final John Deere Day Show of the Two- Cylinder Era; and (4) Why Only Two Cylinders? (bonus film), Two-Cylinder Club, 2011 (reproducing ancient video footage), in 46 pages.
Case cover and disc of video John Deere Day Movies—1960 (DVD #9), including: (1) The final year of the "30" Series Tractors—COLOR (150 minutes). Host is Walter Cronkite; (2) Oddities In Farming; plow manufacturing field reports on the "430", "530", "630", "730", and "830"; (3) What's New for 1960 features the "435" and 8010. Final John Deere Day Show of the Two-Cylinder Era; and (4) Why Only Two Cylinders? (bonus film), Two-Cylinder Club, 2011 (reproducing ancient video footage), in 2 pages.
Deere & Company Operator's Manual, 1770NT 16-Row Narrow Flex-Fold Planter (OMA68779 K1 (English)), dated 1999, in 398 pages.
American Agriculturalist, The Farm Paper of the Northeast Published 24 Times a Year, Feb. 4, 1961, in 32 pages.
Deere & Company Product Brochure, 494-A and 495-A Four-Row Corn Planters (A1477-64-11-Pltr.), dated 1964, in 26 pages.
John Deere, The Furrow (Jan.-Feb. 1961) vol. 66 (1961) ("Deere Furrow Magazine Jan. 1961"), in 32 pages.
John Deere, The Furrow (Mar.-Apr. 1961) vol. 66 (1961) ("Deere Furrow Magazine Mar. 1961"), in 32 pages.
Exhibit 2214 to the Inter Partes Review of U.S. Pat. No. 9,820,429, filed on behalf of Precision Planting, LLC and AGCO Corp., ExactEmerge Claim Chart for U.S. Pat. No. 9,820,429, filed Apr. 23, 2020, in 82 pages.
Exhibit 2217 to the Inter Partes Review of U.S. Pat. No. 9,807,924, filed on behalf of Precision Planting, LLC and AGCO Corp., ExactEmerge Claim Chart for U.S. Pat. No. 9,807,924, filed Mar. 24, 2020, in 82 pages.
Drew, Charles C., The Chickasha Daily Express (Chickasha, Okla.), vol. 86, No. 39, Ed. 1 Sunday, Apr. 23, 1978, in 1 page.
Opening Expert Report of Antoinette M. Tease in support of positions taken by Defendants Kinze Manufacturing, Inc. and Ag Leader Technology, Inc. (regarding alleged inequitable conduct), served Feb. 3, 2023, in 45 pages.
Exhibit A to the Opening Expert Report of Antoinette M. Tease: Curriculum Vitae, Publications, and Prior Testimony, served Feb. 3, 2023, in 31 pages.
Exhibit B to the Opening Expert Report of Antoinette M. Tease: Materials Considered, served Feb. 3, 2023, in 3 pages.
Rebuttal Expert Report of Antoinette M. Tease in support of positions taken by Defendants Kinze Manufacturing, Inc. and Ag Leader Technology, Inc. (regarding alleged inequitable conduct), served Mar. 31, 2023, in 29 pages.
Exhibit A to the Rebuttal Expert Report of Antoinette M. Tease: USPTO PowerPoint presentation entitled "Examination Time and the Production System", served Mar. 31, 2023, in 20 pages.
Exhibit B to the Rebuttal Expert Report of Antoinette M. Tease: Russia / Patent Law / #3517-I of Sep. 23, 1992, as amended by the federal law 22-FZ of Feb. 7, 2003 (allegedly discussing patentability requirements under Russian law), served Mar. 31, 2023, in 42 pages.
Exhibit C to the Rebuttal Expert Report of Antoinette M. Tease: Article by Frakes et al., entitled "Is the Time Allocated to Review Patent Applications Inducing Examiners to Grant Invalid Patents?: Evidence from Micro-Level Application Data" (2017), served Mar. 31, 2023, in 58 pages.
Exhibit D to the Rebuttal Expert Report of Antoinette M. Tease: Article by Kazakov, entitled "Obtaining Information on Patent Applications" (2015), served Mar. 31, 2023, in 4 pages.
Opening Expert Report of Dr. John Long, Ph.D., P.E. in support of positions taken by Defendants Kinze Manufacturing, Inc. and Ag Leader Technology, Inc. (regarding alleged invalidity of Plaintiffs' Asserted Patents), served Feb. 3, 2023, in 840 pages.
Exhibit A to the Opening Expert Report of Dr. John Long, Ph.D., P.E.: Curriculum Vitae, Publications, and Prior Testimony, served Feb. 3, 2023, in 24 pages.
Exhibit B to the Opening Expert Report of Dr. John Long, Ph.D., P.E.: Materials Considered, served Feb. 3, 2023, in 8 pages.
Claim Chart 1 Appended to the Opening Expert Report of Dr. John Long, Ph.D., P.E., Claim Chart—U.S. Pat. No. 9,861,031 | John Deere Model 495/495A/695A Planter Products ("Deere 495A" or "Model 495A"), served Feb. 3, 2023, in 48 pages.
Claim Chart 2 Appended to the Opening Expert Report of Dr. John Long, Ph.D., P.E., Claim Chart—U.S. Pat. No. 9,861,031 (Claims 1, 2, 4, 5, 8 & 9) | U.S. Patent Application Publication No. 2010/0192819 to Garner ("Garner 819"), served Feb. 3, 2023, in 21 pages.

(56) References Cited

OTHER PUBLICATIONS

Claim Chart 3 Appended to the Opening Expert Report of Dr. John Long, Ph.D., P.E., Claim Chart—U.S. Pat. No. 9,861,031 | French Patent Application Publication No. FR 2 591 061 to Gras ("Gras 061"), served Feb. 3, 2023, in 34 pages.
Claim Chart 4 Appended to the Opening Expert Report of Dr. John Long, Ph.D., P.E., Claim Chart—U.S. Pat. No. 9,861,031 | German Published Patent Application DE2826658A1 ("Holdt" or "Holdt 658"), served Feb. 3, 2023, in 31 pages.
Claim Chart 5 Appended to the Opening Expert Report of Dr. John Long, Ph.D., P.E., Claim Chart—U.S. Pat. No. 9,861,031 | Russian Patent No. RU 2 137 337 ("RU 337"), served Feb. 3, 2023, in 11 pages.
Claim Chart 6 Appended to the Opening Expert Report of Dr. John Long, Ph.D., P.E., Claim Chart—U.S. Pat. No. 9,861,031 | U.S. Pat. No. 6,681,706 ("Sauder 706"), served Feb. 3, 2023, in 64 pages.
Claim Chart 7 Appended to the Opening Expert Report of Dr. John Long, Ph.D., P.E., Claim Chart—U.S. Pat. No. 9,861,031 | Soviet Union Inventor's Certificate No. 445391 ("SU 391"), served Feb. 3, 2023, in 14 pages.
Claim Chart 8 Appended to the Opening Expert Report of Dr. John Long, Ph.D., P.E., Claim Chart—U.S. Pat. No. 10,729,063 (claims 1-8 and 10-19) | U.K. Patent Application No. GB 2,012,534A ("Curtis 534" or "Curtis GB" or "Curtis GB 534"), served Feb. 3, 2023, in 40 pages.
Claim Chart 9 Appended to the Opening Expert Report of Dr. John Long, Ph.D., P.E., Claim Chart—U.S. Pat. No. 10,729,063 (Claims 1-8 and 10-19) | John Deere Model 495/495A/695A Planter Products ("Deere 495A" or "Model 495A"), served Feb. 3, 2023, in 84 pages.
Claim Chart 10 Appended to the Opening Expert Report of Dr. John Long, Ph.D., P.E., Claim Chart—U.S. Pat. No. 10,729,063 | Deere Prior Art Vacuum Planters ("Deere Prior Art vacuum Planters"), served Feb. 3, 2023, in 64 pages.
Claim Chart 11 Appended to the Opening Expert Report of Dr. John Long, Ph.D., P.E., Claim Chart—U.S. Pat. No. 10,729,063 (Claims 1-8, 10-19) | U.S. Appl. No. 12/364,010 (Publication No. US 2010/0192819 "819 Publication" or "Garner 819"), served Feb. 3, 2023, in 16 pages.
Claim Chart 12 Appended to the Opening Expert Report of Dr. John Long, Ph.D., P.E., Claim Chart—U.S. Pat. No. 10,729,063 (Claims 1-8 and 10-19) | French Patent Application Publication No. FR 2 591 061 ("Gras 061"), served Feb. 3, 2023, in 64 pages.
Claim Chart 13 Appended to the Opening Expert Report of Dr. John Long, Ph.D., P.E., Claim Chart—U.S. Pat. No. 10,729,063 (Claims 1-8 and 10-19) | UK Patent Application GB 2057835A ("Hedderwick" or "Hedderwick 835"), served Feb. 3, 2023, in 33 pages.
Claim Chart 14 Appended to the Opening Expert Report of Dr. John Long, Ph.D., P.E., Claim Chart—U.S. Pat. No. 10,729,063 | German Published Patent Application DE2826658A1 ("Holdt" or "Holdt 658"), served Feb. 3, 2023, in 86 pages.
Claim Chart 15 Appended to the Opening Expert Report of Dr. John Long, Ph.D., P.E., Claim Chart—U.S. Pat. No. 10,729,063 (Claims 1-8 and 10-19) | Russian Patent No. RU 2 137 337 ("RU 337"), served Feb. 3, 2023, in 47 pages.
Claim Chart 16 Appended to the Opening Expert Report of Dr. John Long, Ph.D., P.E., Claim Chart—U.S. Pat. No. 10,729,063 (Claims 1-8 and 10-19) | U.S. Pat. No. 6,681,706 ("Sauder 706"), served Feb. 3, 2023, in 133 pages.
Claim Chart 17 Appended to the Opening Expert Report of Dr. John Long, Ph.D., P.E., Claim Chart—U.S. Pat. No. 10,729,063 (Claims 1-8 and 10-19) | Soviet Union Inventor's Certificate No. 445391 ("SU 391"), served Feb. 3, 2023, in 55 pages.
Claim Chart 18 Appended to the Opening Expert Report of Dr. John Long, Ph.D., P.E., Claim Chart—U.S. Pat. No. 10,004,173 | U.K. Patent Application No. GB 2,012,534A ("Curtis 534" or "Curtis GB" or "Curtis GB 534"), served Feb. 3, 2023, in 23 pages.
Claim Chart 19 Appended to the Opening Expert Report of Dr. John Long, Ph.D., P.E., Claim Chart—U.S. Pat. No. 10,004,173 | John Deere Model 495/495A/695A Planter Products ("Deere 495A" or "Model 495A"), served Feb. 3, 2023, in 64 pages.
Claim Chart 20 Appended to the Opening Expert Report of Dr. John Long, Ph.D., P.E., Claim Chart—U.S. Pat. No. 10,004,173 (Claims 1-4, 6, 11-16) | U.S. Patent Application Publication No. 2010/0192819 to Garner ("Garner 819"), served Feb. 3, 2023, in 17 pages.
Claim Chart 21 Appended to the Opening Expert Report of Dr. John Long, Ph.D., P.E., Claim Chart—U.S. Pat. No. 10,004,173 | French Patent Application Publication No. FR 2 591 061 to Gras ("Gras 061"), served Feb. 3, 2023, in 56 pages.
Claim Chart 22 Appended to the Opening Expert Report of Dr. John Long, Ph.D., P.E., Claim Chart—U.S. Pat. No. 10,004,173 | UK Patent Application GB 2057835A ("Hedderwick 835"), served Feb. 3, 2023, in 69 pages.
Claim Chart 23 Appended to the Opening Expert Report of Dr. John Long, Ph.D., P.E., Claim Chart—U.S. Pat. No. 10,004,173 | German Published Patent Application DE2826658A1 ("Holdt" or "Holdt 658"), served Feb. 3, 2023, in 46 pages.
Claim Chart 24 Appended to the Opening Expert Report of Dr. John Long, Ph.D., P.E., Claim Chart—U.S. Patent No. 10,004, 173 | Russian Patent No. 2137337 (RU 337), served Feb. 3, 2023, in 20 pages.
Claim Chart 25 Appended to the Opening Expert Report of Dr. John Long, Ph.D., P.E., Claim Chart—U.S. Pat. No. 10,004,173 | U.S. Pat. No. 6,681,706 ("Sauder 706"), served Feb. 3, 2023, in 122 pages.
Claim Chart 26 Appended to the Opening Expert Report of Dr. John Long, Ph.D., P.E., Claim Chart—U.S. Pat. No. 10,004,173 | Soviet Union Inventor's Certificate No. 445391 ("SU 391"), served Feb. 3, 2023, in 19 pages.
Claim Chart 27 Appended to the Opening Expert Report of Dr. John Long, Ph.D., P.E., Claim Chart—U.S. Pat. No. 9,480,199 (Claims 1-6) | U.S. Pat. No. 2,566,406 to Dougherty ("Dougherty" or "Dougherty 406"), served Feb. 3, 2023, in 27 pages.
Claim Chart 28 Appended to the Opening Expert Report of Dr. John Long, Ph.D., P.E., Claim Chart—U.S. Pat. No. 9,480,199 (Claims 1-6) | John Deere Model 495/495A/695A Planter Products ("Deere 495A" or "Model 495A"), served Feb. 3, 2023, in 49 pages.
Claim Chart 29 Appended to the Opening Expert Report of Dr. John Long, Ph.D., P.E., Claim Chart—U.S. Pat. No. 9,480,199 | Deere Prior Art Vacuum Planters ("Deere Prior Art Vacuum Planters"), served Feb. 3, 2023, in 23 pages.
Claim Chart 30 Appended to the Opening Expert Report of Dr. John Long, Ph.D., P.E., Claim Chart—U.S. Pat. No. 9,480,199 | German Utility Model Publication No. 4400142 ("DE8400142" or "Franz 142"), served Feb. 3, 2023, in 21 pages.
Claim Chart 31 Appended to the Opening Expert Report of Dr. John Long, Ph.D., P.E., Claim Chart—U.S. Pat. No. 9,480,199 | French Patent Application 2591061 ("Gras 061" or "Gras 2") (incorporating French Patent Application 2574243 ("Gras 243" or "Gras 1")), served Feb. 3, 2023, in 36 pages.
Claim Chart 32 Appended to the Opening Expert Report of Dr. John Long, Ph.D., P.E., Claim Chart—U.S. Pat. No. 9,480,199 | UK Patent Application GB 2057835A ("Hedderwick" or "Hedderwick 835"), served Feb. 3, 2023, in 23 pages.
Claim Chart 33 Appended to the Opening Expert Report of Dr. John Long, Ph.D., P.E., Claim Chart—U.S. Pat. No. 9,480,199 (Claims 1-6) | German Published Patent Application DE2826658A1 ("Holdt" or "Holdt 658"), served Feb. 3, 2023, in 30 pages.
Claim Chart 34 Appended to the Opening Expert Report of Dr. John Long, Ph.D., P.E., Claim Chart—U.S. Pat. No. 9,480,199 | Russian Patent No. RU 2 137 337 ("RU 337"), served Feb. 3, 2023, in 15 pages.
Claim Chart 35 Appended to the Opening Expert Report of Dr. John Long, Ph.D., P.E., Claim Chart—U.S. Pat. No. 9,480,199 (Claims 1-6) | U.S. Pat. No. 6,681,706 ("Sauder 706"), served Feb. 3, 2023, in 56 pages.
Claim Chart 36 Appended to the Opening Expert Report of Dr. John Long, Ph.D., P.E., Claim Chart—U.S. Pat. No. 9,480,199 | Soviet Union Inventor's Certificate No. 264033 ("SU 033"), served Feb. 3, 2023, in 24 pages.

(56) References Cited

OTHER PUBLICATIONS

Claim Chart 37 Appended to the Opening Expert Report of Dr. John Long, Ph.D., P.E., Claim Chart—U.S. Pat. No. 9,480,199 | Soviet Union Inventor's Certificate No. 445391 ("SU 391"), served Feb. 3, 2023, in 17 pages.
Claim Chart 38 Appended to the Opening Expert Report of Dr. John Long, Ph.D., P.E., Claim Chart—U.S. Pat. No. 9,480,199 | European Patent Application Publication 0182220 (EP0182220) ("Syring" or "Syring 220"), served Feb. 3, 2023, in 17 pages.
Claim Chart 39 Appended to the Opening Expert Report of Dr. John Long, Ph.D., P.E., Claim Chart—U.S. Pat. No. 9,480,199 | Japanese Utility Model Application JP 56-024815 ("Yamahata" or "Yamahata 815" or "JP 815"), served Feb. 3, 2023, in 33 pages.
Claim Chart 40 Appended to the Opening Expert Report of Dr. John Long, Ph.D., P.E., Claim Chart—U.S. Pat. No. 9,693,498 | U.S. Pat. No. 5,601,209 ("Barsi 209"), served Feb. 3, 2023, in 4 pages.
Claim Chart 41 Appended to the Opening Expert Report of Dr. John Long, Ph.D., P.E., Claim Chart—U.S. Pat. No. 9,693,498 | Fundamentals of Machine Operation—Planting ("Breece 1981"), served Feb. 3, 2023, in 4 pages.
Claim Chart 42 Appended to the Opening Expert Report of Dr. John Long, Ph.D., P.E., Claim Chart—U.S. Pat. No. 9,693,498 | U.S. Patent Application Publication No. 2010/0192819 ("Garner 819"), served Feb. 3, 2023, in 9* pages.
Claim Chart 43 Appended to the Opening Expert Report of Dr. John Long, Ph.D., P.E., Claim Chart—U.S. Pat. No. 9,693,498 | U.S. Pat. No. 4,600,122 ("Lundie 122"), served Feb. 3, 2023, in 7 pages.
Claim Chart 44 Appended to the Opening Expert Report of Dr. John Long, Ph.D., P.E., Claim Chart—U.S. Pat. No. 9,693,498 | U.S. Pat. No. 7,404,366 ("Mariman 366"), served Feb. 3, 2023, in 6 pages.
Claim Chart 45 Appended to the Opening Expert Report of Dr. John Long, Ph.D., P.E., Claim Chart—U.S. Pat. No. 9,693,498 | German Published Patent Application DE 34 41 704 A1 ("Romberg 704"), served Feb. 3, 2023, in 4 pages.
Claim Chart 46 Appended to the Opening Expert Report of Dr. John Long, Ph.D., P.E., Claim Chart-U.S. Pat. No. 9,693,498 | U.S. Pat. No. 6,718,892 ("Rosenboom 892"), served Feb. 3, 2023, in 5 pages.
Claim Chart 47 Appended to the Opening Expert Report of Dr. John Long, Ph.D., P.E., Claim Chart—U.S. Pat. No. Re. 48,572 | U.K. Patent Application No. GB 2,012,534A ("Curtis 534" or "Curtis GB" or "Curtis GB 534"), served Feb. 3, 2023, in 47 pages.
Claim Chart 48 Appended to the Opening Expert Report of Dr. John Long, Ph.D., P.E., Claim Chart—U.S. Pat. No. Re. 48,572 | John Deere Model 495/495A/695A Planter Products ("Deere 495A" or "Model 495A"), served Feb. 3, 2023, in 58 pages.
Claim Chart 49 Appended to the Opening Expert Report of Dr. John Long, Ph.D., P.E., Claim Chart—U.S. Pat. No. Re. 48,572 | U.S. Patent Application Publication No. 2010/0192819 to Garner ("Garner 819"), served Feb. 3, 2023, in 51 pages.
Claim Chart 50 Appended to the Opening Expert Report of Dr. John Long, Ph.D., P.E., Claim Chart—U.S. Pat. No. Re. 48,572 | U.S. Pat. No. 3,627,050 to Hansen and assigned to Deere ("Hansen" or "Hansen 050"), served Feb. 3, 2023, in 99 pages.
Claim Chart 51 Appended to the Opening Expert Report of Dr. John Long, Ph.D., P.E., Claim Chart—U.S. Pat. No. Re. 48,572 | Russian Patent No. RU 2 137 337 ("RU 337"), served Feb. 3, 2023, in 19 pages.
Claim Chart 52 Appended to the Opening Expert Report of Dr. John Long, Ph.D., P.E., Claim Chart—U.S. Pat. No. Re. 48,572 | Soviet Union Inventor's Certificate No. 264033 ("SU 033"), served Feb. 3, 2023, in 27 pages.
Claim Chart 53 Appended to the Opening Expert Report of Dr. John Long, Ph.D., P.E., Claim Chart—U.S. Pat. No. Re. 48,572 | Soviet Union Inventor's Certificate No. 281928 ("SU 928"), served Feb. 3, 2023, in 24 pages.
Claim Chart 54 Appended to the Opening Expert Report of Dr. John Long, Ph.D., P.E., Claim Chart—U.S. Pat. No. Re. 48,572 | U.S. Pat. No. 3,176,636 to Wilcox ("Wilcox"), served Feb. 3, 2023, in 118 pages.
Claim Chart 55 Appended to the Opening Expert Report of Dr. John Long, Ph.D., P.E., Claim Chart—U.S. Pat. No. 8,813,663 (Claims 1, 4 and 6) | John Deere Model 495/495A/695A Planter Products ("Deere 495A" or "Model 495A"), served Feb. 3, 2023, in 69 pages.
Claim Chart 56 Appended to the Opening Expert Report of Dr. John Long, Ph.D., P.E., Claim Chart—U.S. Pat. No. 8,813,663 (Claims 1, 4 and 6) | Deere Prior Art Vacuum Planters ("Deere Prior Art Vacuum Planters"), served Feb. 3, 2023, in 52 pages.
Claim Chart 57 Appended to the Opening Expert Report of Dr. John Long, Ph.D., P.E., Claim Chart—U.S. Pat. No. 8,813,663 (Claims 1, 4, 6) | French Patent Application 2591061 ("Gras 061" or "Gras 2") (incorporating French Patent Application 2574243 ("Gras 243" or "Gras 1"), served Feb. 3, 2023, in 60 pages.
Claim Chart 58 Appended to the Opening Expert Report of Dr. John Long, Ph.D., P.E., Claim Chart—U.S. Pat. No. 8,813,663 (Claims 1, 4 and 6) | UK Patent Application GB 2057835A ("Hedderwick" or "Hedderwick 835"), served Feb. 3, 2023, in 31 pages.
Claim Chart 59 Appended to the Opening Expert Report of Dr. John Long, Ph.D., P.E., Claim Chart—U.S. Pat. No. 8,813,663 (Claims 1, 4 and 6) | German Published Patent Application DE2826658A1 ("Holdt" or "Holdt 658"), served Feb. 3, 2023, in 72 pages.
Claim Chart 60 Appended to the Opening Expert Report of Dr. John Long, Ph.D., P.E., Claim Chart—U.S. Pat. No. 8,813,663 | Russian Patent No. RU 2 137 337 ("RU 337"), served Feb. 3, 2023, in 25 pages.
Claim Chart 61 Appended to the Opening Expert Report of Dr. John Long, Ph.D., P.E., Claim Chart—U.S. Pat. No. 8,813,663 (Claims 1, 4 and 6) | U.S. Pat. No. 6,681,706 ("Sauder 706"), served Feb. 3, 2023, in 162 pages.
Claim Chart 62 Appended to the Opening Expert Report of Dr. John Long, Ph.D., P.E., Claim Chart—U.S. Pat. No. 8,813,663 (Claims 1, 4 and 6) | Soviet Union Inventor's Certificate No. 445391 ("SU 391"), served Feb. 3, 2023, in 22 pages.
Claim Chart 63 Appended to the Opening Expert Report of Dr. John Long, Ph.D., P.E., Claim Chart—U.S. Pat. No. 8,813,663 (Claims 1, 4 and 6) | Soviet Union Inventor's Certificate No. 281928 ("SU 928"), served Feb. 3, 2023, in 24 pages.
Claim Chart 64 Appended to the Opening Expert Report of Dr. John Long, Ph.D., P.E., Claim Chart—U.S. Pat. No. 9,686,906 | U.K. Patent Application No. GB 2,012,534A ("Curtis 534" or "Curtis GB" or "Curtis GB 534"), served Feb. 3, 2023, in 12 pages.
Claim Chart 65 Appended to the Opening Expert Report of Dr. John Long, Ph.D., P.E., Claim Chart—U.S. Pat. No. 9,686,906 | John Deere Model 495/495A/695A Planter Products ("Deere 495A" or "Model 495A"), served Feb. 3, 2023, in 33 pages.
Claim Chart 66 Appended to the Opening Expert Report of Dr. John Long, Ph.D., P.E., Claim Chart—U.S. Pat. No. 9,686,906 | German Patent No. 389840 ("Hempel 840"), served Feb. 3, 2023, in 13 pages.
Claim Chart 67 Appended to the Opening Expert Report of Dr. John Long, Ph.D., P.E., Claim Chart—U.S. Pat. No. 9,686,906 | Russian Patent No. RU 2 137 337 ("RU 337"), served Feb. 3, 2023, in 14 pages.
Claim Chart 68 Appended to the Opening Expert Report of Dr. John Long, Ph.D., P.E., Claim Chart—U.S. Pat. No. 9,686,906 | Soviet Union Inventor's Certificate No. 445391 ("SU 391"), served Feb. 3, 2023, in 12 pages.
Claim Chart 69 Appended to the Opening Expert Report of Dr. John Long, Ph.D., P.E., Claim Chart—U.S. Pat. No. 9,686,906 | Soviet Union Inventor's Certificate No. 281928 ("SU 928"), served Feb. 3, 2023, in 16 pages.
Claim Chart 70 Appended to the Opening Expert Report of Dr. John Long, Ph.D., P.E., Claim Chart—U.S. Pat. No. 9,686,906 | U.S. Pat. No. 3,176,636 ("Wilcox 636"), served Feb. 3, 2023, in 24 pages.
Claim Chart 71 Appended to the Opening Expert Report of Dr. John Long, Ph.D., P.E., Claim Chart—U.S. Pat. No. 9,807,924 | John Deere Model 495/495A/695A Planter Products ("Deere 495A" or "Model 495A"), served Feb. 3, 2023, in 23 pages.
Claim Chart 72 Appended to the Opening Expert Report of Dr. John Long, Ph.D., P.E., Claim Chart—U.S. Pat. No. 9,807,924 | Russian Patent No. RU 2 137 337 ("RU 337"), served Feb. 3, 2023, in 12 pages.

(56) References Cited

OTHER PUBLICATIONS

Claim Chart 73 Appended to the Opening Expert Report of Dr. John Long, Ph.D., P.E., Claim Chart—U.S. Pat. No. 9,807,924 | Soviet Union Inventor's Certificate No. 264033 ("SU 033"), served Feb. 3, 2023, in 13 pages.
Claim Chart 74 Appended to the Opening Expert Report of Dr. John Long, Ph.D., P.E., Claim Chart—U.S. Pat. No. 9,807,924 | Soviet Union Inventor's Certificate No. 445391 ("SU 391"), served Feb. 3, 2023, in * pages.
Claim Chart 75 Appended to the Opening Expert Report of Dr. John Long, Ph.D., P.E., Claim Chart—U.S. Pat. No. 9,807,924 | Soviet Union Inventor's Certificate No. 281928 ("SU 928"), served Feb. 3, 2023, in 9 pages.
Claim Chart 76 Appended to the Opening Expert Report of Dr. John Long, Ph.D., P.E., Claim Chart—U.S. Pat. No. 9,807,924 | U.S. Pat. No. 3,176,636 ("Wilcox 636"), served Feb. 3, 2023, in 16 pages.
Claim Chart 77 Appended to the Opening Expert Report of Dr. John Long, Ph.D., P.E., Claim Chart—U.S. Pat. No. 9,699,955 | U.K. Patent Application No. GB 2,012,534A ("Curtis 534" or "Curtis GB" or "Curtis GB 534"), served Feb. 3, 2023, in 16 pages.
Claim Chart 78 Appended to the Opening Expert Report of Dr. John Long, Ph.D., P.E., Claim Chart—U.S. Pat. No. 9,699,955 | John Deere Model 495/495A/695A Planter Products ("Deere 495A" or "Model 495A"), served Feb. 3, 2023, in 28 pages.
Claim Chart 79 Appended to the Opening Expert Report of Dr. John Long, Ph.D., P.E., Claim Chart—U.S. Pat. No. 9,699,955 | Deere Prior Art Vacuum Planters ("Deere Prior Art vacuum Planters"), served Feb. 3, 2023, in 17 pages.
Claim Chart 80 Appended to the Opening Expert Report of Dr. John Long, Ph.D., P.E., Claim Chart—U.S. Pat. No. 9,699,955 | French Patent Application 2591061 ("Gras 061" or "Gras 2") (incorporating French Patent Application 2574243 ("Gras 243" or "Gras 1")), served Feb. 3, 2023, in 26 pages.
Claim Chart 81 Appended to the Opening Expert Report of Dr. John Long, Ph.D., P.E., Claim Chart—U.S. Pat. No. 9,699,955 | UK Patent Application GB 2057835A ("Hedderwick" or "Hedderwick 835"), served Feb. 3, 2023, in 11 pages.
Claim Chart 82 Appended to the Opening Expert Report of Dr. John Long, Ph.D., P.E., Claim Chart—U.S. Pat. No. 9,699,955 | German Published Patent Application DE2826658A1 ("Holdt" or "Holdt 658"), served Feb. 3, 2023, in 34 pages.
Claim Chart 83 Appended to the Opening Expert Report of Dr. John Long, Ph.D., P.E., Claim Chart—U.S. Pat. No. 9,699,955 | Russian Patent No. RU 2 137 337 ("RU 337"), served Feb. 3, 2023, in 10 pages.
Claim Chart 84 Appended to the Opening Expert Report of Dr. John Long, Ph.D., P.E., Claim Chart—U.S. Pat. No. 9,699,955 (Claims 8-10 and 12-13) | U.S. Pat. No. 6,681,706 ("Sauder 706"), served Feb. 3, 2023, in 84 pages.
Claim Chart 85 Appended to the Opening Expert Report of Dr. John Long, Ph.D., P.E., Claim Chart—U.S. Pat. No. 9,699,955 | Soviet Union Inventor's Certificate No. 281928 ("SU 928"), served Feb. 3, 2023, in 10 pages.
Claim Chart 86 Appended to the Opening Expert Report of Dr. John Long, Ph.D., P.E., Claim Chart—U.S. Pat. No. 8,850,998 | French Patent Application Publication No. 2 414 288 ("Benac 288"), served Feb. 3, 2023, in 7 pages.
Claim Chart 87 Appended to the Opening Expert Report of Dr. John Long, Ph.D., P.E., Claim Chart—U.S. Pat. No. 8,850,998 | John Deere Model 495/495A/695A Planter Products ("Deere 495A" or "Model 495A"), served Feb. 3, 2023, in 21 pages.
Claim Chart 88 Appended to the Opening Expert Report of Dr. John Long, Ph.D., P.E., Claim Chart—U.S. Pat. No. 8,850,998 | U.S. Pat. No. 2,566,406 ("Dougherty 406"), served Feb. 3, 2023, in 8 pages.
Claim Chart 89 Appended to the Opening Expert Report of Dr. John Long, Ph.D., P.E., Claim Chart—U.S. Pat. No. 8,850,998 | U.S. Patent Application Publication No. 2010/0192819 ("Garner 819"), served Feb. 3, 2023, in 13 pages.
Claim Chart 90 Appended to the Opening Expert Report of Dr. John Long, Ph.D., P.E., Claim Chart—U.S. Pat. No. 8,850,998 | German Patent No. 389840 ("Hempel 840"), served Feb. 3, 2023, in 7 pages.
Claim Chart 91 Appended to the Opening Expert Report of Dr. John Long, Ph.D., P.E., Claim Chart—U.S. Pat. No. 8,850,998 | U.S. Pat. No. 7,448,334 ("Mariman 334"), served Feb. 3, 2023, in 12 pages.
Claim Chart 92 Appended to the Opening Expert Report of Dr. John Long, Ph.D., P.E., Claim Chart—U.S. Pat. No. 8,850,998 | Russian Patent No. RU 2 137 337 ("RU 337"), served Feb. 3, 2023, in 10 pages.
Claim Chart 93 Appended to the Opening Expert Report of Dr. John Long, Ph.D., P.E., Claim Chart—U.S. Pat. No. 8,850,998 | Soviet Union Inventor's Certificate No. 264033 ("SU 033"), served Feb. 3, 2023, in 13 pages.
Amended Reply Expert Report of Dr. John Long, Ph.D., P.E. in support of positions taken by Defendants Kinze Manufacturing, Inc. and Ag Leader Technology, Inc. (regarding alleged invalidity of Plaintiffs' Asserted Patents), served Apr. 12, 2023, in 274 pages.
Exhibit A to the Amended Reply Expert Report of Dr. John Long, Ph.D., P.E.: Materials Considered, served Apr. 12, 2023, in 43 pages.
Exhibit 1 to Defendants', Kinze Manufacturing, Inc. and Ag Leader Technology, Inc.'s, Reply in Support of Motion to Amend Their Inequitable Conduct Counterclaim, Timeline of Discovery Relevant to Inequitable Conduct Counterclaims, filed Dec. 5, 2022 (Dkt. No. 242-1), in 4 pages.
Order on Claim Construction in *Deere & Company et al. v. Kinze Manufacturing, Inc. et al.,* filed Mar. 24, 2023 (Dkt. No. 277), in 75 pages.
Appendix to Order on Claim Construction in *Deere & Company et al. v. Kinze Manufacturing, Inc. et al.,* Table of Terms Construed, filed Mar. 24, 2023 (Dkt. No. 277-1), in 3 pages.
Kinze Manufacturing, Inc. and Ag Leader Technology, Inc.'s Counterclaims, Answer, and Affirmative Defenses to Deere's Second Amended and Supplemental Complaint, filed Apr. 11, 2023 (Dkt. No. 290), in 342 pages.
Order Granting in Part and Denying in Part Plaintiffs' Motion to Dismiss Defendants' Counterclaim [of Inequitable Conduct] in *Deere & Company et al. v. Kinze Manufacturing, Inc. et al.,* filed May 1, 2023 (Dkt. No. 303), in 39 pages.

\* cited by examiner

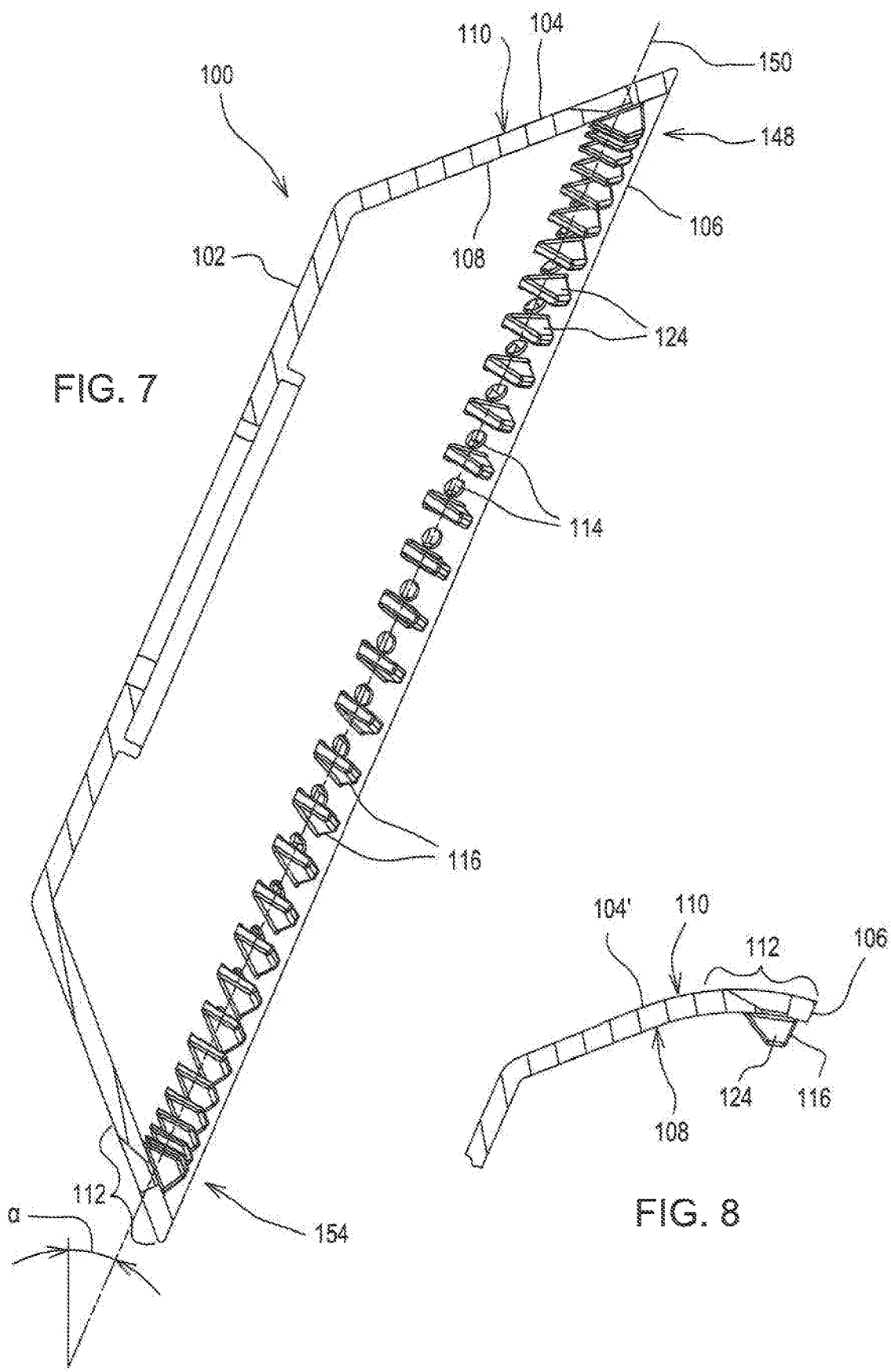

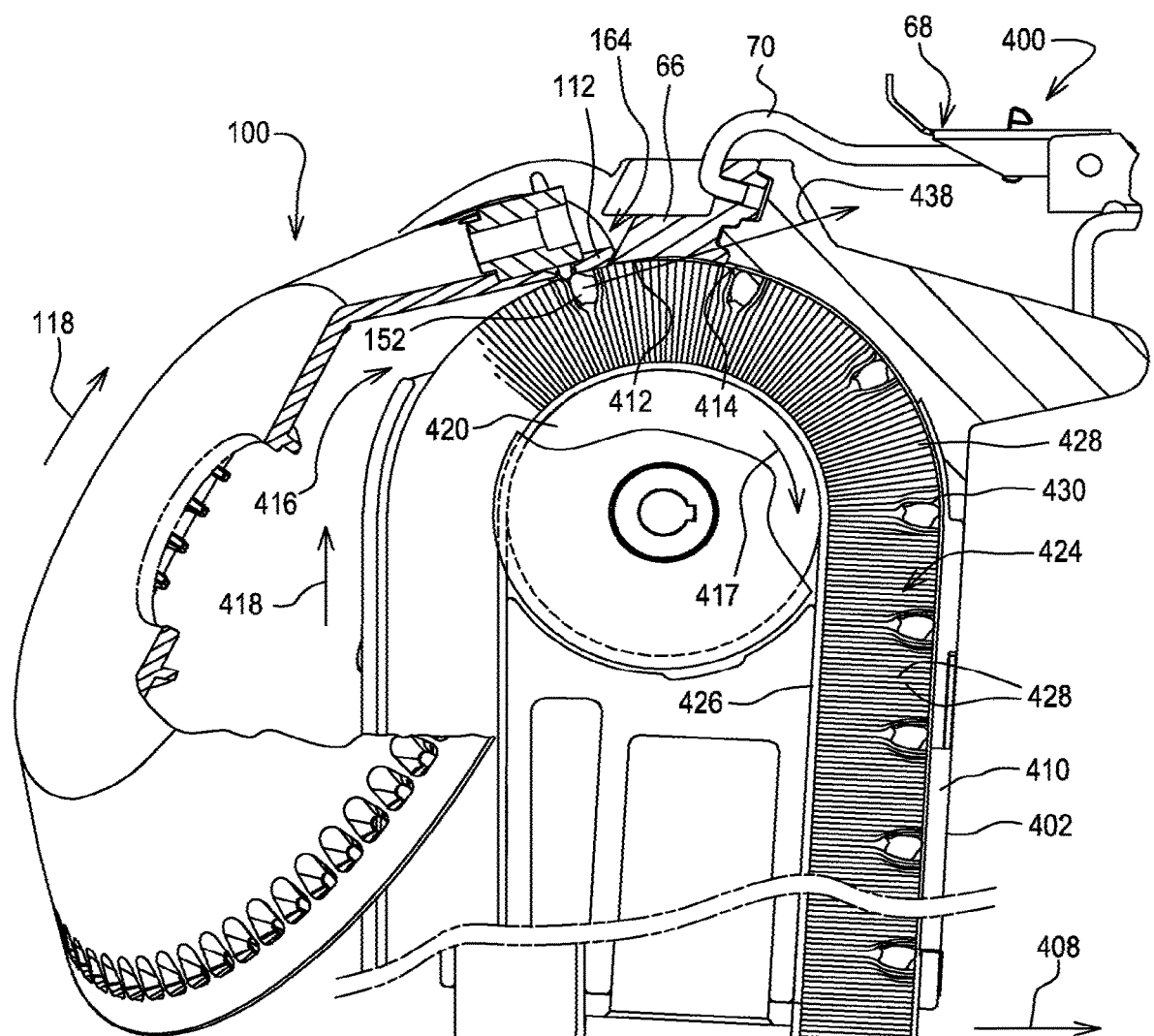
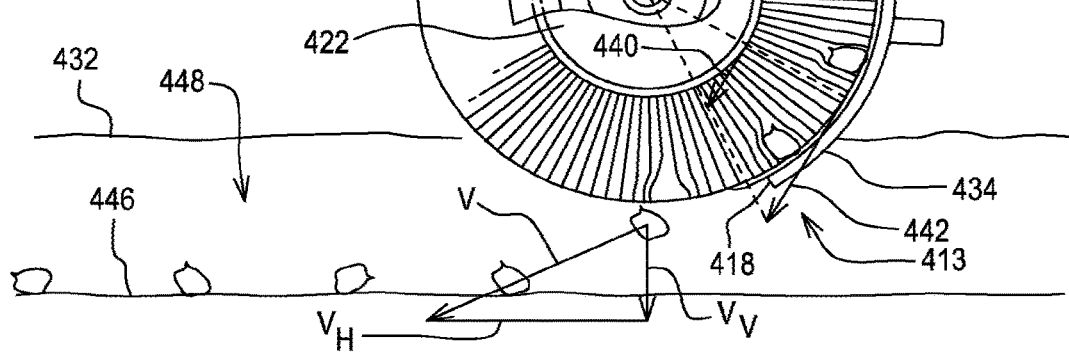
FIG. 10

— PLANTING UNIT FOR A SEEDING MACHINE HAVING A SEED METER AND SEED DELIVERY SYSTEM

CROSS REFERENCE TO RELATED APPLICATION

This application is a Continuation of application Ser. No. 16/930,954, filed 16 Jul. 2020, which is a Continuation of application Ser. No. 16/279,654, filed 19 Feb. 2019, which is a Continuation of application Ser. No. 15/454,870, filed 9 Mar. 2017, now U.S. Pat. No. 10,206,326, which is a Continuation of application Ser. No. 14/505,829, filed 3 Oct. 2014, now U.S. Pat. No. 9,661,799, which is a Continuation of application Ser. No. 13/072,051, filed 25 March 2011, now U.S. Pat. No. 8,850,998.

FIELD

The following relates to a planting unit for a seeding machine and more particularly to a planting unit having a seed meter and seed delivery system.

BACKGROUND

Various types of seed meters have been developed that use an air pressure differential, either vacuum or positive pressure, to adhere seed to a metering member. The metering member takes seed from a seed pool and sequentially discharges single seeds. (In some cases, multiple seeds may be discharged at a time.) One common type of seed meter is shown in U.S. Pat. No. 5,170,909. There, a seed disk 48 contained in a housing is used to meter the seed. The seed pool is positioned on one side of the disk at a lower portion thereof while vacuum is applied to the opposite side of the disk. As the disk is rotated, individual seeds from the seed pool are adhered by the vacuum to apertures that extend though the disk. When the seed reaches a desired release position, the vacuum is terminated, allowing the seed to drop from the disk, through a seed tube to a furrow formed in the soil below.

Flexible belts have also been used in an air pressure differential seed meter. One example is shown in US patent application 2010/0192818 A1. There, a flexible belt having an array of apertures therein is movable along a path in a housing. A seed pool is formed on one side of the belt. Vacuum applied on the opposite side of the belt along a portion of the belt path adheres seed to the apertures, allowing the belt to move the seed to a release position where the vacuum is cut-off. The seed then falls or is removed from the belt.

When seed falls by gravity from the meter through the seed tube, it can be difficult to maintain accurate and consistent seed spacing at planting speeds greater than about 8 kph (5 mph). To maintain spacing accuracy, a seed delivery system that controls the seed as the seed moves from the seed meter to the soil is desirable. One such delivery system is shown in US patent application 2010/0192819-A1. With such a delivery system, the hand-off of seed from the disk of U.S. Pat. No. 5,170,909 to the delivery system is difficult to achieve in a consistent manner. While the hand-off of seed may be improved with the use of a belt meter, there is still a need for a more consistent and reliable hand-off of seed from the seed meter to the delivery system. Improvements to the seed meter and seed delivery system can improve the hand-off of seed to the delivery system.

SUMMARY

In one form, a planting unit for a seeding machine is provided having a planting unit frame member and a seed meter mounted to the planting unit frame member. The seed meter has a housing and a metering member rotatably mounted inside the housing. The metering member further having a sidewall with an inner surface and an outer surface and the sidewall having a rim portion adjacent an outer edge of the sidewall. The inner surface of the side wall and the housing form a trough at a bottom portion of the metering member to hold a seed pool. The inner surface of the sidewall of the metering member at the trough is oriented at an angle between 20° and 75° relative to a vertical vector pointing upward at the outer edge of the sidewall.

In another form, a planting unit for a seeding machine is provided having a seed meter with a metering member mounted for rotation. The metering member has a sidewall extending to an outer edge with the sidewall having inner and outer surfaces and a rim portion of the sidewall adjacent the outer edge having apertures extending through the sidewall. The metering member is adapted to adhere seed to the apertures to sequentially move seed to a release position. The planting unit further has a mechanical seed delivery system adapted to take seed from the metering member at the release position and sweep seed across the inner surface of the sidewall in a direction substantially cross-wise to a direction of travel of the seed on the metering member as the metering member rotates. The seed delivery system then moves seed to a discharge location adjacent a seed furrow formed in soil beneath the seeding machine.

BRIEF DESCRIPTION OF THE DRAWINGS

FIG. 7 is side cross-section of the metering member of FIG. 6 illustrating the orientation of the metering member installed in a seed meter mounted to a planting unit;

FIG. 8 is a fragmentary cross-section of an alternative metering member;

FIG. 10 is a side sectional view of the metering member and seed delivery system;

DETAILED DESCRIPTION

Figure 1:
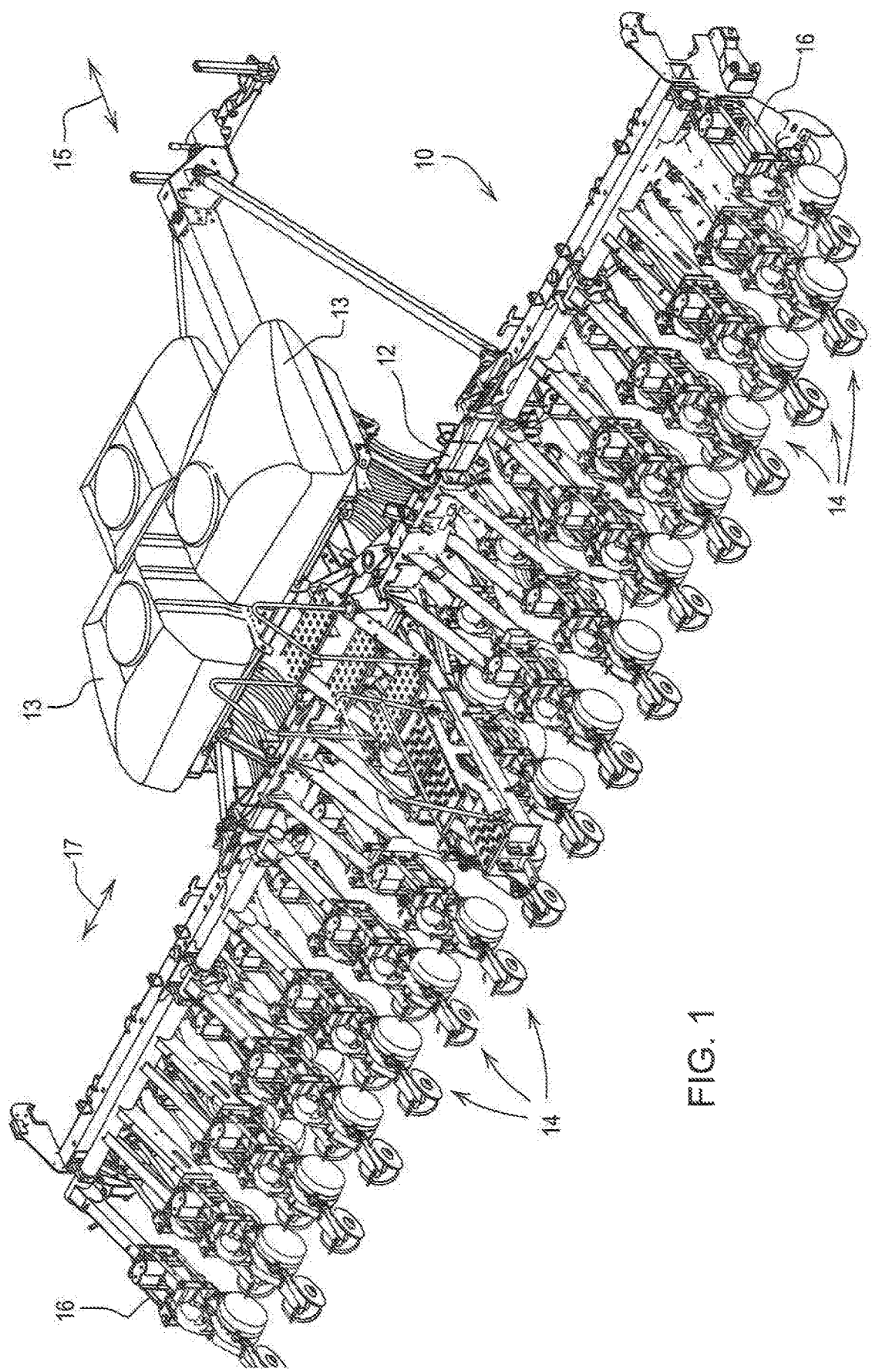
FIG. 1 is a perspective view of a common agricultural planter.
Figure 2:
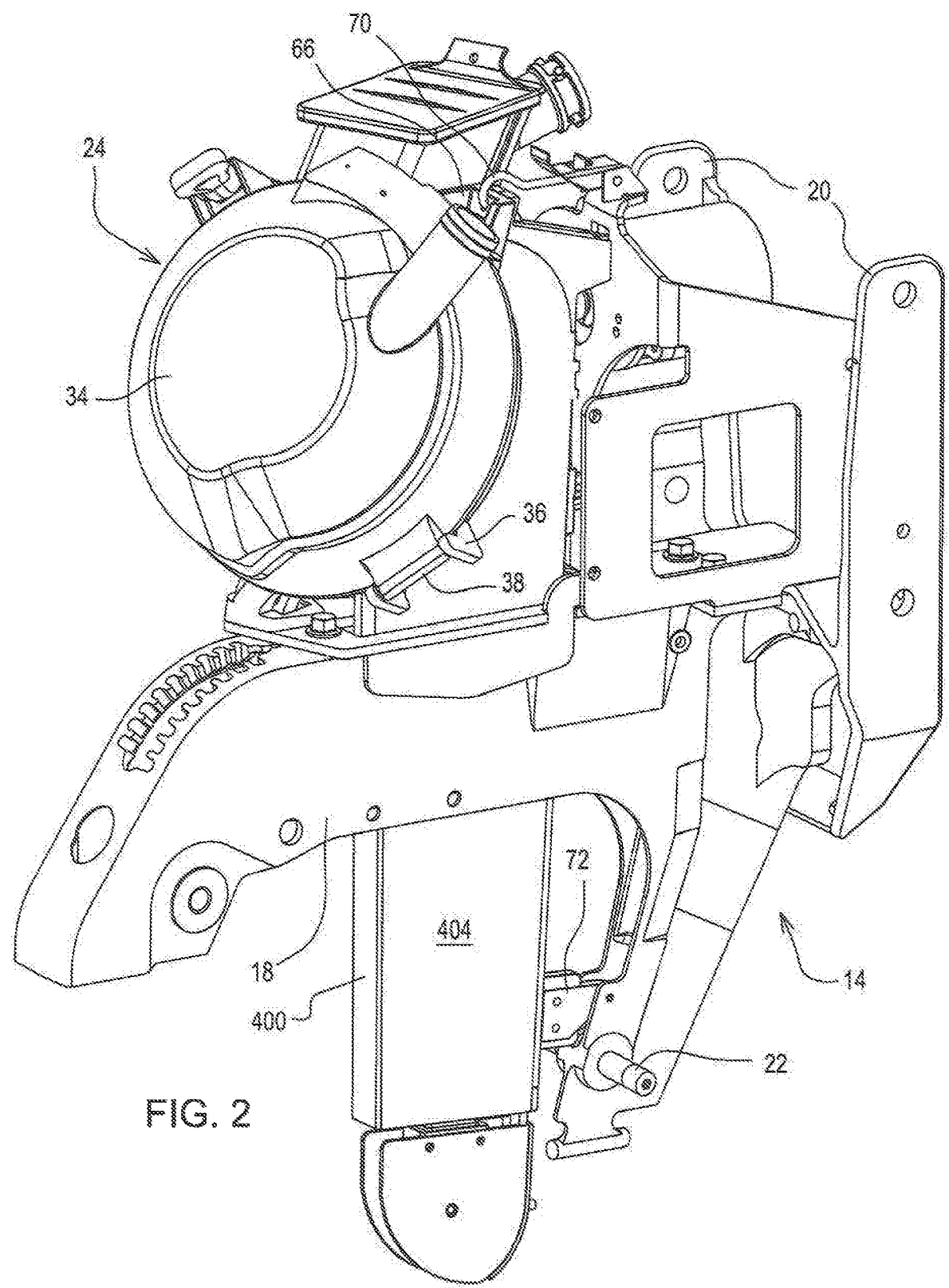
FIG. 2 is a side perspective view of a planting unit frame, seed meter and seed delivery system.

An agricultural seeding machine 10 is shown in FIG. 1 as a row crop planter. Seeding machine 10 has a central frame 12 on which are mounted a plurality of individual planting units 14. The seeding machine 10 has a fore-aft direction shown by the arrow 15 and a transverse direction shown by the arrow 17. Each planting unit 14 is coupled to the central frame 12 by a parallel linkage 16 so that the individual planting units 14 may move up and down to a limited degree relative to the frame 12. Large storage tanks 13 hold seed that is delivered pneumatically to a mini-hopper on each planting unit. Each planting unit 14 has a frame member 18 (FIG. 2) to which the components of the planting unit are mounted. The frame member 18 includes a pair of upstanding arms 20 at the forward end of thereof. The arms 20 are coupled to the rearward ends of the parallel linkage 16. Furrow opening disks (not shown) are attached to shaft 22 in a known manner to form an open furrow in the soil beneath the seeding machine into which seed is deposited. Closing and packing wheels (not shown) are also mounted to the frame member 18 in a known manner to close the furrow over the deposited seed and to firm the soil in the closed furrow. A seed meter 24 and a seed delivery system 400 are also attached to the frame member 18 of the planting unit.

The meter 24 includes a housing 30 (FIG. 3) and a cover member 34. The housing 30 and the cover member 34 are coupled to one another by complementary hinge features 36 and 38 (see FIG. 5) on the housing and cover member respectively. Hinge feature 36 includes a pivot pin 37 coupled to the housing while the feature 38 is an integrally formed hook that wraps around the pivot pin allowing the cover member 34 to pivot about the axis of the pin 37. An elastomeric latch member 40 is coupled to the housing 30 and has an enlarged portion 42 that is seated into a socket 44 formed in the cover member to hold the cover member in a closed position on the housing 30.

Figure 3:
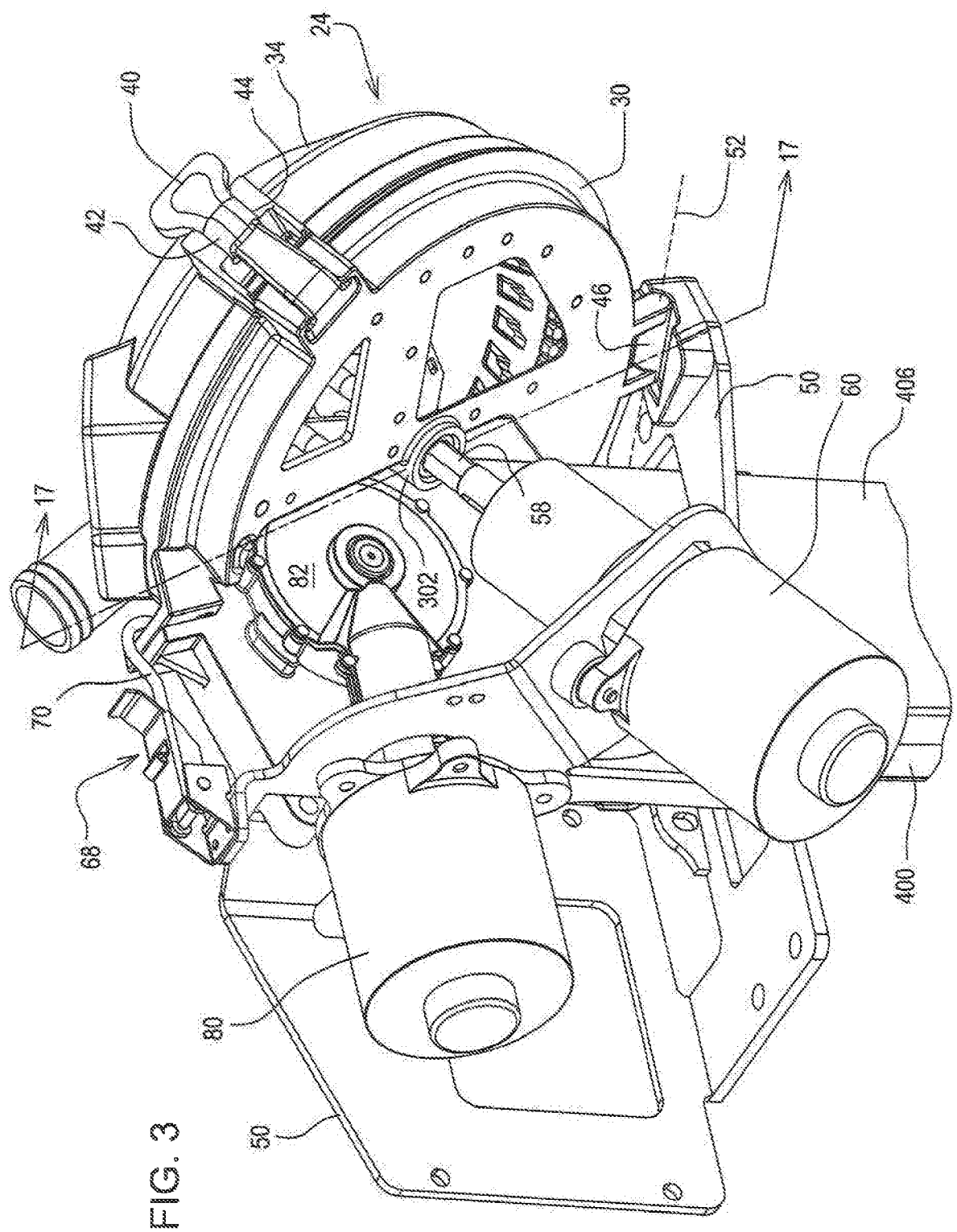
FIG. 3 is an enlarged perspective view of the seed meter and delivery system drives.
Figure 4:
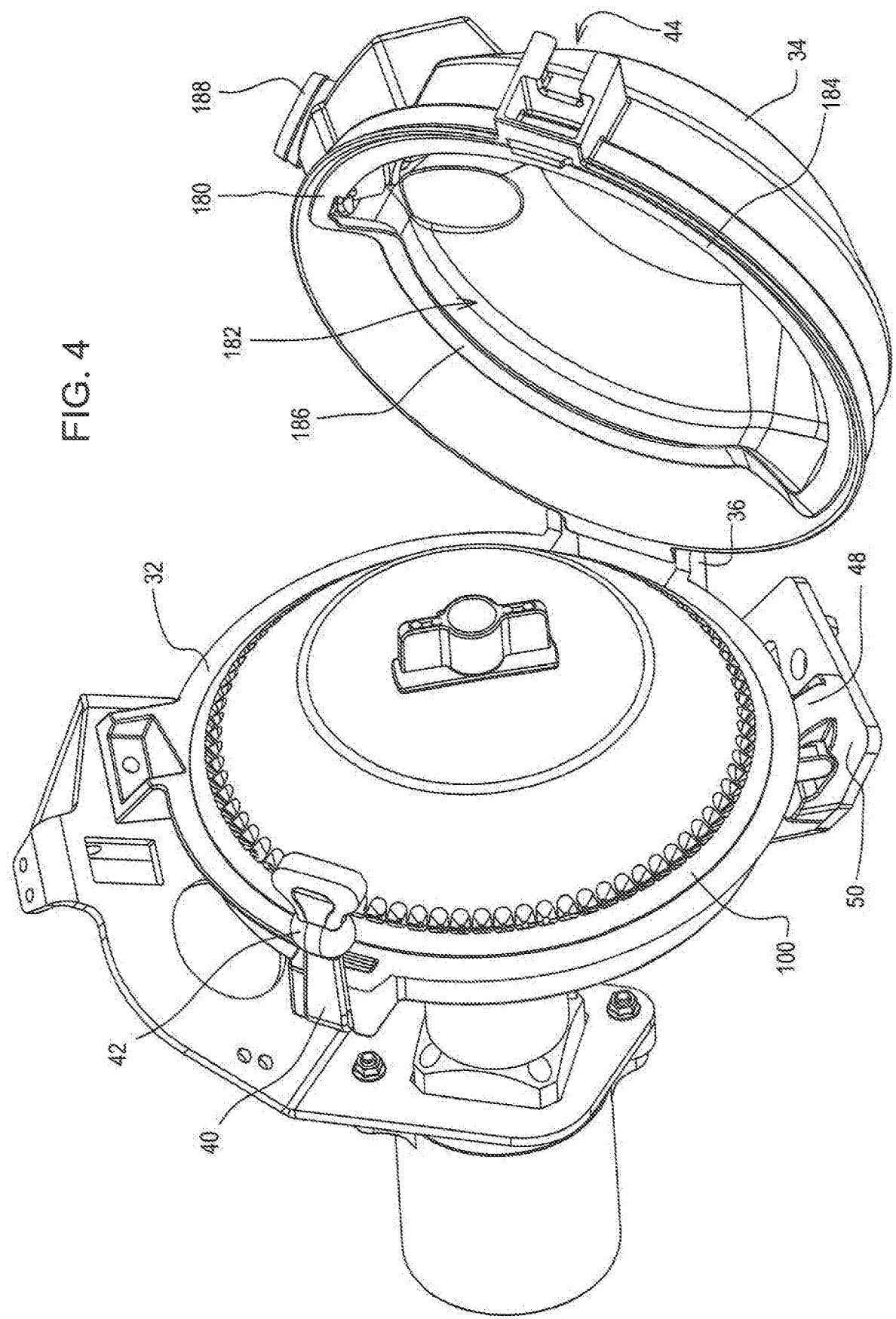
FIG. 4 is a perspective view of the seed meter with the cover open illustrating the metering member.

The housing 30 is formed with a second hinge element in the form of a pivot pin 46 (FIG. 3). Pivot pin 46 is seated into a hook member 48 (FIG. 4) of the mounting frame 50 attached to the frame member 18. This allows the seed meter 24 to pivot relative to the planting unit frame member 18 about an axis 52. A drive spindle 54 is carried by the housing 30 and has a drive hub 56 (FIG. 5) on the end thereof. The spindle 54 couples to the output shaft 58 of electric motor 60 to drive the seed meter when in the assembled position shown in FIG. 3. The seed meter 24 is coupled to the delivery system by a latch mechanism 68 including a metal rod 70 having a hook at one end seated into an aperture in the meter housing 30 when latched. The delivery system further has a mounting hook 72, partially shown in FIG. 2, which attaches to the planting unit frame member 18 to support the delivery system.

The delivery system 400 is driven by an electric motor 80, also carried by the mounting frame 50. The output shaft of motor 80 is connected to the delivery system through a right-angle drive 82. While electric motors have been shown to drive both the seed meter and the seed delivery system, it will be appreciated by those skilled in the art that other types of motors, such as hydraulic, pneumatic, etc. can be used as well as various types of mechanical drive systems.

Figure 6:
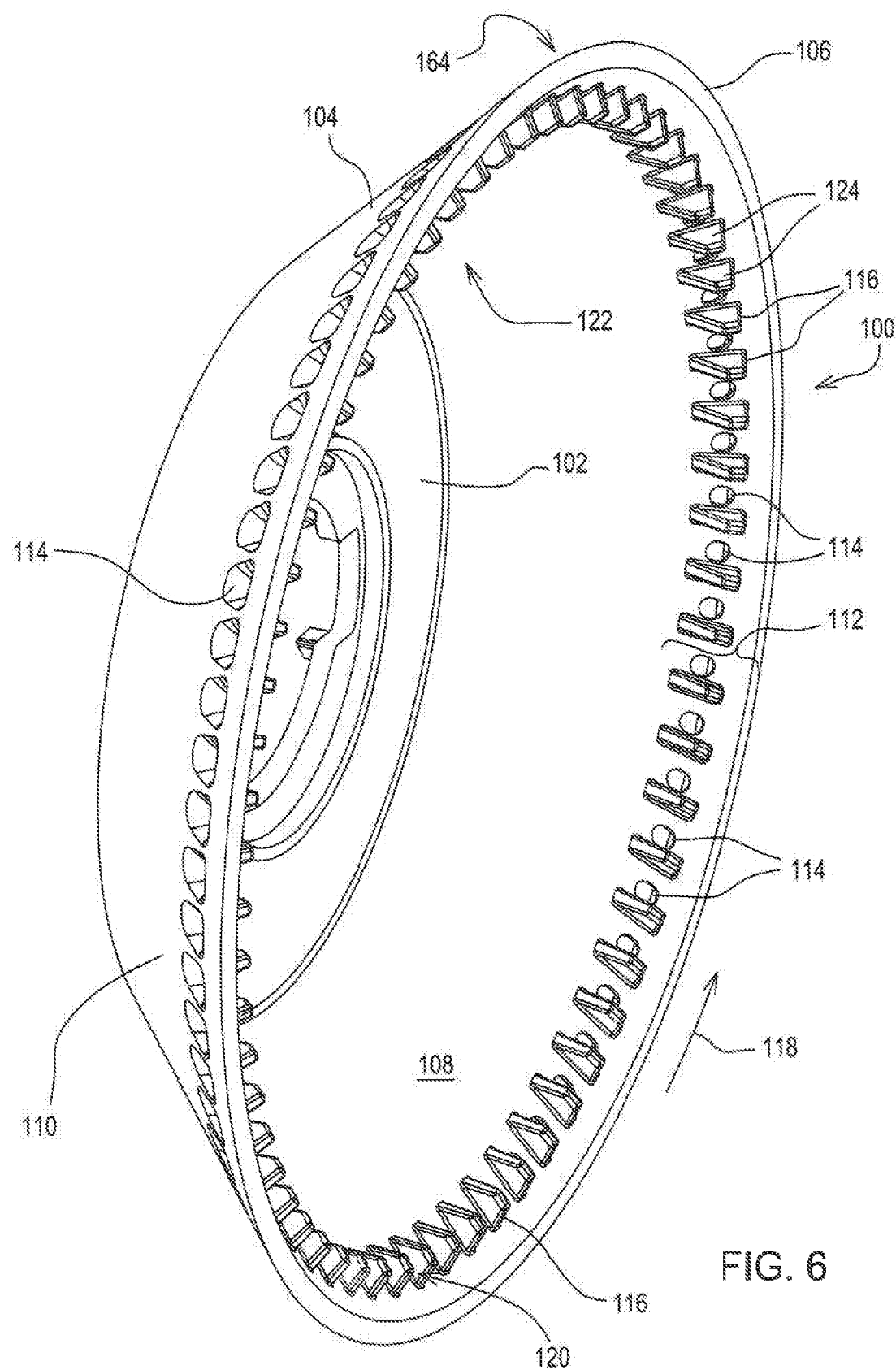
FIG. 6 is a perspective view of the metering member of FIG. 4.

With reference to FIG. 6, a metering member 100 of the seed meter is shown in greater detail. These metering member 100 is shown as a single piece, concave bowl shaped body. The bowl shaped body has a base portion 102 from which extends a sidewall 104. Sidewall 104 terminates in an outer edge 106. The sidewall has a radially inner surface 108 and a radially outer surface 110. Adjacent the outer edge 106, the sidewall has a rim portion 112 shown by the bracket in FIG. 6. The rim portion 112 extends radially outwardly and axially toward the outer edge 106. In the rim portion 112, there is an annular array of apertures 114 that extend through the sidewall between the inner and outer surfaces 108 and 110. The metering member 100 is mounted in the meter housing for rotation in the direction of the arrow 118 in FIG. 6. In operation, as the metering member rotates, individual seeds from a seed pool 120 located at a bottom portion of the metering member are adhered to the apertures 114 on the inner surface 108 of the sidewall and sequentially carried upward to a release position 164 at an upper portion of the metering member. Thus, the inner surface is also known as the seed side of the metering member. A series of raised features or projections, such as paddles 116, extend from the inner surface 108 of the sidewall 104 typically with one paddle located behind each aperture 114 in the direction of rotation. Each paddle forms a confronting surface 124 behind the associated aperture in the direction of rotation to push the seed adhered to the aperture into the delivery system as described below. As explained above, it is the rim portion 112 of the metering member that performs the function of drawing individual seeds from the seed pool and sequentially moving seed to the release position to supply seed individually to the seed delivery system 400.

The base portion 102 of the metering member contains a central drive aperture 130 (FIG. 5) used to mount the metering member on a rotational drive hub 56 for rotation about the axis 132 in a manner similar to mounting a flat seed disk in a seed meter as is well known. When mounted to the housing 30, the metering member 100 cooperates with the housing to form a trough to hold the seed pool 120 as described more fully below. The axis 132 is inclined to both a horizontal plane as well as to a vertical plane extending fore and aft of the seeding machine and a vertical plane extending transversely to the seeding machine.

With reference to FIG. 7, the metering member 100 is shown in a sectional view. The base portion 102 is a generally planar while the rim portion 112 of the inner surface of the sidewall 104 is outwardly flared, that is, extending both radially outward and axially. As shown in FIG. 7, the rim portion is frusto-conical. Alternatively, as shown in FIG. 8 in connection with a metering member sidewall 104', the inner surface of the sidewall rim portion 112 may be frusto-spherical in shape. Furthermore, while the rim portion 112 has been shown as being outwardly flared, the rim portion could be generally cylindrical without any outward flair, that is, extending only axially.

The metering member 100 can be formed as one piece or constructed of multiple pieces. The metering member can be most easily molded of plastic such as polycarbonate, nylon, polypropylene or urethane. However, other plastics can be used as well as other materials such as metal, etc. The metering member 100 is sufficiently rigid to be self-sustaining in shape without additional supporting structure. This is in contrast to the flexible belt metering member shown in U.S. Pat. No. 2,960,258 where it be belt member is preferably of a flexible elastomeric material and is supported within a support ring. Being self-sustaining in shape, the metering member does not need any supporting structure to hold a shape. As a self-sustaining, the metering member may be rigid or the metering member may be flexible to change shape when acted upon in a manner similar to the flexible seed disk of U.S. Pat. No. 7,661,377.

As previously mentioned, the metering member 100 can be mounted to a drive hub through the central drive aperture 130 in the base portion 102. Mounting through the central drive aperture 130 provides both mounting support of the metering member as well as the rotational drive of the metering member. Alternatively, support for the metering member can be provided on the outer surface of the sidewall. A groove may be formed in the outer surface of the sidewall to receive rollers that support the metering member. If the groove is also formed with drive teeth, one of the rollers could be driven by a motor to rotate the metering member. With such alternative arrangements possible, it is not necessary that the metering member have a base portion. The function of metering seed is performed by the sidewall and thus, the sidewall is the only required portion of the metering member.

As shown in FIG. 7, the metering member 100, when mounted in the meter housing, is oriented at an incline to the vertical as shown. In this orientation, the apertures 114 lie in a plane 150 inclined at an angle α relative to vertical. In this orientation, an upper portion 148 of the metering member overhangs or extends beyond a lower portion 154. As described below, this allows access to the upper portion 148 of the metering member for the mechanical seed delivery system 400. As shown, the angle α is approximately 24°. However, any angle will suffice as long as the upper portion 148 extends beyond the lower portion sufficiently for access for the seed delivery system from below the metering member at the seed release position.

Figure 9:
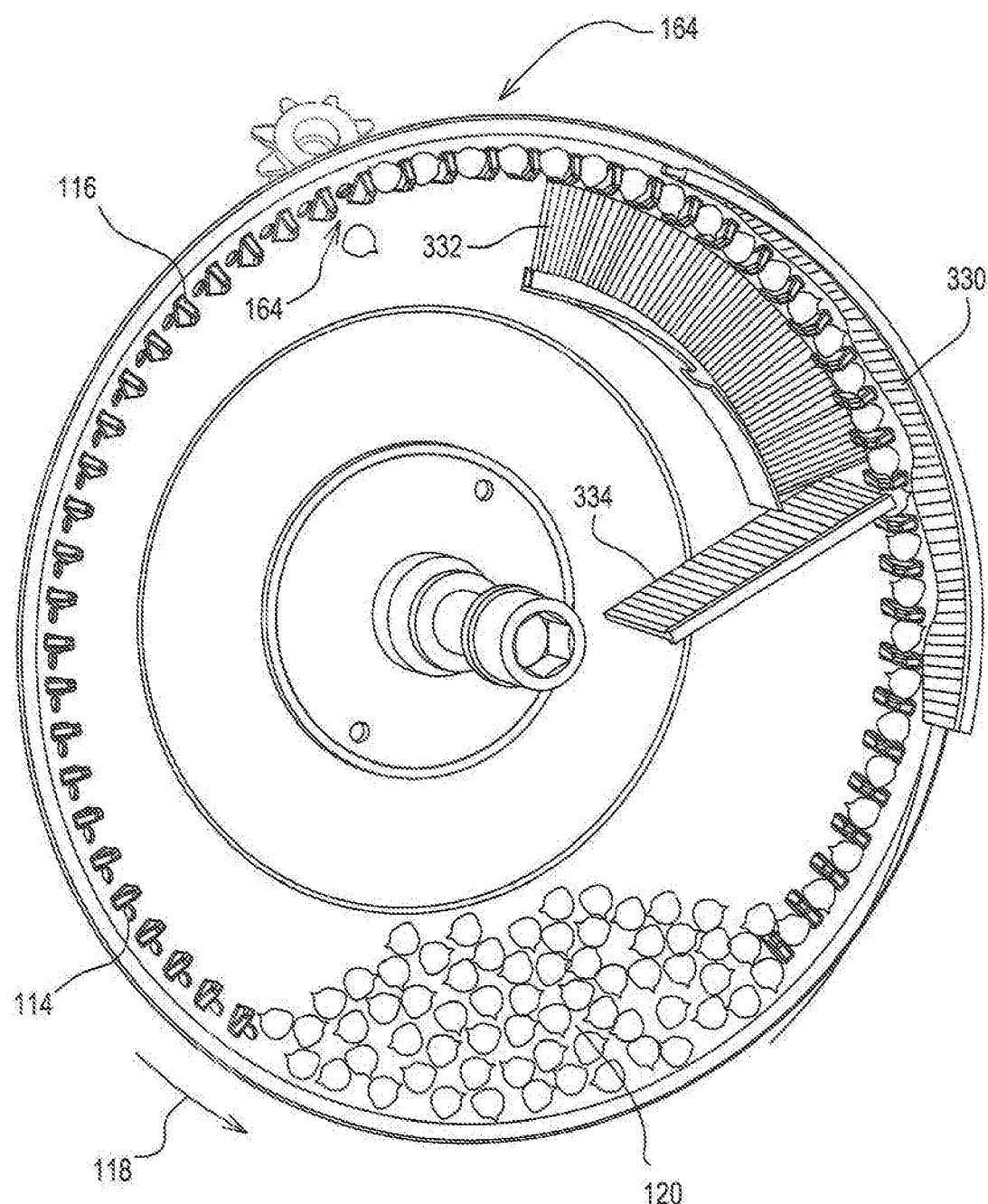
FIG. 9 is a elevational view of the inside of the metering member of FIG. 6.

The seed pool 120 is formed at the bottom of the metering member 100 as shown in FIG. 9. Vacuum is applied to the outer surface 110, causing individual seeds to be adhered to the apertures 114 as the apertures travel through the seed pool. As the metering member rotates as shown by the arrow 118, seed is moved upward to a release position 164 at the upper portion 148 of the metering member. The release position is slightly past the top or 12 O'clock position on the circular path of travel of the seed such that the seed is moving somewhat downward at the release position. This facilitates the seed's entry into the delivery system as more fully described below. Also, by being past the top point of the path, the delivery system is off center relative to the metering member providing clearance between the delivery system and the seed meter drive. At the release position 164, the inner surface of the rim portion of the metering member is facing downward such that seed is adhered beneath the metering member or is hanging from the metering member. See FIG. 10. The seed delivery system 400 is also positioned beneath the upper portion of the metering member at the release position 164 to take the seed from the metering member as shown in FIG. 10.

Delivery system 400 includes a housing 402 having a left sidewall 404 (see FIG. 19) and a right sidewall 406 (see FIG. 3). The terms left and right are used in relationship to the direction of travel of the seeding machine shown by the arrow 408. Connecting the left and right sidewalls to one another is an edge wall 410. An upper opening 416 is formed in the edge wall and sidewalls to allow seed to enter into the housing 402. A lower opening 418 is provided at the lower end forming a discharge location 413 for the seed. A pair of pulleys 420 and 422 are mounted inside the housing 402. The pulleys a support a belt 424 for rotation within the housing. One of the two pulleys is a drive pulley while the other pulley is an idler pulley. The belt has a flexible base member 426 to engage the pulleys. Elongated bristles 428 extend from the base member 426. The bristles are joined to the base member at proximal, or radially inner, ends of the bristles. Distal, or radially outer, ends 430 of the bristles touch or are close to touching the inner surface of the housing edge wall 410.

As shown at the top of FIG. 10, a seed 152 is at the release position on the metering member 100 and has just been inserted into the bristles 428 of the delivery system. At the release position, the rim portion 112 of the metering member sidewall 104 is generally tangent to the stationary inner surface 412 across which the brush bristles 428 sweep. The surface 412 is on a latch portion 66 of the housing 30. The surface 412 is a continuation of the inner surface 414 of the delivery system housing 402. Once the seed is captured in the delivery system, the seed moves in the direction of the belt, shown by the arrow 417. The direction of travel of the seed immediately upon capture by the delivery system 400 is shown by the vector 438.

Figure 13:
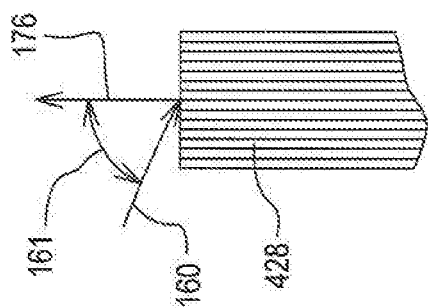
FIG. 13 is a schematic illustration the direction of entry of seed into the brush belt.
Figure 11:
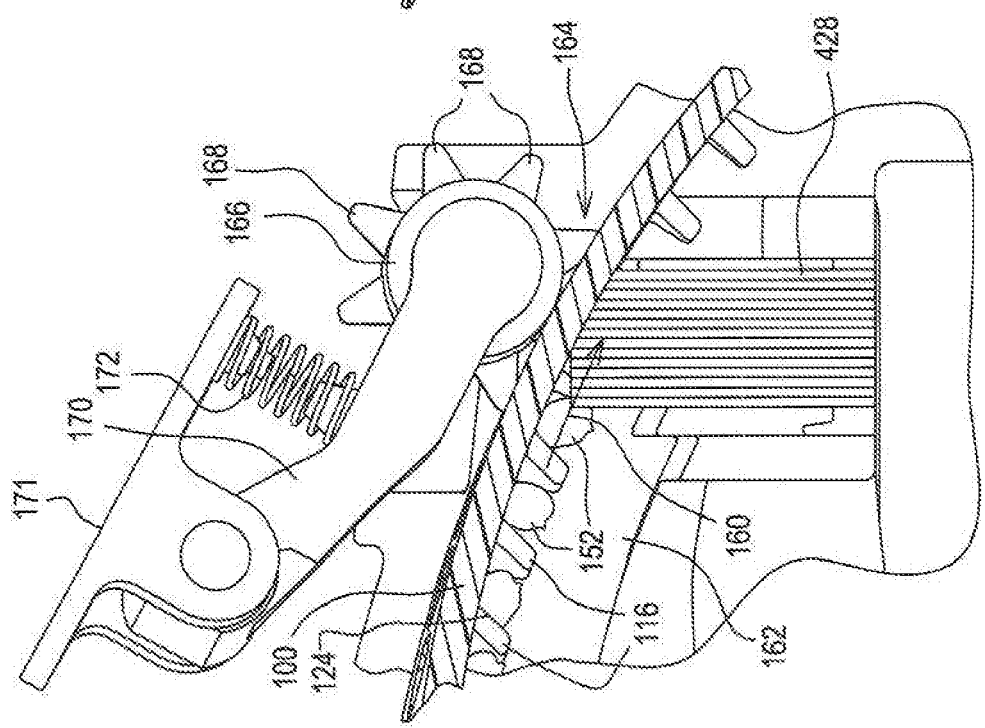
FIG. 11 is a sectional view of the hand-off of seed from the metering member to the delivery system including the delivery system brush belt.

Prior to release of the seed from the metering member, the seed is moving in the direction of vector 160 which is slightly downward into the bristles 428. With reference to FIG. 13, the vector 160 of the seed direction is at an angle 161 of about 60° to the length of the bristles 428 shown by the arrow 176. As shown in FIG. 11, the brush belt is positioned so that seed enters the bristles at the corner of the brush belt. The brush can be positioned so that the seed enters the brush through the distal ends of the bristles or through the side of the bristles.

Figure 14:
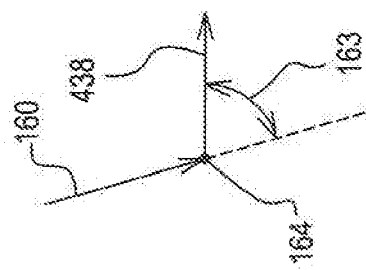
FIG. 14 is a schematic illustration of the direction of travel of the seed on the metering member and in the delivery system at the release position of seed from the metering member.

The relationship between the seed direction vector 160 on the metering member and the seed direction vector 438 when the seed is first in the brush belt is shown in FIG. 14 illustrating the two vectors in the plane containing both vectors at the release position 164. The angle 163 between the vectors is at least 35° and preferably between 50° and 80°. This shows the cross-feed of the seed into the bristles, meaning that the seed, prior to the release position is moving substantially in a different direction than the brush bristles are moving. This is in contrast to the arrangement shown in FIG. 3 of the previously mentioned US patent application 2010/0192819-A1 where the seed on the metering disk at the release is moving in substantially the same direction as the brush bristles. This is also the relationship by which the bristles sweep over the inner surface of the sidewall relative to the travel direction of seed.

Figure 12:
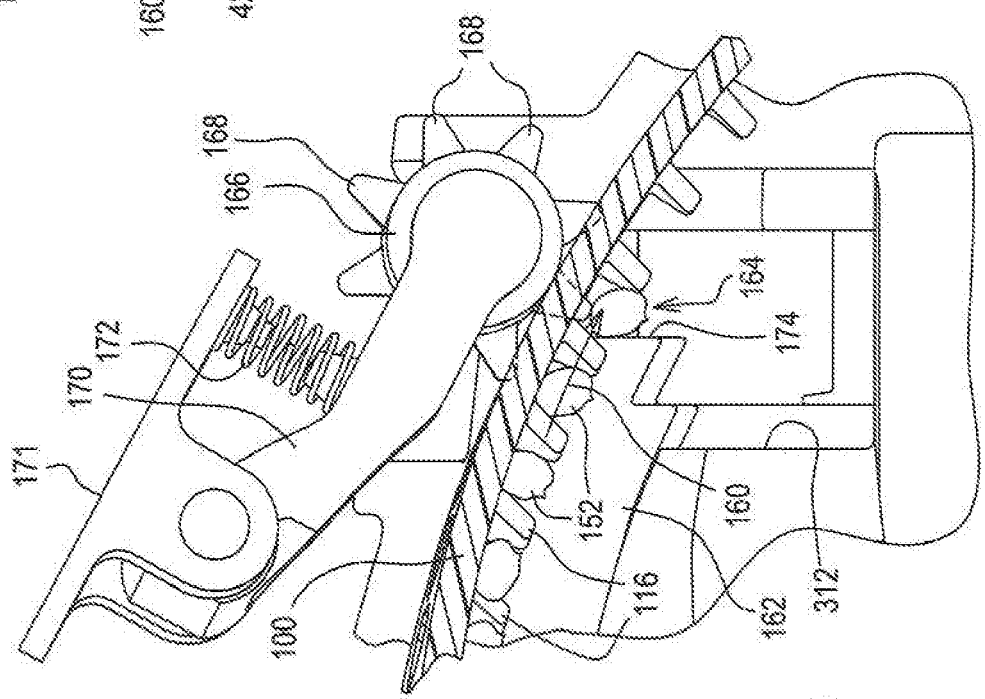
FIG. 12 is a sectional view like FIG. 11 without the delivery system brush belt.
Figure 15:
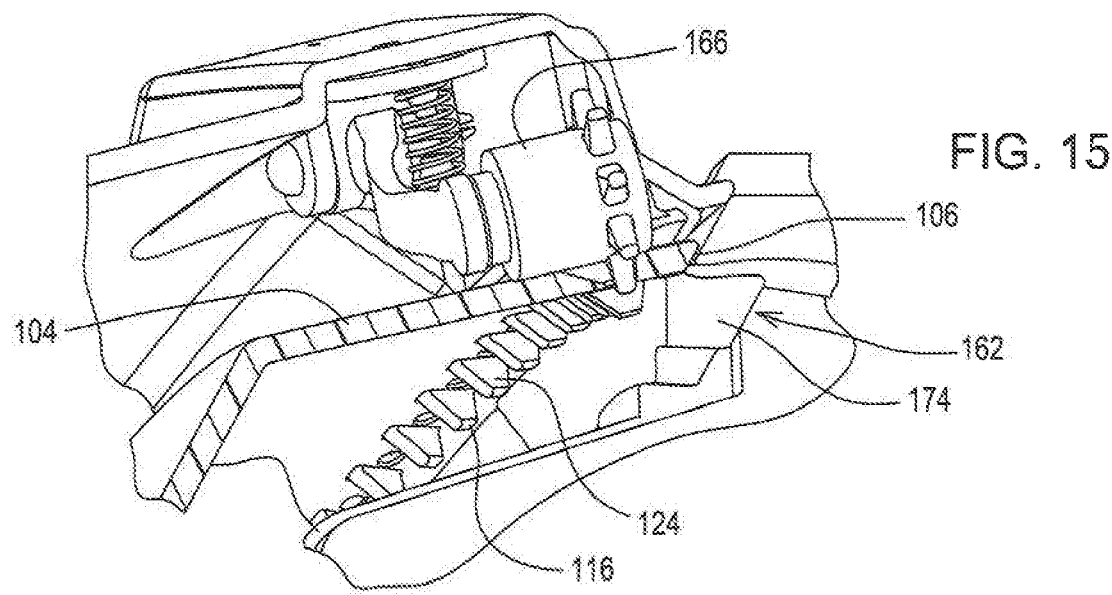
FIG. 15 is side sectional view of the metering member and delivery system at the hand-off without the brush belt.

FIGS. 11 and 12 show a blocking member 162 carried by the meter housing 30. Blocking member 162 is positioned adjacent a path of travel of seed 152 leading to the release position 164 and prevents movement of seed from the metering member prior to reaching the release position. Once the seed has passed the end 174 of the blocking member 162, the seed is free to move with the brush bristles in the direction of the vector 438 in FIG. 10. The blocking member ensures that the seed is consistently feed into the brush belt in the center of the belt, widthwise, rather than allowing the seed to enter the belt at random positions across the belt width. As shown in FIG. 15, the blocking member is located beneath the sidewall 104 of the metering member 100 between the paddles 116 and the outer edge 106 of the metering member. The confronting surfaces 124 of the paddles 116 push seed into the brush bristles. The paddles or projections 116 travel further into the brush bristles as the projections cross the width of the brush as seen in FIG. 11. Once seed is in the brush bristles, the seed is swept over the inner surface of the metering member, from the apertures 114 to the outer edge 106 of the metering member in the direction of the vector 438. The delivery system could be arranged to sweep seed in the opposite direction, that is, away from the outer edge 106 of the metering member.

To further ensure consistent release of seed from the metering member and hand-off to the delivery system, an ejector 166, carried by the cover member 34 rides on the outer surface of the metering member rim portion. See FIGS. 11, 12 and 15. The ejector 166 is in the form of a star wheel having a number of projections 168. The projections 168 extend into the apertures 114 from the outer surface 110 of the sidewall 104 and force seed out of the apertures 114. The ejector is caused to rotate by rotation of the metering member 100 due to the projections 168 engaging in the apertures 114. The ejector is mounted to the cover member 34 via a pivot arm 170 and bracket 171. The ejector 166 is biased against the metering member by a spring 172.

Turning attention once again to FIG. 4, a flexible seal 180 is shown on the inner side of the cover member 34. This seal bears against the outer surface 110 of the metering member 100 forming a vacuum chamber within the interior 182 of the seal. A first portion 184 of the seal is spaced radially further out on the metering member than is the second portion 186 of the seal. In the area of the seal first portion 184, vacuum is applied to the apertures 114, causing seed to adhered thereto. There is no vacuum applied to the apertures adjacent and outside of the seal second portion 186. A port 188 in the cover member 34 is adapted to connect the interior of the cover member to a vacuum source in a known manner for a vacuum seed meter. The seed release position 164 is within the vacuum chamber. Thus, the brush belt and the ejector are working in opposition to the vacuum applied to the apertures 114 to release the seed from the metering member.

Figure 16:
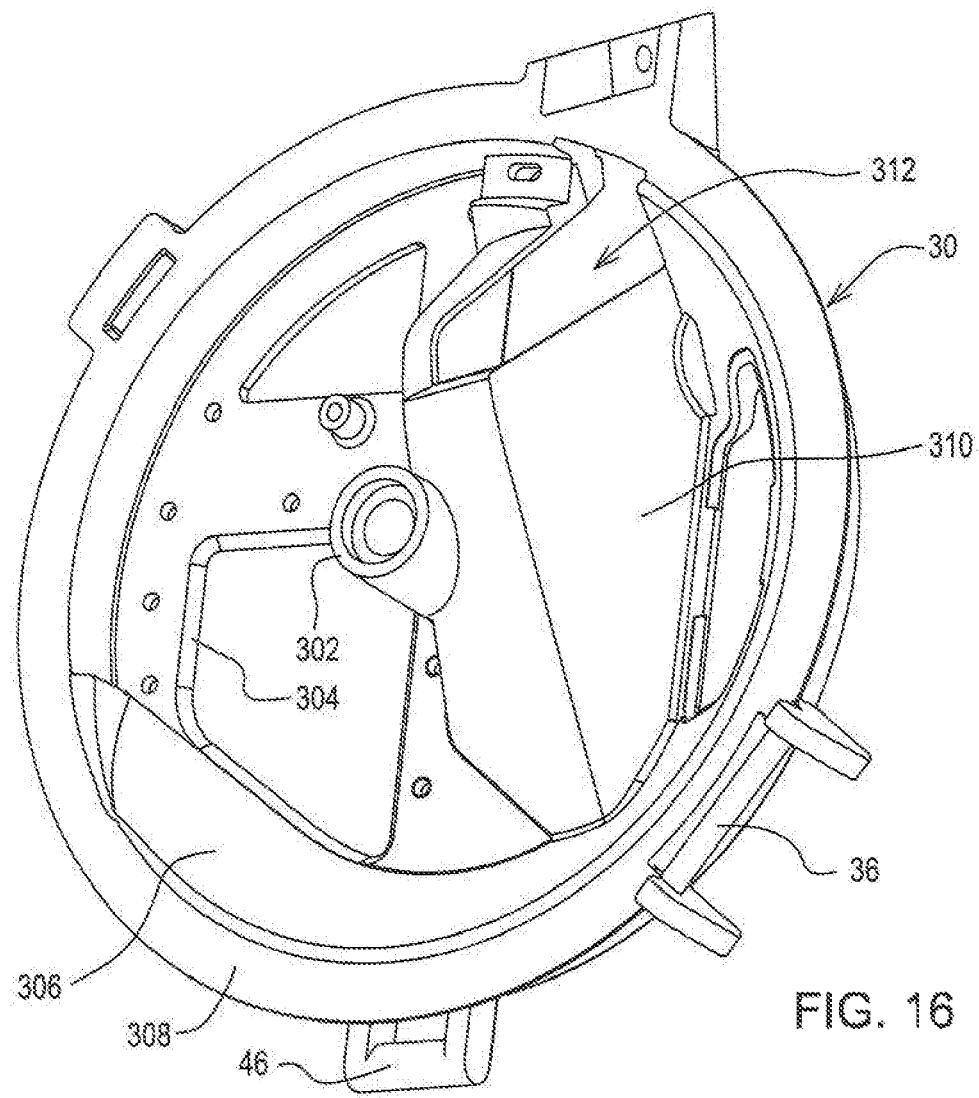
FIG. 16 is a perspective view of the inner side of the seed meter housing.

With reference to FIG. 16, The inside of the housing 30 is shown. The housing includes a central boss 302 for the drive spindle 54. The housing also includes an opening 304 to receive seed from a mini-hopper, not shown, mounted to the outside of the housing and surrounding the opening 304. Below the opening 304, the housing wall forms a ramp 306 extending downward toward the lower end 308 of the housing. The ramp cooperates with the inner surface 108 of the metering member to hold the seed pool 120. The housing includes an inward projection 310 forming a cavity 314 (FIG. 17) on the outside of the housing into which the upper end if the delivery system 400 is placed. The projection is open at the upper end, forming a downward looking opening 312 from the interior of the housing to the exterior. This opening 312 allows the brush belt 424 to access the inner surface of the 108 of the metering member and carry seed from the housing.

Figure 17:
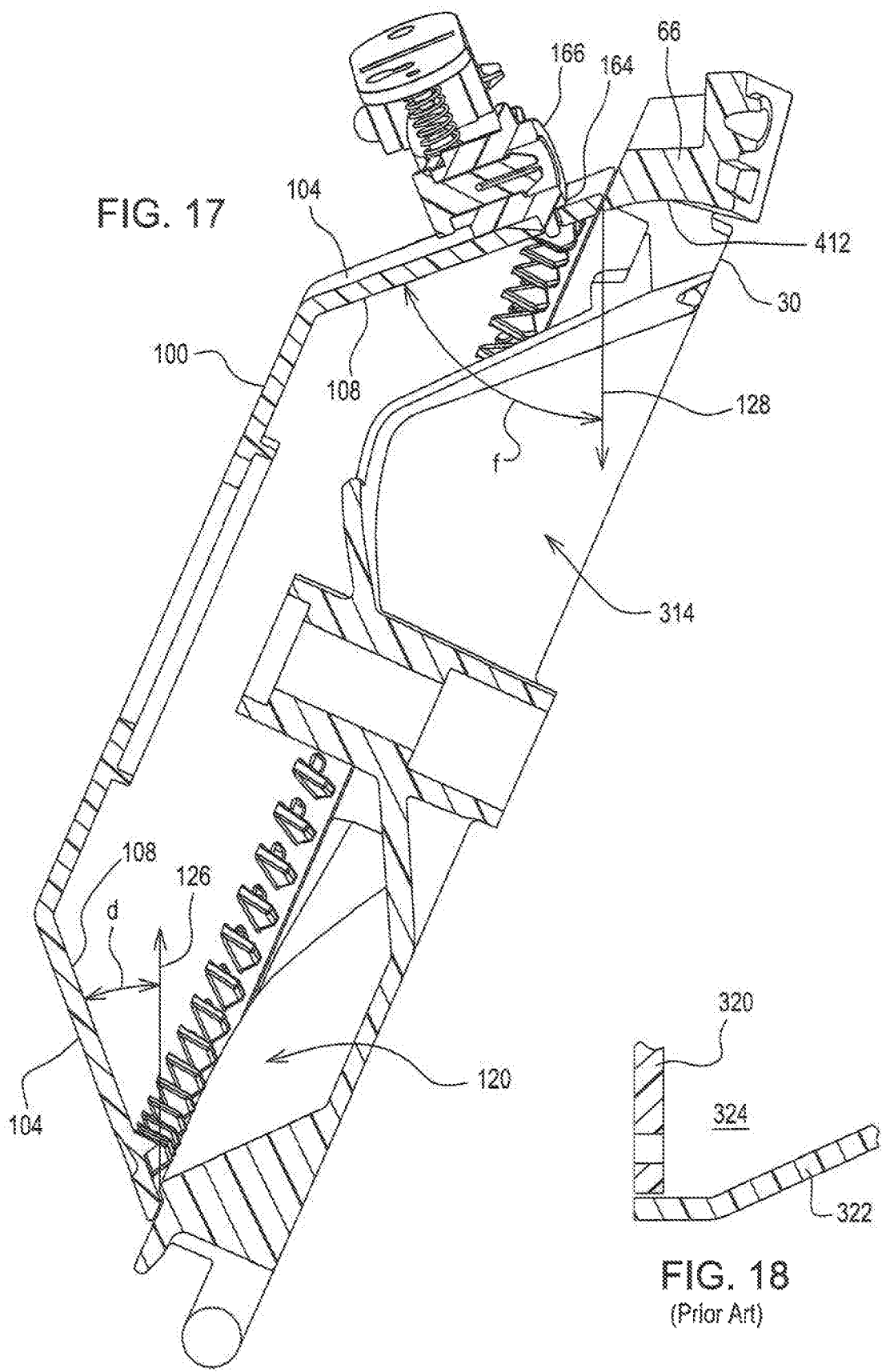
FIG. 17 is a side sectional view of the metering member and meter housing illustrating the seed pool formed by the metering member and housing.
Figure 18:
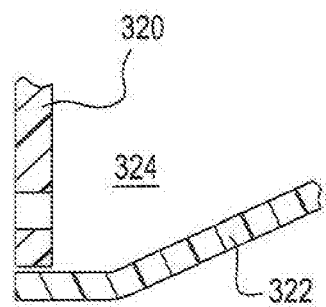
FIG. 18 is side sectional view like FIG. 17 illustrating a prior art seed meter with a disk metering member.

FIG. 17 illustrates the orientation of the metering member and the cooperation of the housing 30 and metering member 100 to form a trough for the seed pool 120 at the lower end of the metering member. FIG. 17 shows the orientation of the metering member when the seeding machine 10 is on level ground. At the lower end of the metering member, the sidewall 104 is inclined to the vertical such that the inner surface 108 is at an angle d to the vertical vector 126. As illustrated in FIG. 17, the inner surface is approximately 21° from vertical. The orientation of the housing adjacent the metering member, forming the other side of the trough, is not critical. Seed from the seed pool 120 sits on top of the inner surface 108 and a component of the force of gravity is perpendicular to the inner surface 108. When operating on a hillside, if the meter is tilted clockwise or counter-clockwise, as viewed in FIG. 17, the inner surface 108 remains inclined and gravity still has a component perpendicular to the inner surface. This is in contrast to a typical disk seed meter shown in FIG. 18 with a vertically oriented disk 320 cooperating with a housing wall 322 for form a seed pool 324. If this meter is tilted counterclockwise as viewed, seed from the pool will still bear against the disk. However, if the meter is tilted clockwise, seed from the pool will fall away from the disk, allowing for decreased metering performance in terms of seed being picked-up by the disk. Evaluation of the meter has shown improved meter performance on a hillside when the angle d is as small as 5° and as large as 75°. Better performance is achieved when the angle d is between 10° and 50° while the optimum performance is in the range of 20° to 40°. This last range provides considerable tilting of the seed meter on a hillside in any direction before performance begins to decrease.

At the upper end of the metering member, at the release position 164, the inner surface 108 has an angle f to a downward vertical vector 128 in the range of 50° to 90° with the closer to 90° being the better for hand-off of seed from the metering member to the brush belt. As shown, the angle f is approximately 68°. The different orientations of the inner surface 108 relative to vertical at the seed trough and at the release position is accomplished with a metering member that is rigid. Such variation is not possible with the flat disk metering member shown in FIG. 18.

As described above, seed is adhered to the apertures 114 in the metering member due to the vacuum applied to the outer surface of the metering member creating a pressure differential on opposite sides of the metering member. As an alternative to vacuum on the outer side of the metering member, the pressure differential can be created by a positive pressure between the housing 30 and the metering member 100. Such a system would require seals between the metering member 100 and the housing 30 to create a positive pressure chamber. In a positive pressure arrangement, the cover member 34 only serves as a cover for the rotating metering member.

Figure 5:
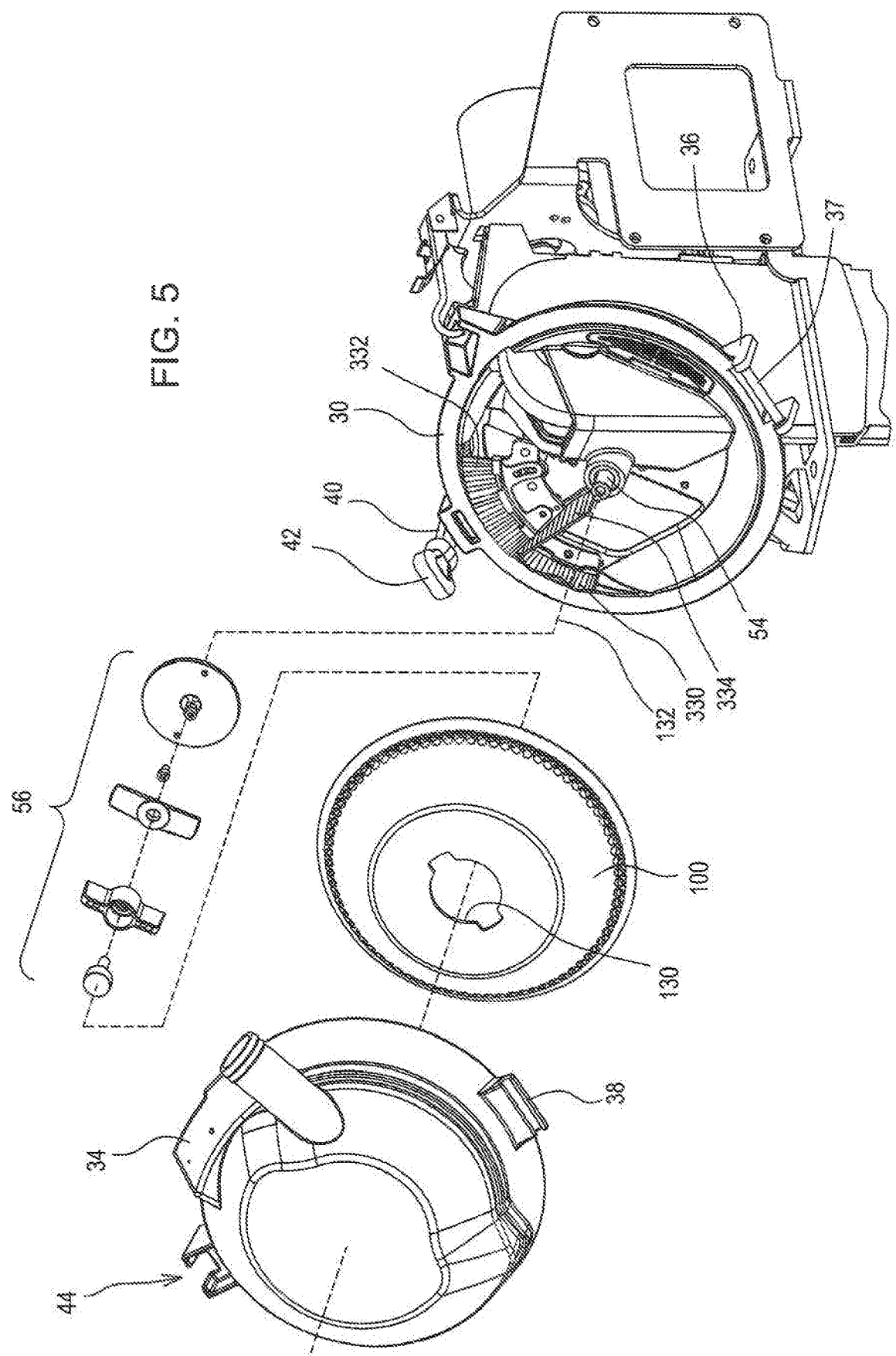
FIG. 5 is an exploded perspective view of the seed meter of FIG. 4.

It is possible that more than one seed will be adhered to a given aperture 114. To prevent more than one seed at a time from being transferred to the brush belt, a pair of doubles eliminators or singulating members are attached to the housing 30 along the path of seed from the seed pool to the release position 164. The singulating members are in the form of brushes 330 and 332 (FIGS. 5 and 9). Brush 330 has bristles extending substantially axially and brushes seed on the apertures 114 by extending inwardly from the outer edge 106 of the metering member. The bristles of brush 330 are of varying length, to engage the seed at several discrete locations along the length of the brush 330. The brush 332 has bristles extending substantially radially and engaging the inner surface of the metering member sidewall inside of the paddles 116 and extend along the sidewall to the apertures 114. Both brushes 330 and 332 act to slightly disturb seed on the aperture and cause excess seed to fall off. Once removed, the excess seed falls back to the seed pool 120. The brushes can be fixed in position or they can be adjustable to change the degree to which the brushed disturb seed on the metering member. A third brush 334 is shown which extends generally radially of the metering member. The brush 334 serves to define an boundary to the seed pool 120. The brushes 330, 332 and 334 are mounted to the housing 30.

Returning again to FIG. 10, once seed is captured or trapped in the bristles 428, the delivery system controls the movement of seed from the seed meter to the discharge location. The seeds are held in the bristles such that the seeds can not move vertically relative to the bristles 428 or relative to other seeds in the delivery system. Particularly, during travel of the seeds along the vertical side of the delivery system, the seeds are held on at least the top and bottom of the seeds to prevent any relative movement between the seed and the brush belt. Thus, the relative position of the seeds to one another is not affected by dynamics of the planting unit while moving across a field. The seed is carried by the bristles from the upper opening 416 to the lower opening 418 with the movement of the seed controlled at all times from the upper opening to the lower opening.

The lower opening 418 of the delivery system housing is positioned as close to the bottom 446 of the seed trench or furrow 448 as possible. As shown, the lower opening 418 is near or below the soil surface 432 adjacent the seed furrow. The bottom of the delivery system should be no more than one or two inches, (2.5-5 cm) above the soil surface 432. If possible, the lower end of the delivery system should be below the soil surface 432. The housing edge wall 410 forms an exit ramp 434 at the lower opening 418. The lower opening 418 and the ramp 434 are positioned along the curve in the belt path around the pulley 422. The seed, being carried by the bristle's distal ends, increases in linear speed around the pulley 422 as the distal ends of the bristles travel a greater distance around the pulley 422 than does the base member 426 of the belt. This speed difference is shown by the two arrows 440 and 442.

At discharge, the seed has a velocity shown by the vector V. This velocity has a vertical component Vv and a horizontal component VH. The belt is operated at a speed to produce a horizontal velocity component VH that is approximately equal to, but in the opposite direction of, the seeding machine forward velocity shown by arrow 408. As a result, the horizontal velocity of the seed relative to the ground is zero or approximately zero. This minimizes rolling of the seed in the seed trench.

Seed can be inserted into the brush bristles at essentially an infinite number of positions. This enables the brush to be operated at the speed necessary to produce the desired horizontal velocity component to the seed, independent of the seed population. The seed meter, on the other hand, must be operated at a speed that is a function of both the forward travel speed of the seeding machine and the desired seed population. Because the belt 424 can be loaded with seed at essentially an infinite number of positions, the belt speed can be operated independently of the seed meter speed. This is not the case with other seed delivery systems, such as that disclosed in U.S. Pat. No. 6,681,706 where the delivery system of FIG. 2 has a belt with flights to carry the seed. The belt speed must be timed to the seed meter speed to ensure that one or more flights pass the seed meter for each seed that is discharged from the meter.

While it is desirable to match the seed rearward velocity to the seeding machine forward velocity to minimize seed relative velocity to the soil, with some seed types, it may be necessary to operate the brush belt at a different speed to ensure the seed is discharged from the brush bristles.

Figure 19:
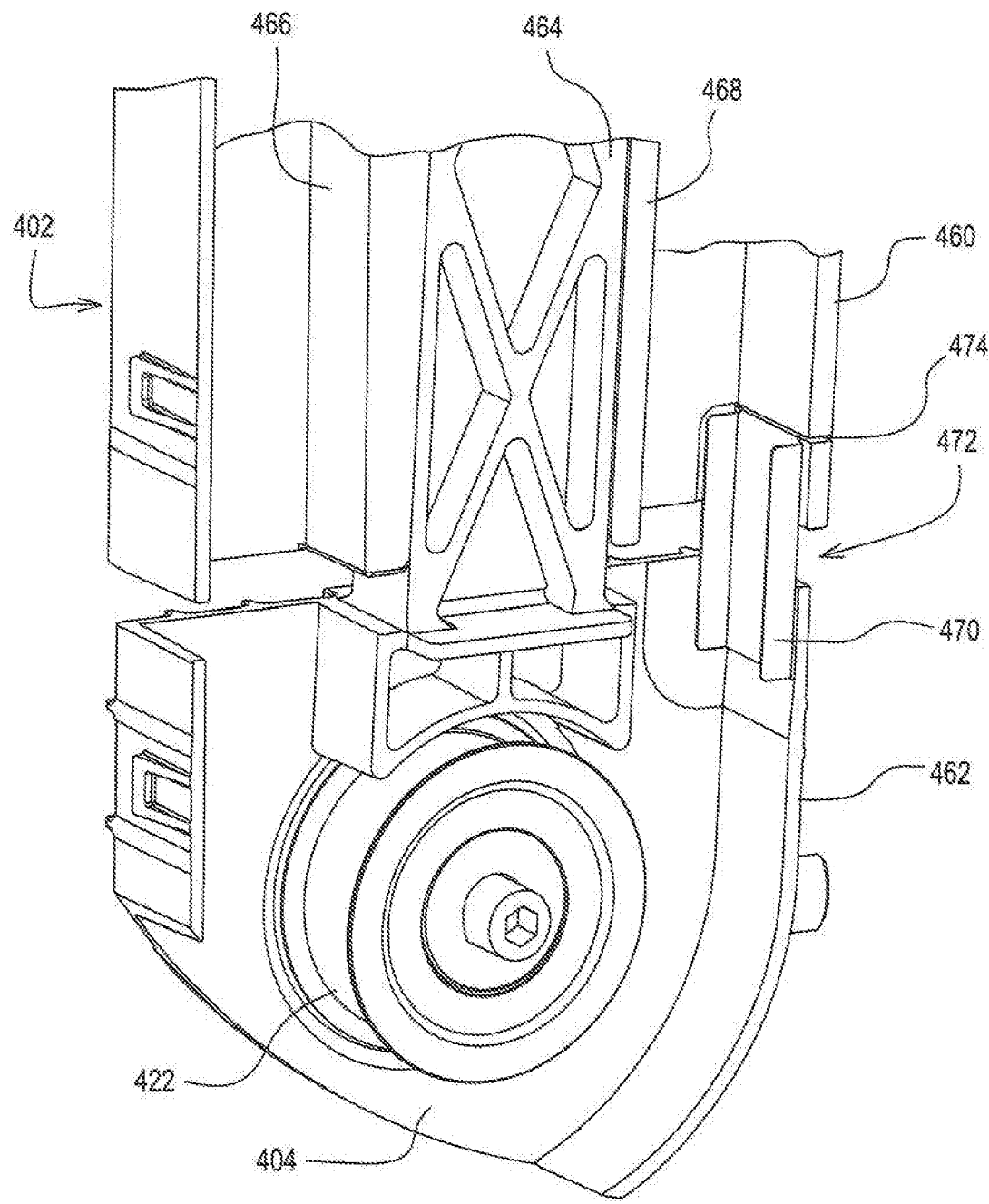
FIG. 19 is a perspective view of the lower end of the delivery system.

The interior of the lower portion of delivery system housing is shown in FIG. 19. The delivery system housing 402 is a two-piece housing having an upper housing member 460 and a lower housing member 462. The lower housing member carries the lower pulley 422. The lower housing member has an upwardly extending rod portion 464 that slides within a channel formed by walls 466 and 468 in the upper housing member. Springs, not shown, push downward on the rod portion 464 to bias the lower housing member downward. The brush belt 424, wrapped about the pulleys 420 and 422, holds the upper and lower housing members together. The belt 424 is tensioned by the springs acting on the rod portion 464. A U-shaped metal strip 470 is attached to the upper housing member 460 and bridges the gap 472 between the upper and lower housing members to provide a continuous surface for holding seed in the housing between the upper opening 416 and the lower opening 418. The metal strip has a tab at the upper end thereof bent over and inserted into a slot 474 in the upper housing member 460 to hold the metal strip 470 in place. If needed, a fastener, such as a nut and bolt, may be placed through the rod portion 464 and the upper housing member 460 to fix the upper and lower housing members together.

Figure 20:
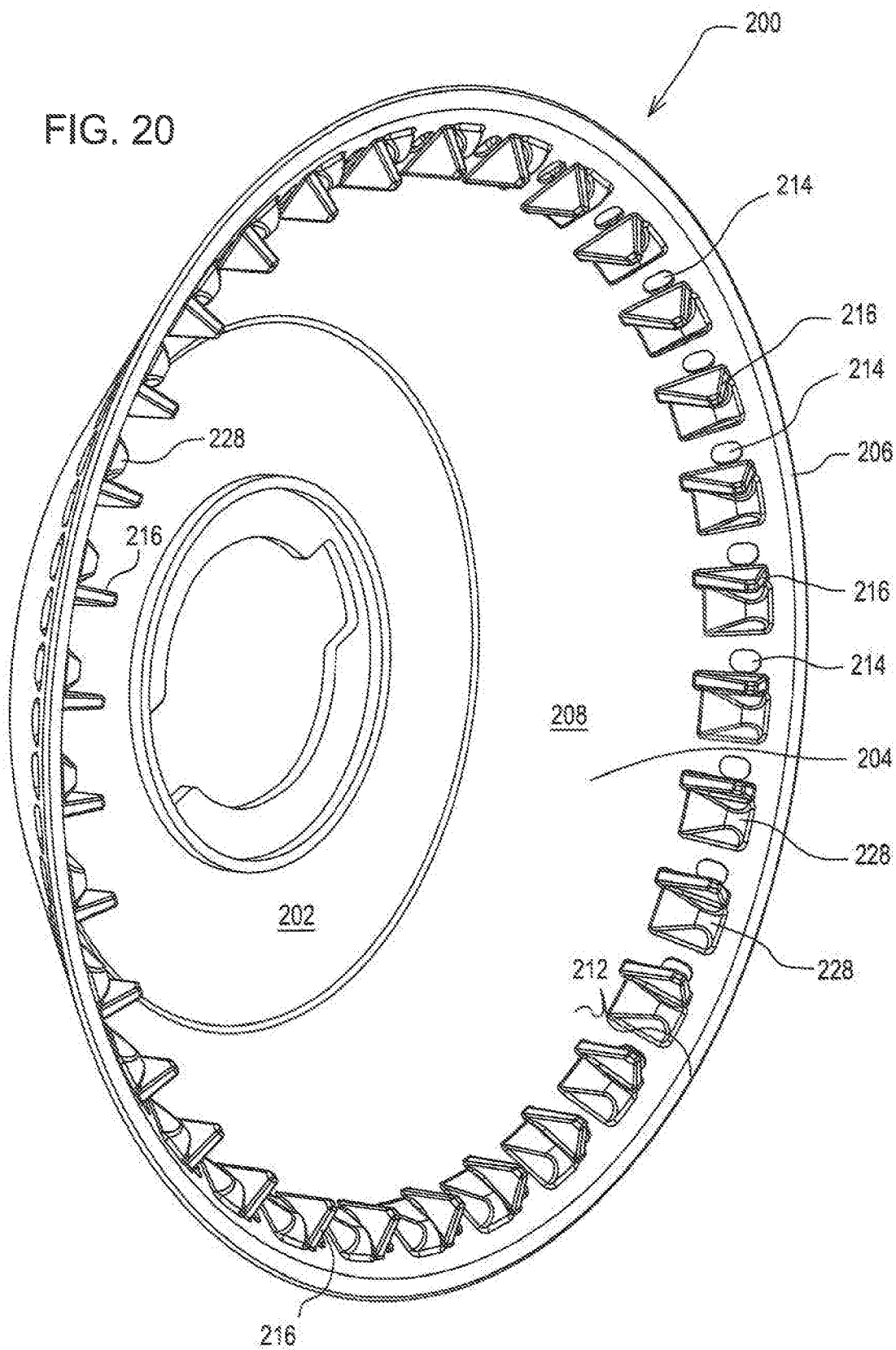
FIGS. 20 and 21 are perspective views of an alternative metering member.
Figure 21:
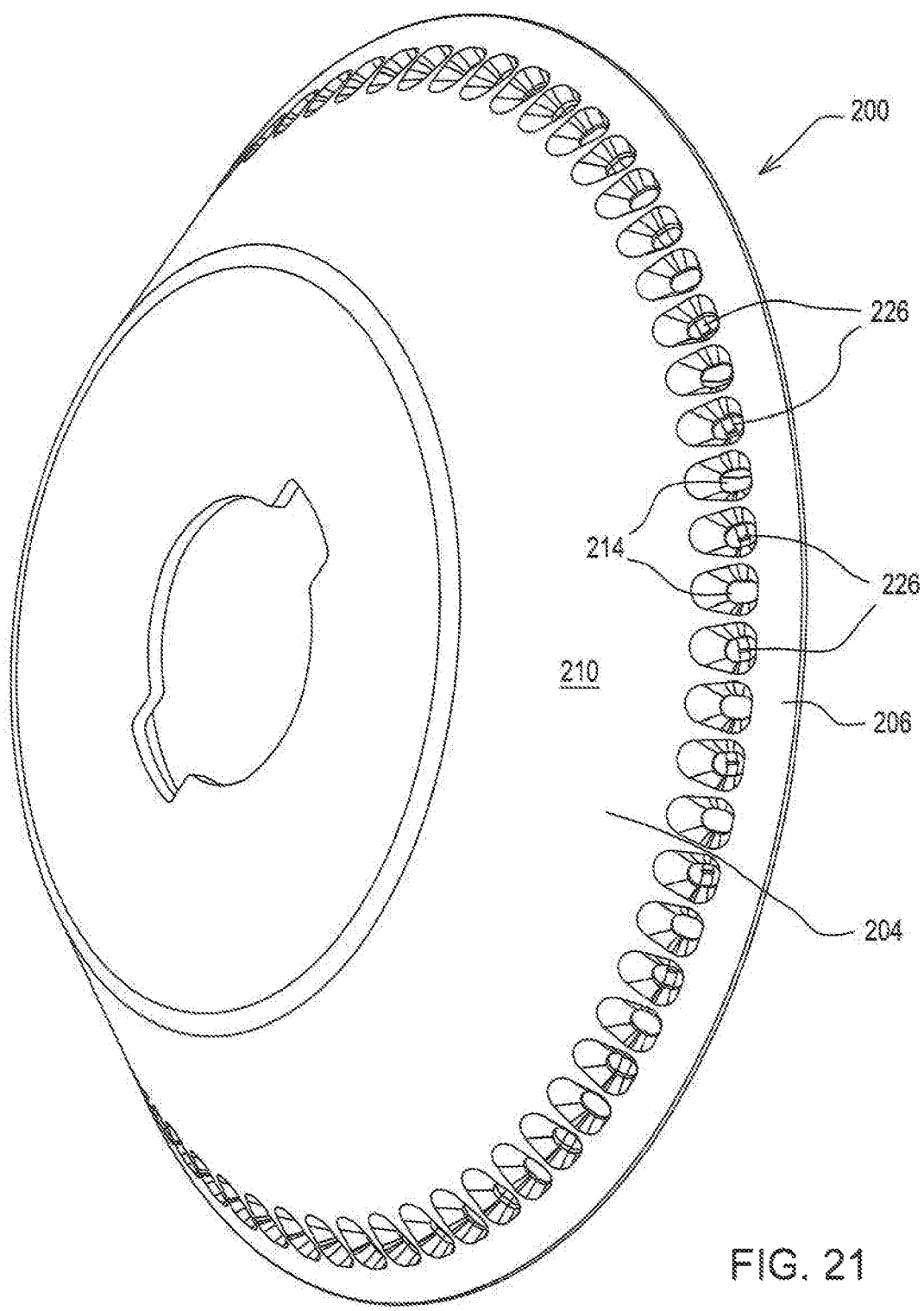

Different metering members may be used for different seed types. The metering member 100 is intended for soybeans and other crops planted with a fairly close seed spacing. Corn, which is planted at a greater seed spacing uses a metering member 200 shown in FIGS. 20 and 21. Metering member 200 is constructed in a similar fashion as metering member 100 and like components are given the same reference numeral with the addition of 100. However, metering member 200 has half the number of apertures 214 as the metering member 100. To avoid the need to replace the ejector 166 when changing metering members, the metering member 200 has recess 226 extending into the sidewall 204 on the outer surface 210 of the sidewall between each aperture 214. The recesses 226 provide clearance for the projections 168 of the ejector 166 that are arranged to be inserted in each aperture 114 of the metering member 100. The recesses 226 are not open to the inner surface 208 of the sidewall 204. Thus there are additional projections 228 on the inner surface of the sidewall 204 between the apertures 214. Alternatively, the projections 228 and the paddles 216 can be formed as a single projections extending from the inner surface 208.

Having described the planting unit, it will become apparent that various modifications can be made without departing from the scope of the accompanying claims.

What is claimed is:

1. A planting unit for a seeding machine, the planting unit comprising:
   a seed meter having a housing, a cover member, and a metering member, the cover member mounted to the housing and configured to pivot with respect to the housing between an open position and a closed position, the metering member mounted to the housing for rotation with respect to the housing, the metering member positioned between the housing and the cover member while the cover member is in the closed position, and the metering member being accessible by a user while the cover member is in the open position, the metering member having a sidewall extending to an outer edge, the sidewall having inner and outer surfaces, a rim portion of the sidewall adjacent the outer edge having apertures extending through the sidewall for adhering seed to the metering member to sequentially move individual seeds to a release position; and a mechanical seed delivery system having
an elongate housing including a first portion, and a second portion, the first portion including a first pulley and a protrusion extending therefrom, the first pulley configured to rotate about a first axis, the second portion including a second pulley, a first wall and a second wall, the second pulley configured to rotate about a second axis, an elongate housing axis extending between the first pulley and the second pulley, such that that first axis is perpendicular to the elongate housing axis and the second axis is perpendicular to the elongate housing axis, the first wall and the second wall extending away from the second pulley in a direction parallel to the elongate housing axis, the second portion defining a channel between the first wall and the second wall, the protrusion extending away from the first pulley along the elongate housing axis and into the channel, the protrusion configured to be slidingly engaged between the first and second walls to couple the first portion to the second portion such that the first and second pulleys are spaced apart a distance measured along the elongate housing axis, the distance variable within a range of acceptable distances, and
a conveyor member extending around the first pulley and the second pulley, the conveyor member configured to be driven by one of the first pulley and the second pulley, the conveyor member configured to receive seed from the metering member at the release position, and to carry seed along a seed path to a discharge location adjacent a seed furrow formed in soil beneath the seeding machine, at least a portion of the seed path extending parallel to the elongate housing axis, the distance between the first and second pulleys being variable to adjust the tension in the conveyor member.

2. The planting unit of claim 1, further comprising an elongate bar configured to extend across a gap between the first portion and the second portion such that seed is configured to be retained in the conveyor by the bar while the seed is positioned in the gap between the first portion and the second portion of the housing.

3. The planting unit of claim 1, wherein the first portion includes a first edge wall configured to retain seed in the conveyor while the seed is positioned proximate the first portion, and the second portion includes a second edge wall configured to retain the seed in the conveyor while the seed is positioned proximate the second portion.

4. The planting unit of claim 3, further comprising a bar configured to extend across a gap between the first edge wall and the second edge wall such that seed is configured to be retained in the conveyor by the bar while the seed is in the gap between the first portion and the second portion of the housing.

5. The planting unit of claim 4, wherein the second edge wall is positioned proximate the release position such that seed is received from the seed meter by the conveyor proximate the second edge wall, and wherein an end of the first edge wall forms a lower opening proximate the discharge location, such that seed is configured to be discharged proximate the lower opening.

6. The planting unit of claim 4, wherein the first edge wall is positioned proximate the release position such that seed is received from the seed meter by the conveyor proximate the first edge wall, and wherein an end of the second edge wall forms a lower opening proximate the discharge location, such that seed is configured to be discharged proximate the lower opening.

7. A planting unit for a seeding machine, the planting unit comprising:
a seed meter having a metering member mounted for rotation, the metering member configured to sequentially move individual seeds to a release position; and
a mechanical seed delivery system having
a housing including a first portion, and a second portion, the first portion including a first pulley and a protrusion, the second portion including a second pulley, a first wall and a second wall, the second portion defining a channel between the first wall and the second wall, the protrusion configured to be slidingly engaged between the first and second walls to couple the first portion to the second portion such that the first and second pulleys are spaced apart a distance,
a conveyor member extending around the first pulley and the second pulley, the conveyor member configured to be driven by one of the first pulley and the second pulley, the conveyor member configured to receive seed from the metering member at the release position, and to carry seed to a discharge location adjacent a seed furrow formed in soil beneath the seeding machine, the distance between the first and second pulleys being variable to adjust the tension in the conveyor member, and
a bar configured to extend across a gap between the first portion and the second portion such that seed is configured to be retained in the conveyor by the bar while the seed is in the gap between the first portion and the second portion of the housing.

8. A planting unit for a seeding machine, the planting unit comprising:
a seed meter having a metering member mounted for rotation, the metering member configured to sequentially move individual seeds to a release position; and
a mechanical seed delivery system having
a housing including a first portion, and a second portion, the first portion including a first pulley and a protrusion, the second portion including a second pulley, a first wall and a second wall, the second portion defining a channel between the first wall and the second wall, the protrusion configured to be slidingly engaged between the first and second walls to couple the first portion to the second portion such that the first and second pulleys are spaced apart a distance, and
a conveyor member extending around the first pulley and the second pulley, the conveyor member configured to be driven by one of the first pulley and the second pulley, the conveyor member configured to receive seed from the metering member at the release position, and to carry seed to a discharge location adjacent a seed furrow formed in soil beneath the seeding machine, the distance between the first and second pulleys being variable to adjust the tension in the conveyor member,
wherein the first portion includes a first edge wall configured to retain seed in the conveyor while the seed is positioned proximate the first portion, and the second portion includes a second edge wall configured to retain the seed in the conveyor while the seed is positioned proximate the second portion.

9. The planting unit of claim 8, further comprising a bar configured to extend across a gap between the first edge wall and the second edge wall such that seed is configured to be retained in the conveyor by the bar while the seed is in the gap between the first portion and the second portion of the housing.

10. The planting unit of claim 9, wherein the second edge wall is positioned proximate the release position such that seed is received from the seed meter by the conveyor proximate the second edge wall, and wherein an end of the first edge wall forms a lower opening proximate the discharge location, such that seed is configured to be discharged proximate the lower opening.

11. The planting unit of claim 9, wherein the conveyor is a brush belt including bristles, such that seed is retained between bristles and the second edge wall while the seed is positioned proximate the second portion, retained between the bristles and the bar while the seed is positioned between the first portion and the second portion, and retained between the bristles and the first edge wall while the seed is positioned proximate the first portion.

12. The planting unit of claim 9, wherein the first edge wall is positioned proximate the release position such that seed is received from the seed meter by the conveyor proximate the first edge wall, and wherein an end of the second edge wall forms a lower opening proximate the discharge location, such that seed is configured to be discharged proximate the lower opening.

13. The planting unit of claim 7, wherein seed adhered to the metering member are moving in a first direction at the release position, and wherein the conveyor is configured to move seed in a second direction substantially cross-wise to the first direction.

14. A planting unit for a seeding machine, the planting unit comprising:
a seed meter having a metering member mounted for rotation, the metering member configured to sequentially move individual seeds to a release position; and
a mechanical seed delivery system having
a housing including a first portion, and a second portion, the first portion including a first pulley and a protrusion, the second portion including a second pulley, a first wall and a second wall, the second portion defining a channel between the first wall and the second wall, the protrusion configured to be slidingly engaged between the first and second walls to couple the first portion to the second portion such that the first and second pulleys are spaced apart a distance, and
a conveyor member extending around the first pulley and the second pulley, the conveyor member configured to be driven by one of the first pulley and the second pulley, the conveyor member configured to receive seed from the metering member at the release position, and to carry seed to a discharge location adjacent a seed furrow formed in soil beneath the seeding machine, the distance between the first and second pulleys being variable to adjust the tension in the conveyor member,
wherein seed adhered to the metering member are moving in a first direction at the release position, and wherein the conveyor is configured to move seed in a second direction substantially cross-wise to the first direction, and
wherein the planting unit is configured to be moved along a ground surface in a direction of travel, wherein the first direction is at an acute angle with respect to the direction of travel.

15. The planting unit of claim 14, wherein the second direction is between 50° and 80° to the first direction.

16. The planting unit of claim 13, wherein the seed is configured to move in a third direction at discharge, the third direction being generally downwardly and opposite the direction of travel.

17. The planting unit of claim 16, wherein the conveyor is configured to receive seed proximate the second pulley and is configured to discharge seed proximate the first pulley.

18. A planting unit for a seeding machine, the planting unit comprising:
a seed meter having a metering member mounted for rotation, the metering member configured to sequentially move individual seeds to a release position; and
a mechanical seed delivery system having
a housing including a first portion, and a second portion, the first portion including a first pulley and a protrusion, the second portion including a second pulley, a first wall and a second wall, the second portion defining a channel between the first wall and the second wall, the protrusion configured to be slidingly engaged between the first and second walls to couple the first portion to the second portion such that the first and second pulleys are spaced apart a distance,
a conveyor member extending around the first pulley and the second pulley, the conveyor member configured to be driven by one of the first pulley and the second pulley, the conveyor member configured to receive seed from the metering member at the release position, and to carry seed to a discharge location adjacent a seed furrow formed in soil beneath the seeding machine, the distance between the first and second pulleys being variable to adjust the tension in the conveyor member, and
wherein the seed is configured to move in a third direction at discharge, the third direction being generally downwardly and opposite the direction of travel, and
wherein the conveyor is configured to move seed in the first direction at a first speed, configured to move seed in the second direction at a second speed and configured to discharge seed at a third speed, the third speed being greater than the first speed and greater than the second speed.

19. The planting unit of claim 18, wherein the conveyor is configured to receive seed proximate the second pulley and is configured to discharge seed proximate the first pulley.

20. The planting unit of claim 18, further comprising an elongate bar configured to extend across a gap between the first portion and the second portion such that seed is configured to be retained in the conveyor by the bar while the seed is positioned in the gap between the first portion and the second portion of the housing.

21. The planting unit of claim 18, wherein the first portion includes a first edge wall configured to retain seed in the conveyor member while the seed is positioned proximate the first portion, and the second portion includes a second edge wall configured to retain the seed in the conveyor member while the seed is positioned proximate the second portion.

22. The planting unit of claim 21, wherein the second edge wall is positioned proximate the release position such that seed is received from the seed meter by the conveyor member proximate the second edge wall, and wherein an end of the first edge wall forms a lower opening proximate the discharge location, such that seed is configured to be discharged proximate the lower opening.

23. The planting unit of claim 21, further comprising an elongate bar configured to extend across a gap between the first portion and the second portion,
   wherein the conveyor is a brush belt including bristles, such that seed is retained between bristles and the second edge wall while the seed is positioned proximate the second portion, retained between the bristles and the bar while the seed is positioned between the first portion and the second portion, and retained between the bristles and the first edge wall while the seed is positioned proximate the first portion.

24. The planting unit of claim 18, wherein seed adhered to the metering member are moving in a first direction at the release position, and wherein the conveyor is configured to move seed in a second direction substantially cross-wise to the first direction.

25. The planting unit of claim 14, further comprising a bar configured to extend across a gap between the first portion and the second portion such that seed is configured to be retained in the conveyor by the bar while the seed is positioned in the gap between the first portion and the second portion of the housing.

26. The planting unit of claim 14, wherein the first portion includes a first edge wall configured to retain seed in the conveyor while the seed is positioned proximate the first portion, and the second portion includes a second edge wall configured to retain the seed in the conveyor while the seed is positioned proximate the second portion.

27. The planting unit of claim 26, wherein the second edge wall is positioned proximate the release position such that seed is received from the seed meter by the conveyor member proximate the second edge wall, and wherein an end of the first edge wall forms a lower opening proximate the discharge location, such that seed is configured to be discharged proximate the lower opening.

28. The planting unit of claim 8, wherein seed adhered to the metering member are moving in a first direction at the release position, and wherein the conveyor is configured to move seed in a second direction substantially cross-wise to the first direction.

29. The planting unit of claim 2, wherein the conveyor is a brush belt including bristles, such that seed is retained between bristles and the second edge wall while the seed is positioned proximate the second portion, retained between the bristles and the bar while the seed is positioned between the first portion and the second portion, and retained between the bristles and the first edge wall while the seed is positioned proximate the first portion.

* * * * *